United States Patent
Lippett

(10) Patent No.: US 9,442,886 B2
(45) Date of Patent: *Sep. 13, 2016

(54) SCHEDULING IN A MULTICORE ARCHITECTURE

(71) Applicants: Synopsys, Inc., Mountain View, CA (US); Fujitsu Semiconductor Limited, Kanagawa (JP)

(72) Inventor: Mark David Lippett, Watlington (GB)

(73) Assignees: Synopsys, Inc., Mountain View, CA (US); Fujitsu Semiconductor Limited, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,334

(22) Filed: Sep. 9, 2015

(65) Prior Publication Data

US 2015/0378776 A1  Dec. 31, 2015

Related U.S. Application Data

(60) Continuation of application No. 14/267,830, filed on May 1, 2014, now Pat. No. 9,164,953, which is a division of application No. 13/965,124, filed on Aug. 12, 2013, now Pat. No. 8,751,773, which is a continuation of application No. 11/540,146, filed on Sep. 29, 2006, now Pat. No. 8,732,439.

(30) Foreign Application Priority Data

Sep. 30, 2005 (GB) .............................. 20050019981.5

(51) Int. Cl.
*G06F 15/00* (2006.01)
*G06F 15/80* (2006.01)
(Continued)

(52) U.S. Cl.
CPC ............. *G06F 15/80* (2013.01); *G06F 1/3203* (2013.01); *G06F 9/466* (2013.01); *G06F 9/4893* (2013.01); *G06F 9/5027* (2013.01);
(Continued)

(58) Field of Classification Search
None
See application file for complete search history.

(56) References Cited

U.S. PATENT DOCUMENTS

| | | |
|---|---|---|
| 5,566,340 A | 10/1996 | Stewart et al. |
| 6,092,174 A | 7/2000 | Roussakov |

(Continued)

FOREIGN PATENT DOCUMENTS

| | | |
|---|---|---|
| EP | 1089183 | 4/2001 |
| GB | 2206714 | 1/1989 |

(Continued)

OTHER PUBLICATIONS

European Second Examination Report, European Application No. 10192098.1, Mar. 16, 2016, 7 pages.

(Continued)

*Primary Examiner* — Corey S Faherty
(74) *Attorney, Agent, or Firm* — Fenwick & West LLP

(57) ABSTRACT

This invention relates to scheduling threads in a multicore processor. Executable transactions may be scheduled using at least one distribution queue, which lists executable transactions in order of eligibility for execution, and multilevel scheduler which comprises a plurality of linked individual executable transaction schedulers. Each of these includes a scheduling algorithm for determining the most eligible executable transaction for execution. The most eligible executable transaction is outputted from the multilevel scheduler to the at least one distribution queue.

21 Claims, 46 Drawing Sheets

Distribution tier scheduling

(51) Int. Cl.
- *G06F 1/32* (2006.01)
- *G06F 9/48* (2006.01)
- *G06F 9/46* (2006.01)
- *G06F 9/50* (2006.01)

(52) U.S. Cl.
CPC ...... *G06F 9/5038* (2013.01); *G06F 2209/483* (2013.01); *G06F 2209/5011* (2013.01); *Y02B 60/144* (2013.01)

(56) References Cited

U.S. PATENT DOCUMENTS

| | | |
|---|---|---|
| 6,653,859 B2 | 11/2003 | Sihlbom et al. |
| 6,711,447 B1 | 3/2004 | Saeed |
| 6,711,691 B1 | 3/2004 | Howard et al. |
| 6,804,632 B2 | 10/2004 | Orenstien et al. |
| 6,823,516 B1 | 11/2004 | Cooper |
| 7,249,268 B2 | 7/2007 | Bhandarkar |
| 7,392,414 B2 | 6/2008 | Bailey et al. |
| 7,502,948 B2 | 3/2009 | Rotem et al. |
| 7,526,661 B2 | 4/2009 | Nakajima et al. |
| 7,617,403 B2 | 11/2009 | Capps, Jr. et al. |
| 7,636,863 B2 | 12/2009 | Oh |
| 7,822,888 B2* | 10/2010 | Saito et al. ............ 710/38 |
| 7,886,262 B2 | 2/2011 | Chew et al. |
| 2002/0087903 A1 | 7/2002 | Hermerding et al. |
| 2002/0188877 A1 | 12/2002 | Buch |
| 2003/0005417 A1 | 1/2003 | Gard et al. |
| 2003/0014743 A1 | 1/2003 | Cooke et al. |
| 2003/0056091 A1 | 3/2003 | Greenberg |
| 2004/0128563 A1 | 7/2004 | Kaushik et al. |
| 2004/0199632 A1 | 10/2004 | Romero et al. |
| 2004/0215987 A1 | 10/2004 | Farkas et al. |
| 2004/0268354 A1 | 12/2004 | Kanai et al. |
| 2005/0022062 A1* | 1/2005 | Vorbach ............ 714/38 |
| 2005/0050373 A1 | 3/2005 | Orenstien et al. |
| 2005/0166074 A1 | 7/2005 | Hack |
| 2005/0203988 A1* | 9/2005 | Nollet et al. .......... 709/201 |
| 2005/0210304 A1 | 9/2005 | Hartung et al. |
| 2005/0223382 A1 | 10/2005 | Lippett |
| 2006/0069953 A1 | 3/2006 | Lippett et al. |
| 2006/0123264 A1 | 6/2006 | Bailey et al. |
| 2009/0037700 A1* | 2/2009 | Graham ............ 712/220 |

FOREIGN PATENT DOCUMENTS

| | | |
|---|---|---|
| JP | 04-283849 A | 10/1992 |
| JP | 05-233572 | 9/1993 |
| JP | 07-056863 | 3/1995 |
| JP | 08-006681 A | 1/1996 |
| JP | 09-185589 A | 7/1997 |
| JP | 09-274583 | 10/1997 |
| JP | H10-055284 | 2/1998 |
| JP | 11-202988 A | 7/1999 |
| JP | H11-249913 | 9/1999 |
| JP | 2000-029856 A | 1/2000 |
| JP | 2001-521218 | 11/2001 |
| JP | 2002-508102 | 3/2002 |
| JP | 2003-256067 A | 9/2003 |
| JP | 2004-065971 | 3/2004 |
| JP | 2005-505030 | 2/2005 |
| JP | 2005-100264 | 4/2005 |
| JP | 2005-141740 A | 6/2005 |
| JP | 2005-209198 A | 8/2005 |
| JP | 05-204674 | 2/2007 |
| JP | 2001-117786 | 4/2007 |
| TW | 200405201 A | 4/2004 |
| TW | 200511035 | 3/2005 |
| TW | 200515277 | 5/2005 |
| TW | 200519605 A | 6/2005 |
| TW | 200523802 | 7/2005 |
| TW | 1240163 | 9/2005 |
| WO | WO 99/21085 | 4/1999 |
| WO | WO 2006/030195 | 3/2006 |
| WO | WO 2006/058242 | 6/2006 |
| WO | WO 2007/029421 | 3/2007 |

OTHER PUBLICATIONS

Balasubramonian et al., "Memory Hierarchy Reconfiguration for Energy and Performance in General-Purpose Processor Architecture," IEEE, 2000.

Bouchhima, A. et al., "Fast and Accurate Timed Execution of High Level Embedded Software Using HW/SW Interface Simulation Model," Asia and South Pacific Design Automation Conference 2004, ASP-DAC 2004, IEEE, 2004, pp. 469-474.

Chen, G. et al., "Configuration-Sensitive Process Scheduling for FPGA-Based Computing Platforms," IEEE Proceedings for Design, Automation and Test in Europe Conference and Exhibition, Date'04, Feb. 16, 2004, pp. 486-491.

Chen, T-F. et al., "Flexible Heterogeneous Multicore Architectures for Versatile Media Processing Via Customized Long Instruction Words," IEEE Transactions on Circuits and Systems for Video Technology, IEEE, May 2005, pp. 659-672, vol. 15, No. 5.

Chinese Office Action, Chinese Patent Application No. 200610131758.4, Jun. 19, 2009, 10 pages.

Clark, N., "Using an FPGA as a Prototyping Platform for Multi-Core Processor Applications," Feb. 13, 2005, 1 page [Online] [Retrieved on Mar. 19, 2008] Retrieved from the Internet<URL:http://www.cag.csail.mit.edu/warfp2005/submissions/30-cla--rk.pdf>.

European Extended Search Report, European Patent Application No. 10192097.3, Apr. 28, 2011, 6 pages.

European Extended Search Report, European Patent Application No. 10192098.1, Apr. 28, 2011, 8 pages.

European Examination Report, European Patent Application No. 10192098.1, Feb. 17, 2012, 5 pages.

European Partial Search Report, European Patent Application No. 06254991.0, Dec. 17, 2007, 6 pages.

European Extended Search Report, European Patent Application No. 06254991.0, Apr. 8, 2008, 17 pages.

European Examination Report, European Patent Application No. 06254991.0, Nov. 12, 2008, 1 page.

Greskamp, B. et al., "A Virtual Machine for Merit-Based Runtime Reconfiguration," Proceedings of the 13.sup.th Annual IEEE Symposium on Field-Programmable Custom Computing Machines, FCCM 2005, IEEE, Apr. 18, 2005, pp. 287-288.

Hsu, C-M. et al., "Flexible Heterogeneous Militcore Architectures for Versatile Media Processing Via Customized Long Instruction Words," IEEE, May 5, 2005, pp. 659-672.

Japanese Office Action, Japanese Application No. 2006-270890, Jun. 14, 2011, 6 pages.

Japanese Final Office Action, Japanese Application No. 2006-270890, Sep. 18, 2012, 9 pages.

Japanese Office Action, Japanese Application No. 2011-273805, Apr. 16, 2013, 4 pages.

Korean First Office Action, Korean Application No. 10-2006-0097396, Mar. 12, 2013, 12 pages.

Korean Second Office Action, Korean Application No. 10-2006-0097396, Jun. 27, 2013, 5 pages.

Korean First Office Action, Korean Application No. 10-2013-0067351, Aug. 19, 2013, 5 pages.

Liao, C. et al., "Evaluating OpenMP on Chip Multithreading Platforms," Technical Report No. UH-CS-05-12, Jul. 6, 2005, 10 pages.

Musliner, D.J. et al., "Contract-Based Distributed Scheduling for Distributed Processing," Papers from the 19997 AAAI Workshop, IEEE, Jul. 1997, pp. 118-128.

Regehr, J.D., "Using Hierarchical Scheduling to Support Soft Real-Time Applications in General-Purpose Operating Systems," May 2001, Dissertation, University of Virginia, 182 pages.

Suh, et al., "A New Memory Monitoring Scheme for Memory-Aware Scheduling and Partitioning," Proceedings of the 8.sup.th International Symposium on High-Performance Computer Architecture, Feb. 2002.

(56) References Cited

OTHER PUBLICATIONS

Sullivan, C. et al., "Deterministic Hardware Synthesis for Compiling High-Level Descriptions to Heterogeneous Reconfigurable Architectures," Proceedings of the 38.sup.th Hawaii International Conference on System Sciences, Jan. 6, 2005, pp. 1-9.
Taiwan Office Action, Taiwan Application No. 095136470, Nov. 26, 2012, 6 pages.
United States Office Action, U.S. Appl. No. 11/540,146, Oct. 16, 2013, 10 pages.
United States Office Action, U.S. Appl. No. 11/540,146, Jun. 11, 2012, 10 pages.
United States Office Action, U.S. Appl. No. 11/540,146, Mar. 5, 2012, 10 pages.
United States Office Action, U.S. Appl. No. 11/540,146, Feb. 12, 2010, 10 pages.
United States Office Action, U.S. Appl. No. 11/540,146, Oct. 19, 2009, 10 pages.
United States Office Action, U.S. Appl. No. 11/540,146, Mar. 30, 2009, 10 pages.
United States Office Action, U.S. Appl. No. 11/540,146, Oct. 14, 2008, 10 pages.
United States Office Action, U.S. Appl. No. 13/965,124, Feb. 11, 2014, 6 pages.
Japanese Office Action, Japanese Application No. P2013-146711, May 20, 2014, 4 pages.
PCT International Search Report, PCT Application No. PCT/GB2005/003525, Nov. 14, 2006, 5 pages.
PCT Written Opinion, PCT Application No. PCT/GB2005/003525, Nov. 14, 2006, 6 pages.
Mitchell, E., "Multi-Core and Multi-Threaded SoCs Present New Debugging Challenges," Datasheet MIPS Technologies, Aug. 2003, pp. 1-6.
Rosenberg, J.B., "How Debuggers Work?" John Wiley & Sons, 1996, Chapter 9: "Multithreaded Debugging,".
Beynon, M.D. et al., "Low-Cost Non-Intrusive Debugging Strategies for Distributed Parallel Programs," 2002 IEEE International Conference on Cluster Computing, IEEE, Sep. 23, 2002, pp. 439-442.
PCT International Search Report, PCT Application No. PCT/GB2005/001154, 5 pages.
PCT Written Opinion, PCT Application No. PCT/GB2005/001154, Aug. 12, 2005, 7 pages.
Arison, D. et al., "System Application of a New 32-Bit Floating-Point DSP Processor," Twenty-Second Asilomar Conference on Signals, Systems & Computers, 22ACSSC--12/88, Oct. 31-Nov. 2, 1988, pp. 890-897, vol. 2.
Kasahara, H. et al., "Parallel Processing of Near Fine Grain Tasks Using Static Scheduling on Oscar (Optimally Scheduled Advanced Multiprocessor)," Proceedings of the Supercomputing Conference, IEEE, Nov. 12-16, 1990, pp. 856-864, vol. Conf. 3.
Arora, N.S., "Thread Scheduling for Multiprogrammed Multiprocessors," Theory of Computing Systems, 2001, pp. 115-144, vol. 34.
United States Office Action, U.S. Appl. No. 14/267,830, Mar. 4, 2015, 7 pages.
United States Office Action, U.S. Appl. No. 14/267,830, Nov. 25, 2014, 6 pages.
Indian First Office Action, Indian Application No. 1820/CHE/2006, Jul. 27, 2015, 2 pages.
European Summons to Attend Oral Proceedings Pursuant to Rule 115(1) EPC, European Application No. 06254991.0, Nov. 3, 2015, 6 pages.
European Summons to Attend Oral Proceedings Pursuant to Rule 115(1) EPC, European Application No. 10192097.3, Oct. 27, 2015, 6 pages.
Benini, L. et al., "A Survey of Design Techniques for System-Level Dynamic Power Management," IEEE Transactions on Very Large Scale Integration (VLSI) Systems, IEEE Service Center, Piscataway, NJ, USA, Jun. 1, 2000, pp. 299-316, vol. 8, No. 2.
European Third Examination Report, European Application No. 06254991.0, May 15, 2015, 5 pages.
European Second Examination Report, European Application No. 10192097.3, May 21, 2015, 8 pages.
Taiwan Search Report, Taiwan Application No. 102118987, Dec. 16, 2014, 1 page.
Taiwan Search Report, Taiwan Application No. 102118985, Dec. 17, 2014, 1 page.
European First Examination Report, European Application No. 10192097.3, Oct. 14, 2014, 7 pages.
European Second Examination Report, European Application No. 06254991.0, Oct. 14, 2014, 5 pages.

\* cited by examiner

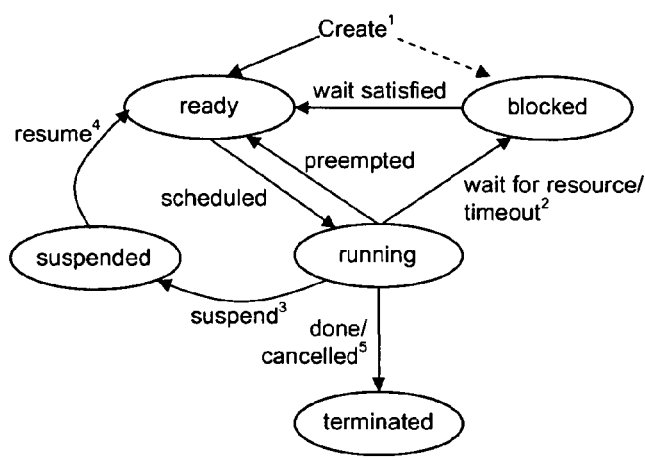
Figure 1: Task state diagram
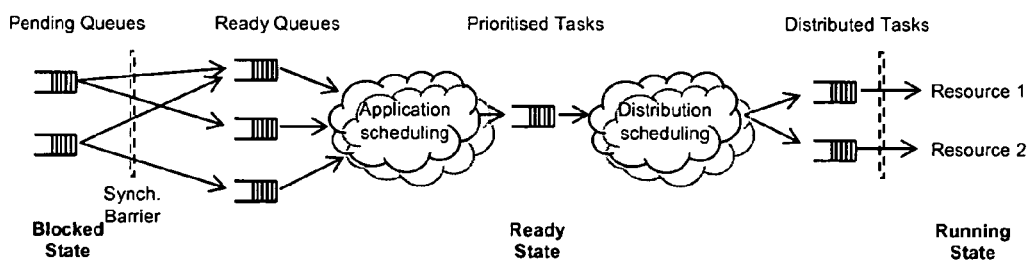
Figure 2

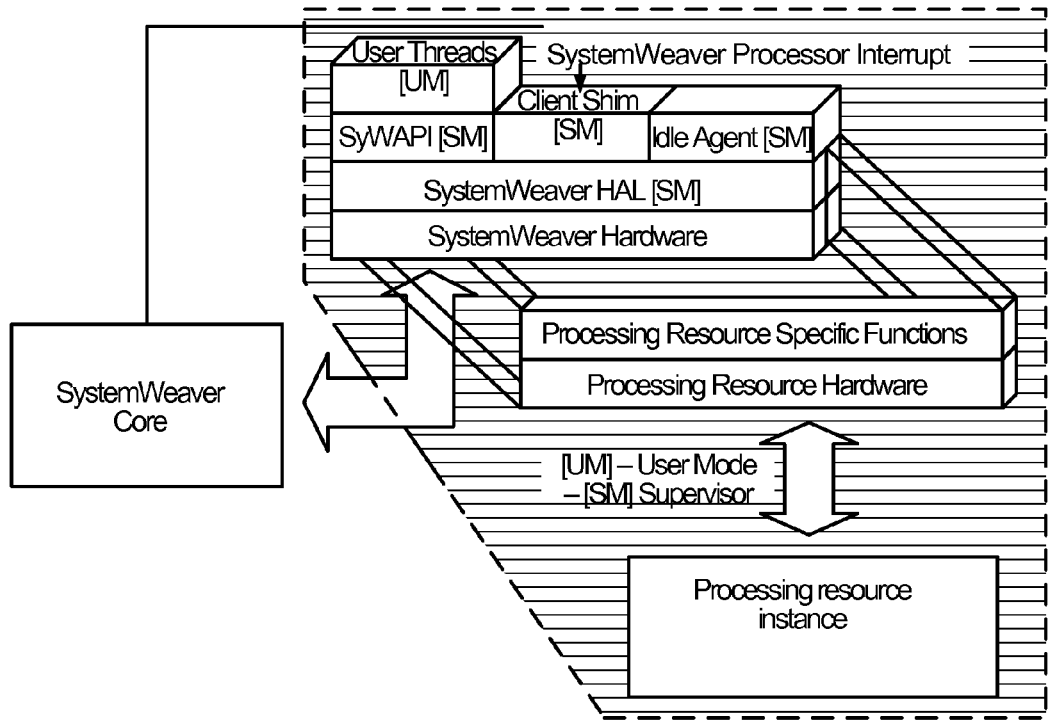
Figure 3: Thread management and allocation system components
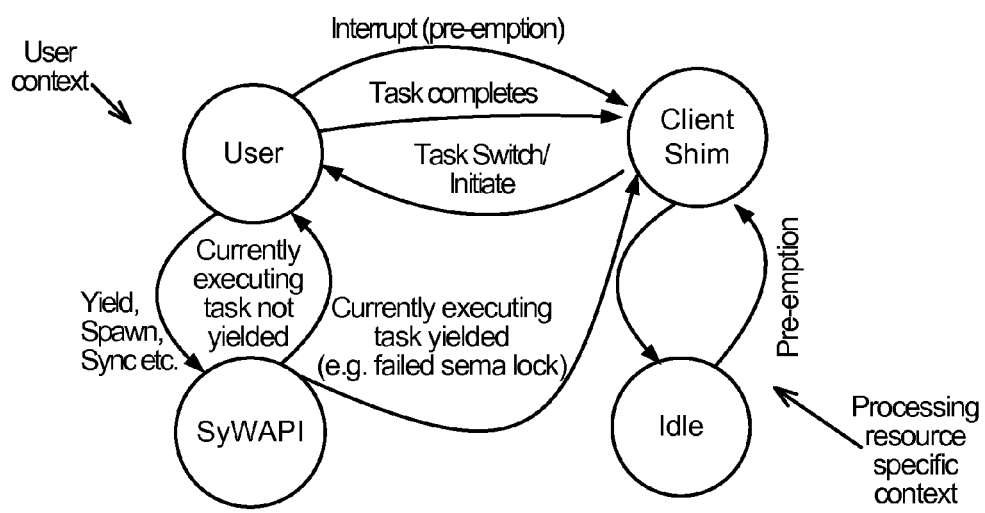
Figure 4: Thread management and allocation system client state machine

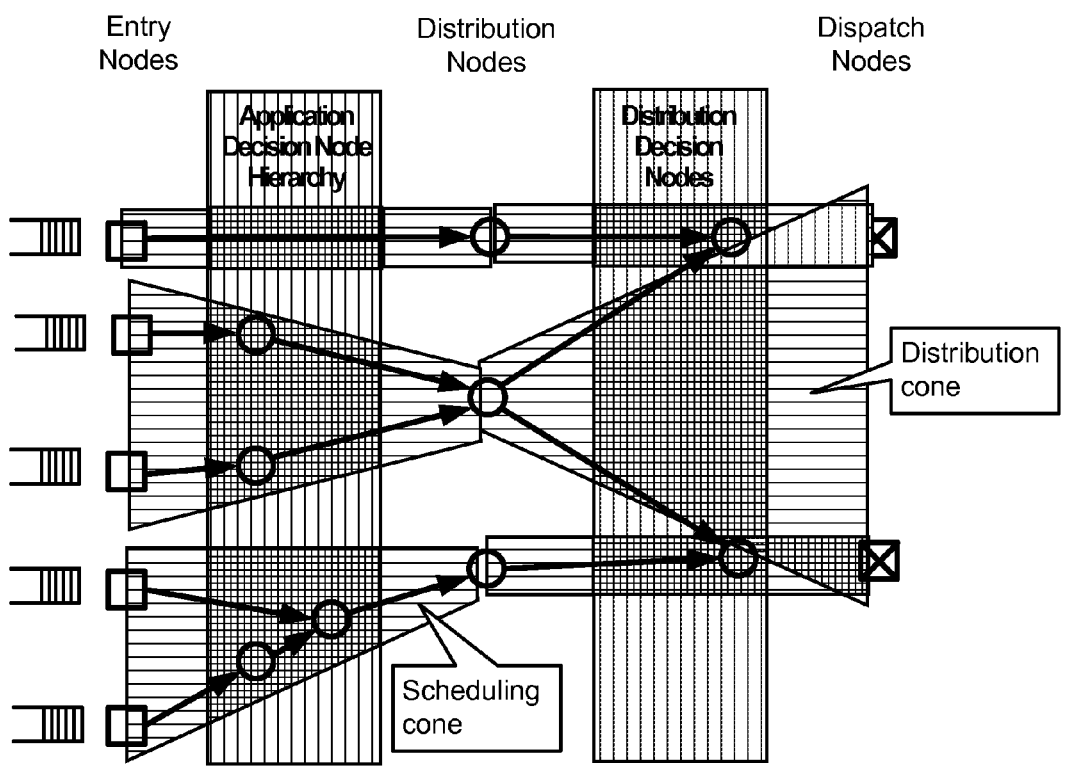
Figure 5: Conceptual scheduling structure
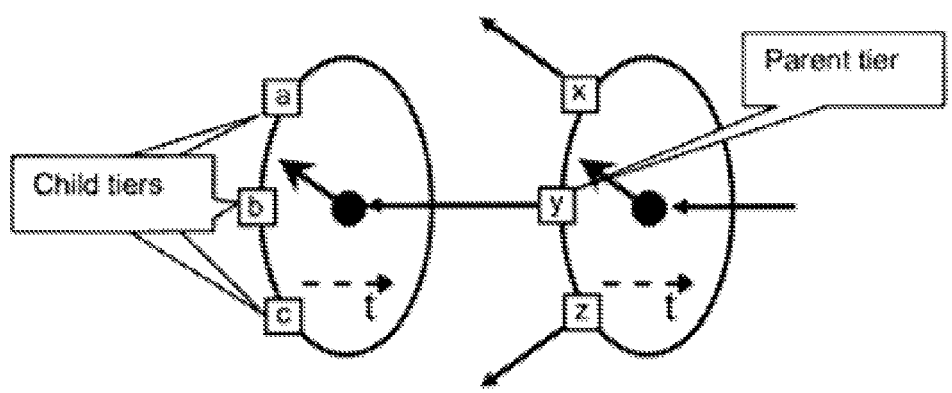
Figure 6: Parent and child scheduler relationships

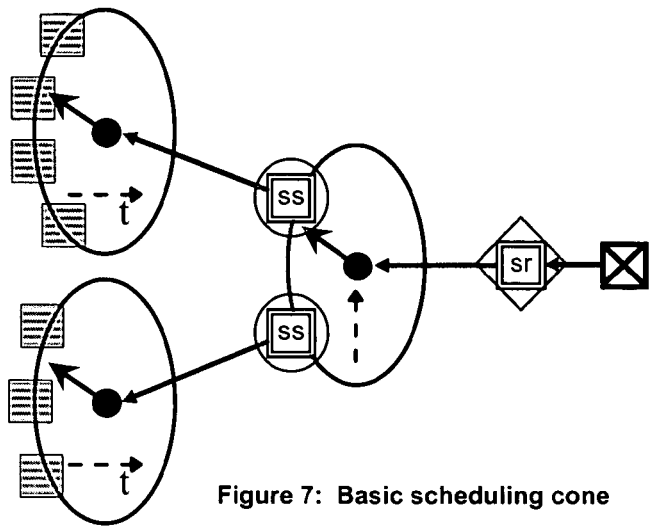
Figure 7: Basic scheduling cone
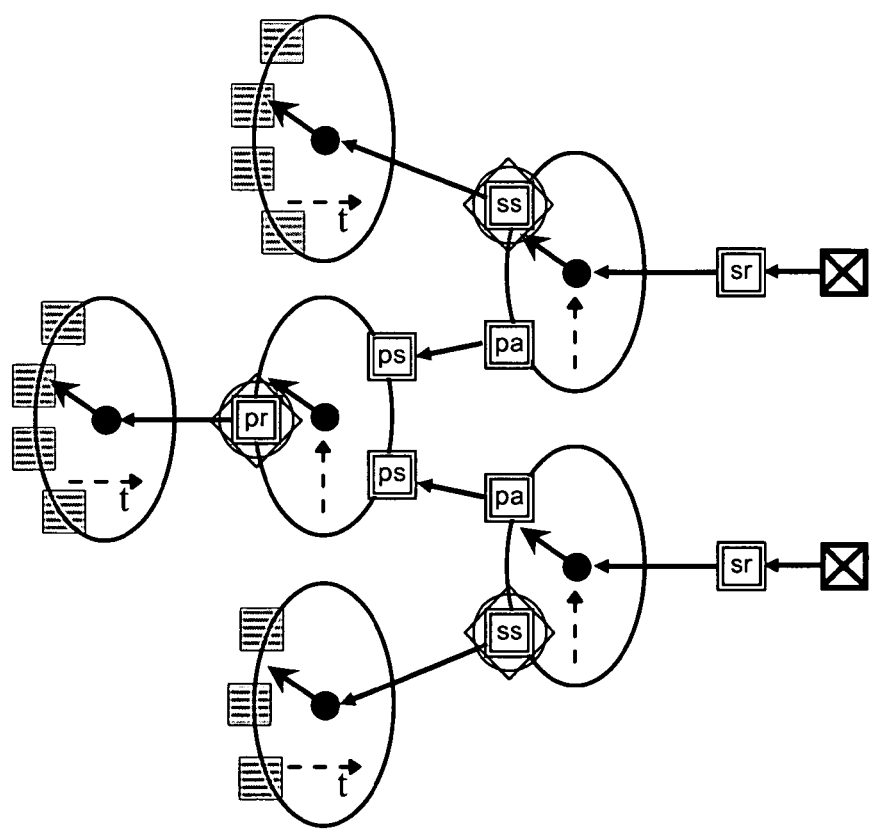
Figure 8: A typical processing resource pool

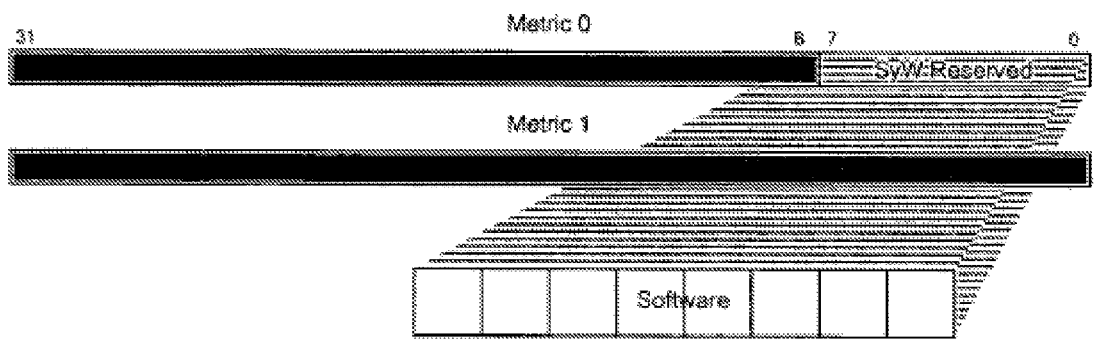
Figure 9: Task descriptor metrics
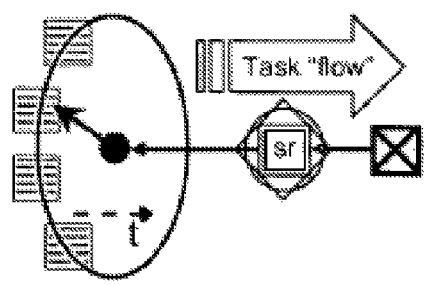
Figure 10
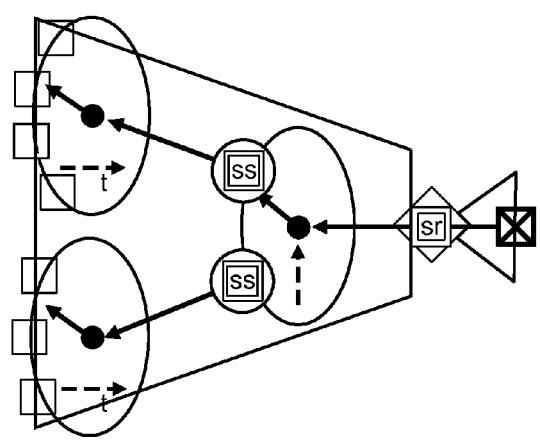
Figure 11: Example single Processing Resource Instance scheduling hierarchy

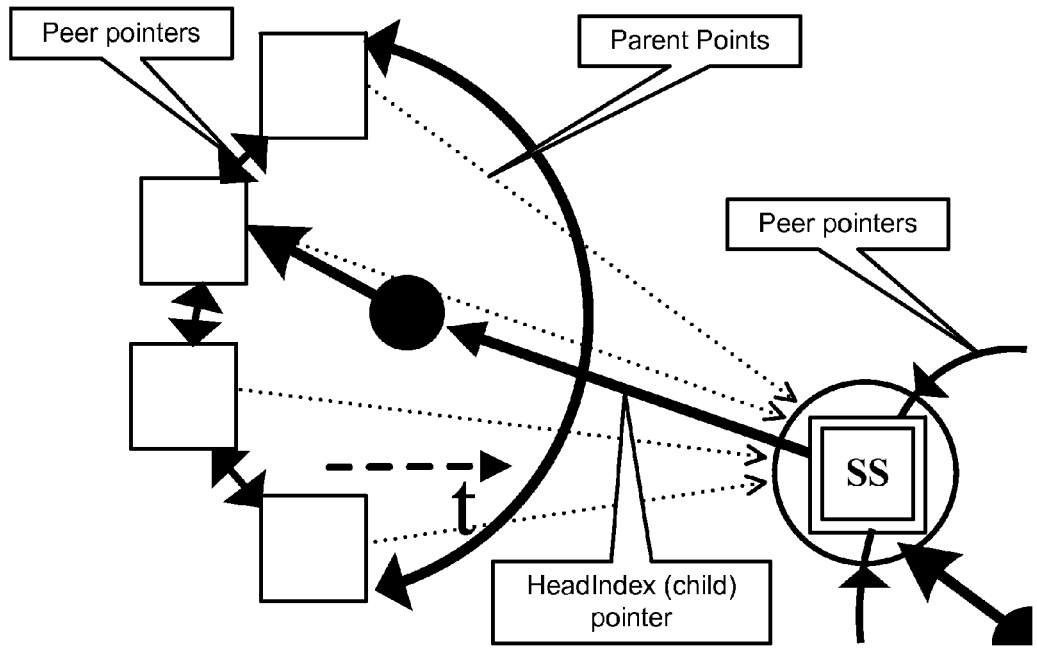
Figure 12: Scheduling tier pointer configuration
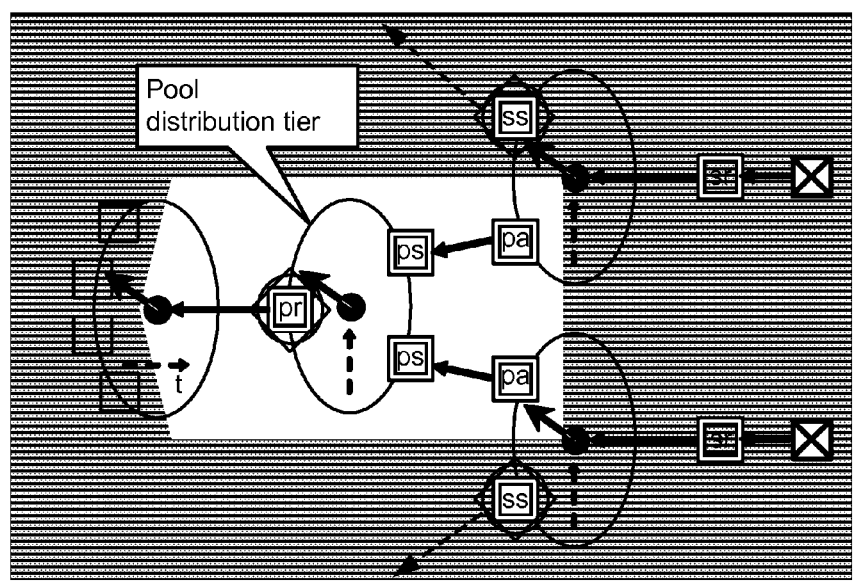
Figure 13: Pool distribution tier structure

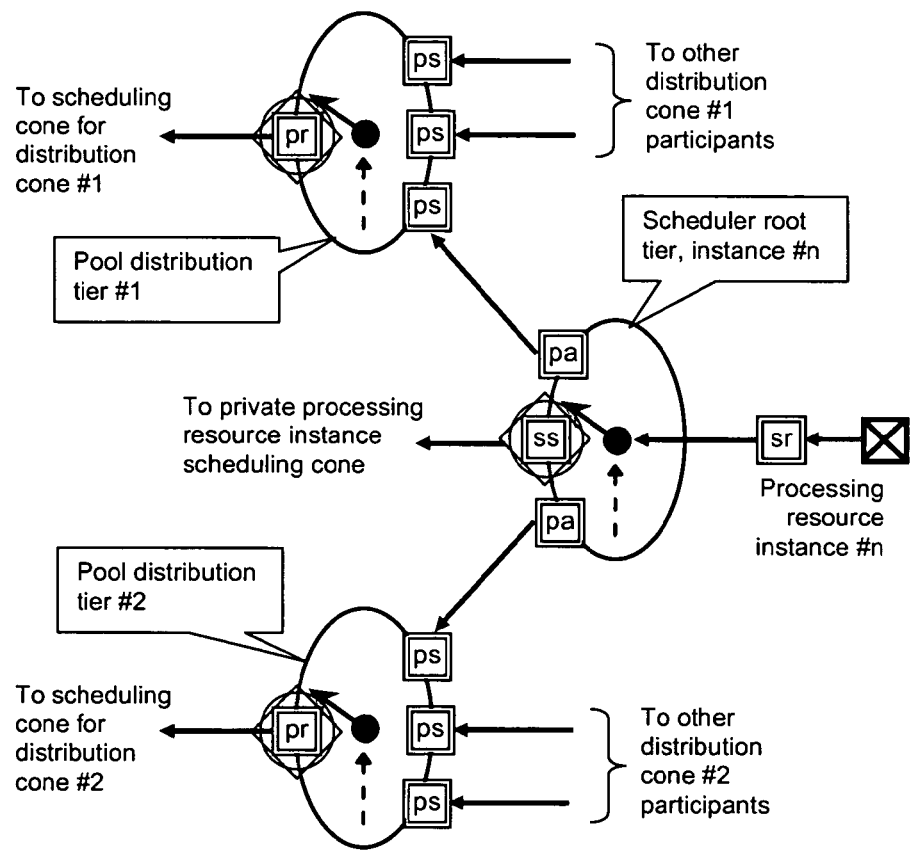
Figure 14: Example of a processing resource participating in multiple distribution cones

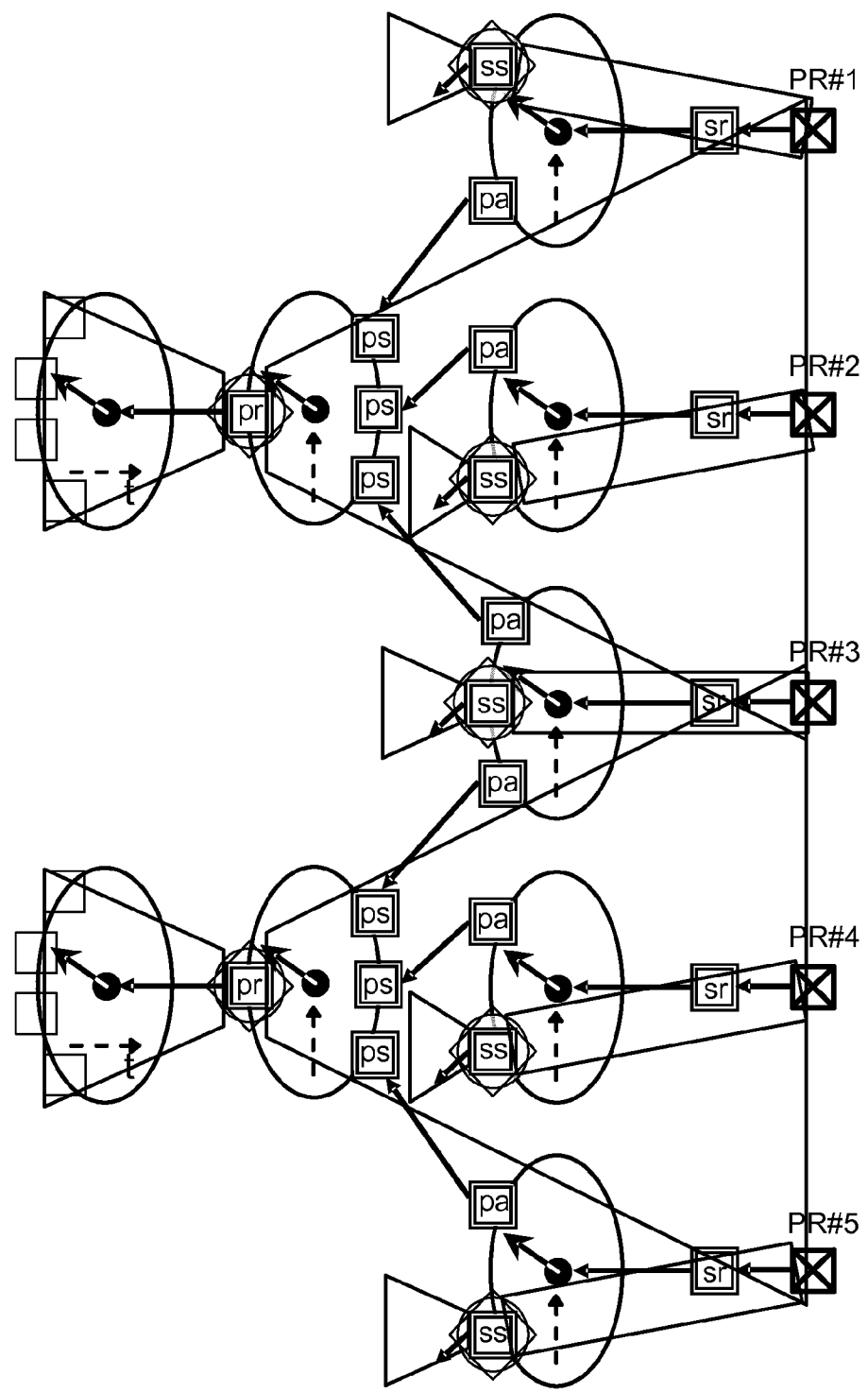
Figure 15 : A 5 processor configuration with two distribution pools

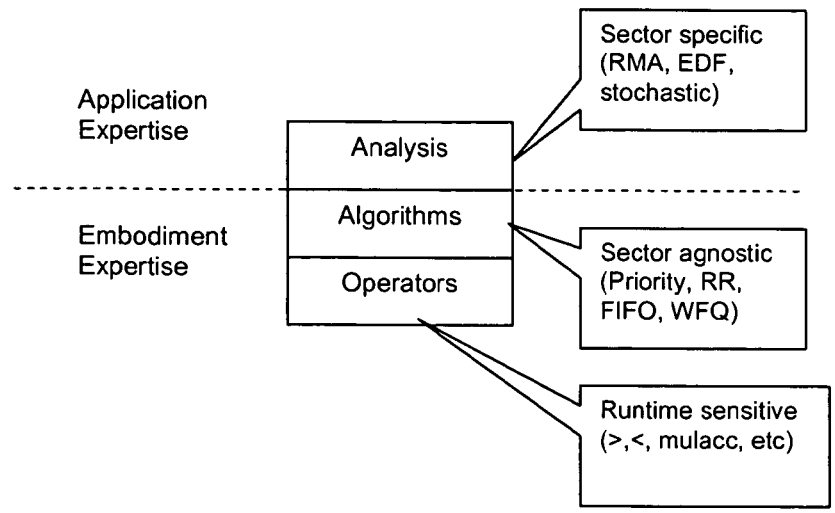
Figure 16: Scheduling analysis, policies and operators
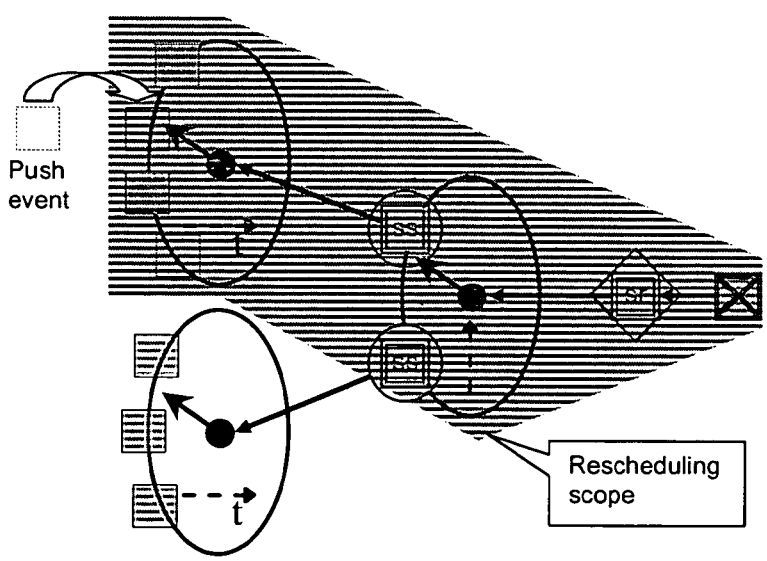
Figure 17: Rescheduling scope for a simple push operation

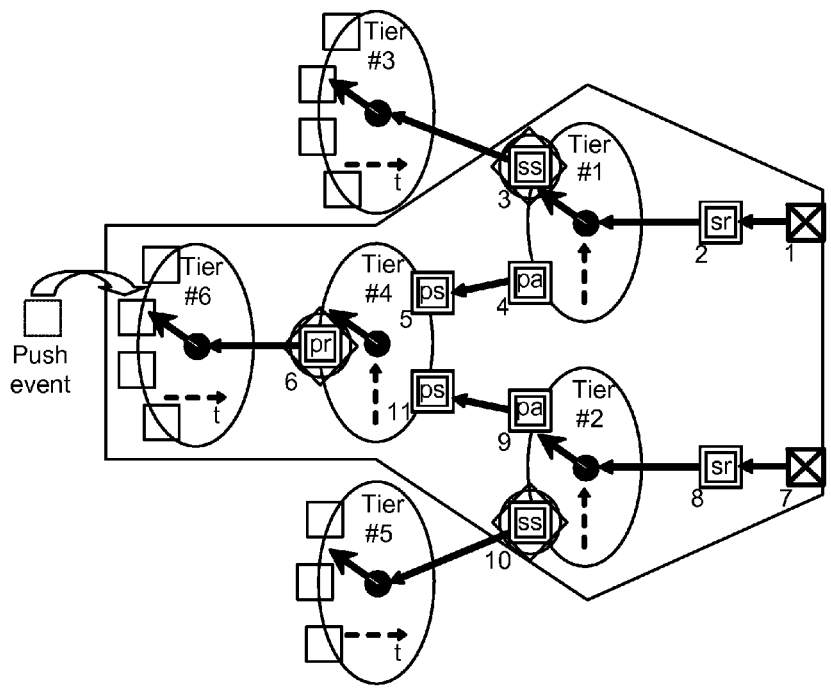
Figure 18: Rescheduling scope for a simple scheduling and distribution cone
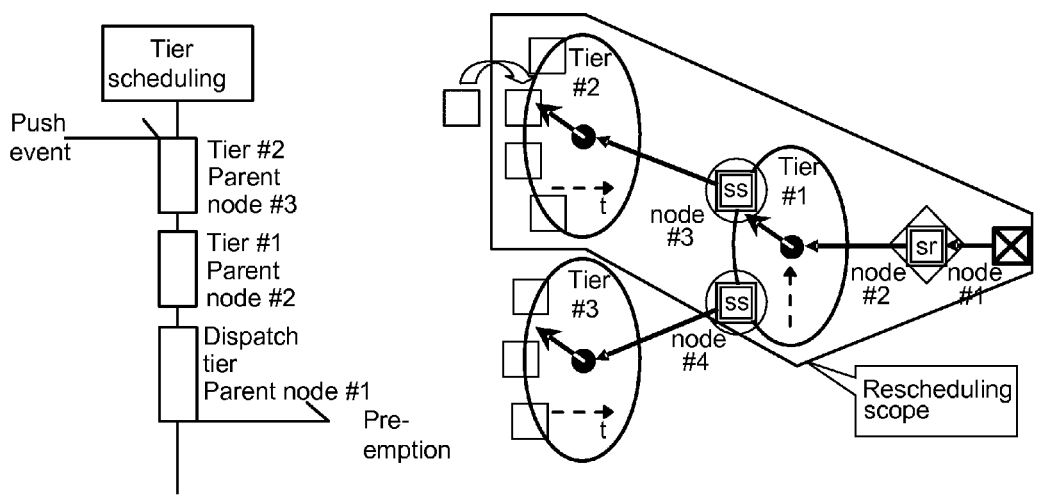
Figure 19: Rescheduling scope for a simple push operation

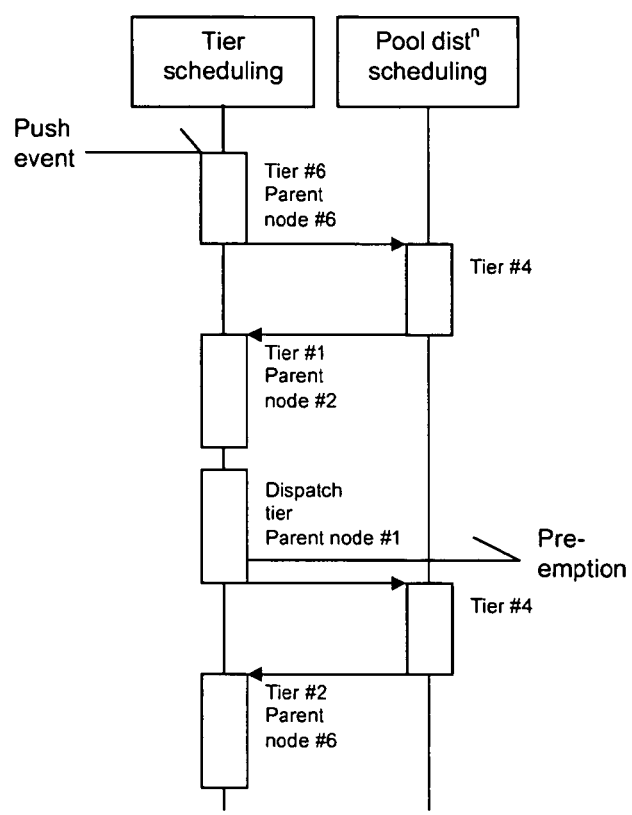
Figure 20: Rescheduling sequence for a push to a pool distribution node

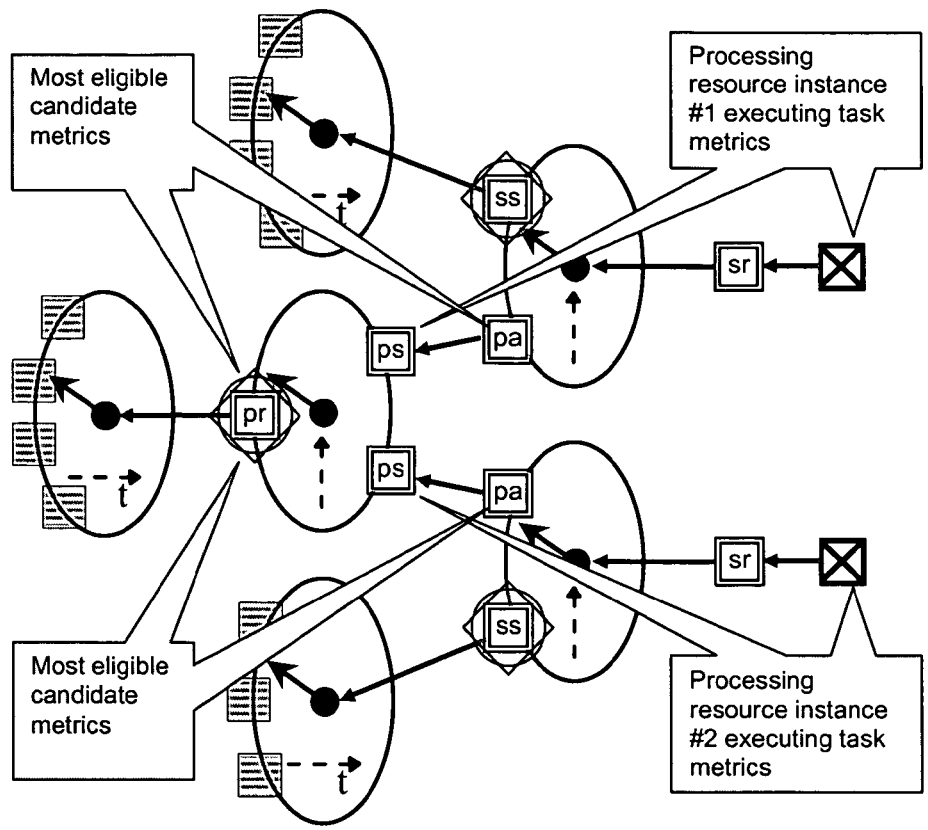
Figure 21: Metric propagation in processing resource pools
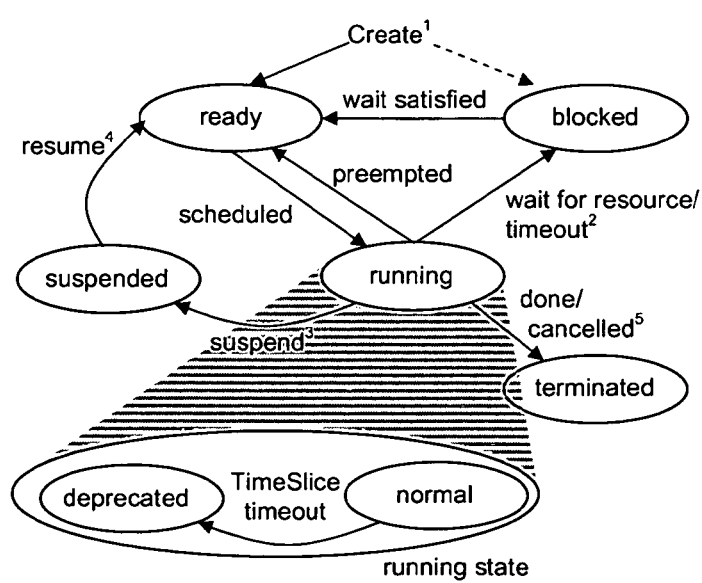
Figure 22: Task state diagram

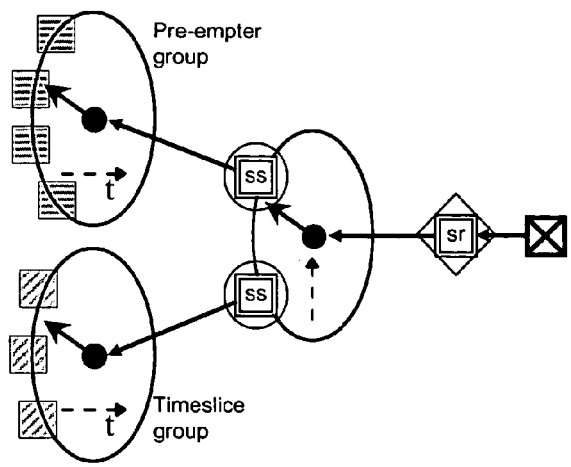
Figure 23: Example timeslice configuration
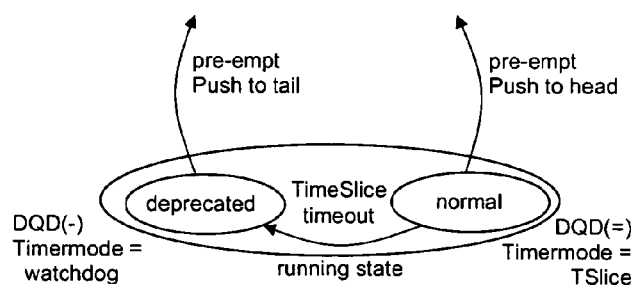
Figure 24: Task priority delta diagram
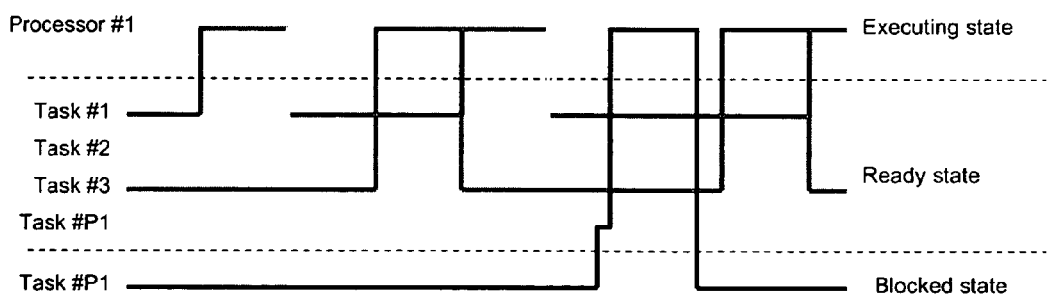
Figure 25: Single processor 3 timeslice, 1 pre-emption

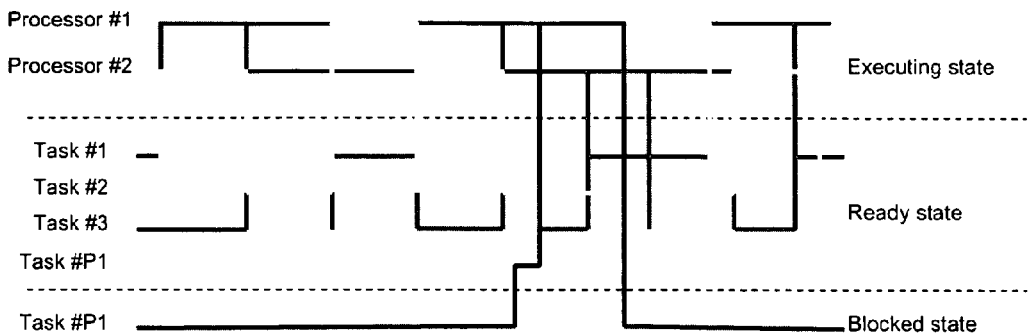
Figure 26: Dual processor 3 timeslice tasks, 1 pre-emption task
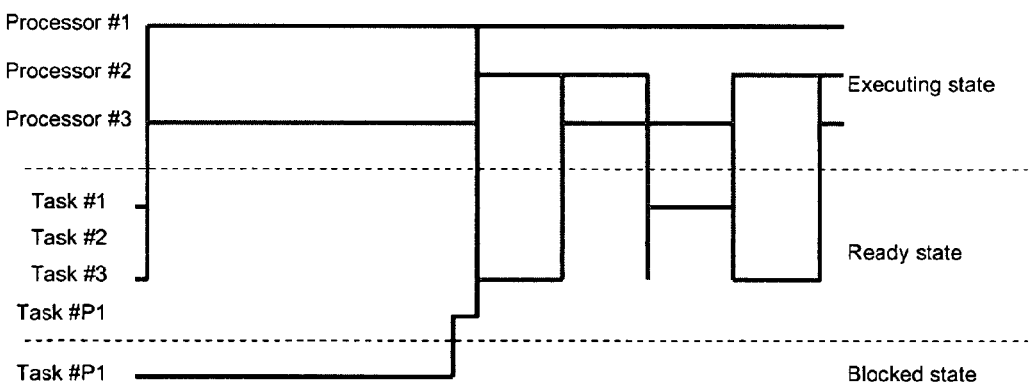
Figure 27: Three processor 3 timeslice tasks, 1 pre-emption task

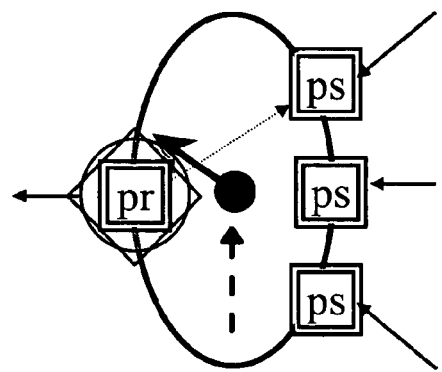
Figure 28: Distribution tier scheduling
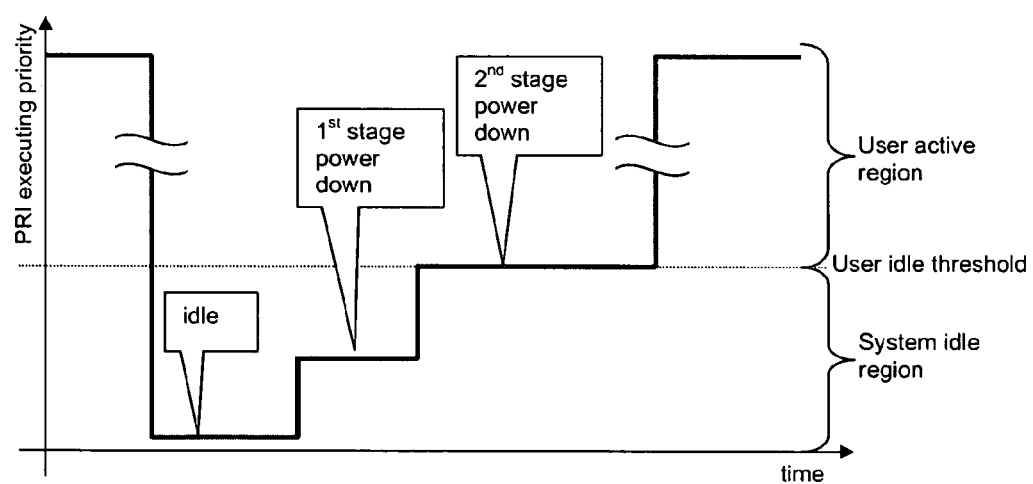
Figure 29: Example client shim power-down

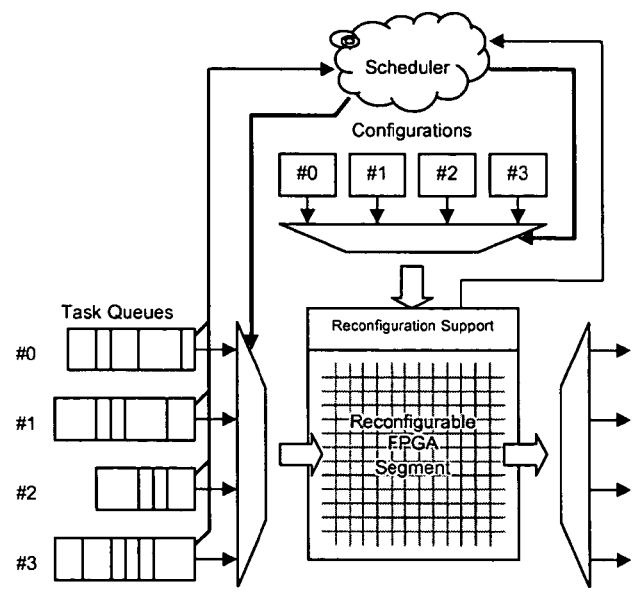
Figure 30: Reconfiguration Management Architecture
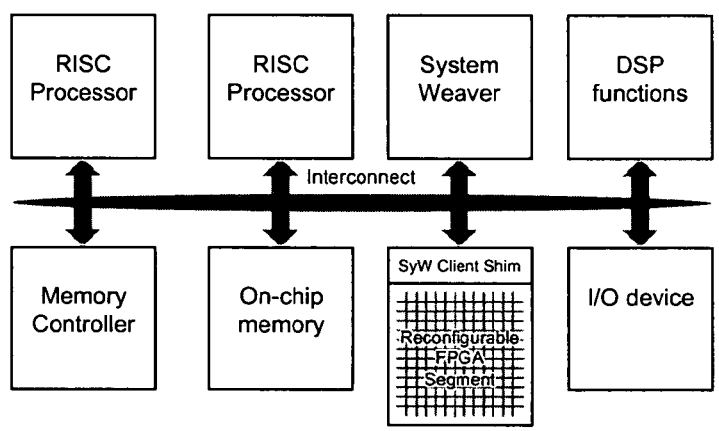
Figure 31: Example SystemWeaver System Architecture

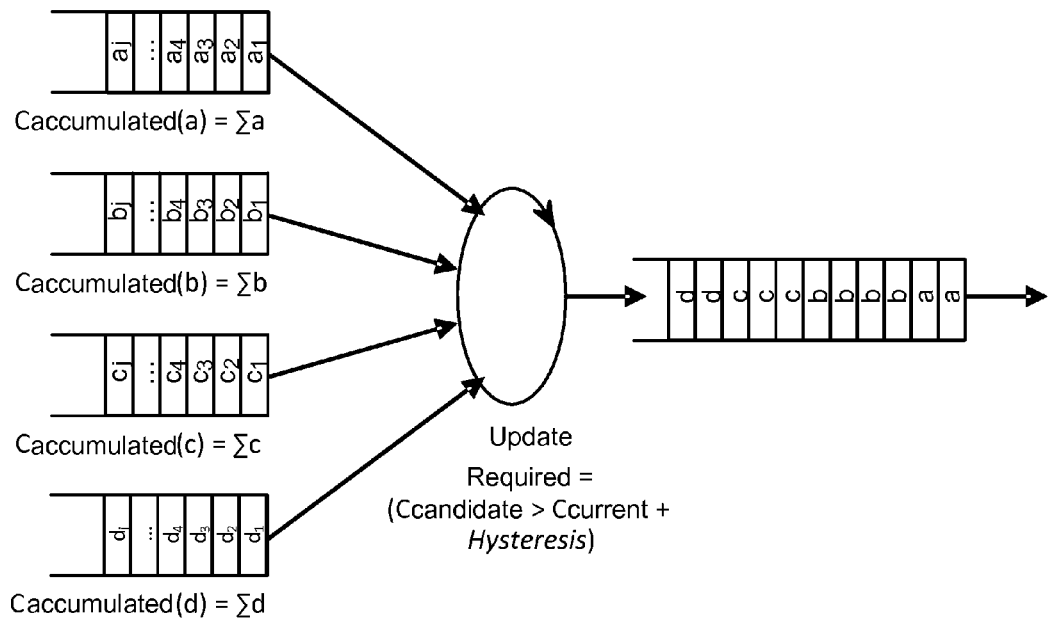
Figure 32: Scheduler grouping for minimal context thrashing
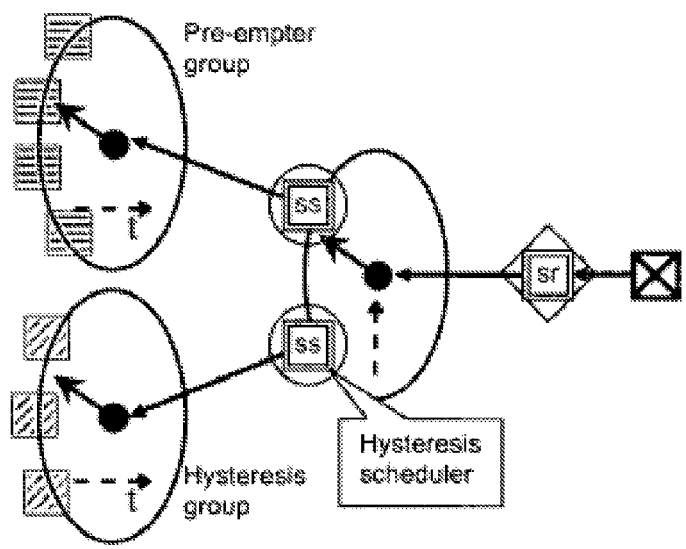
Figure 33: Example hysteresis scheduling configuration

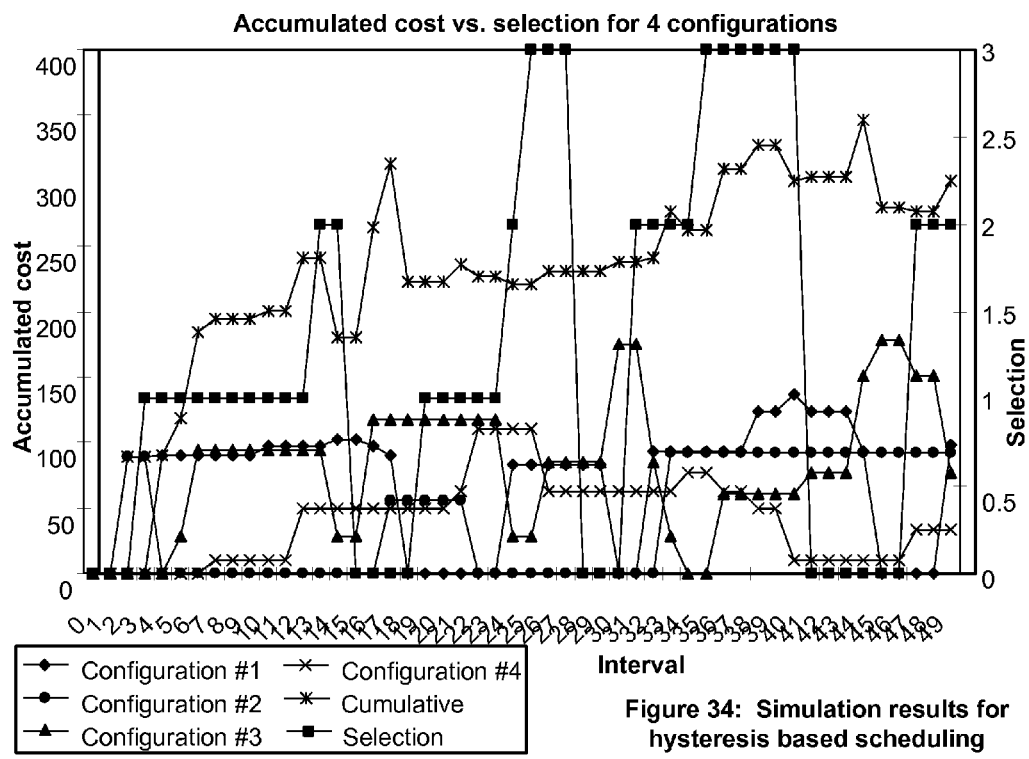
Figure 34: Simulation results for hysteresis based scheduling
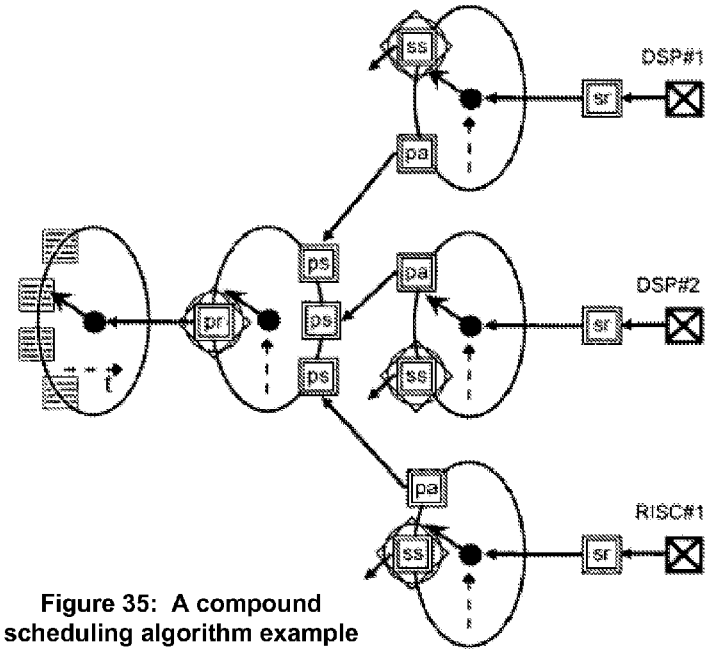
Figure 35: A compound scheduling algorithm example

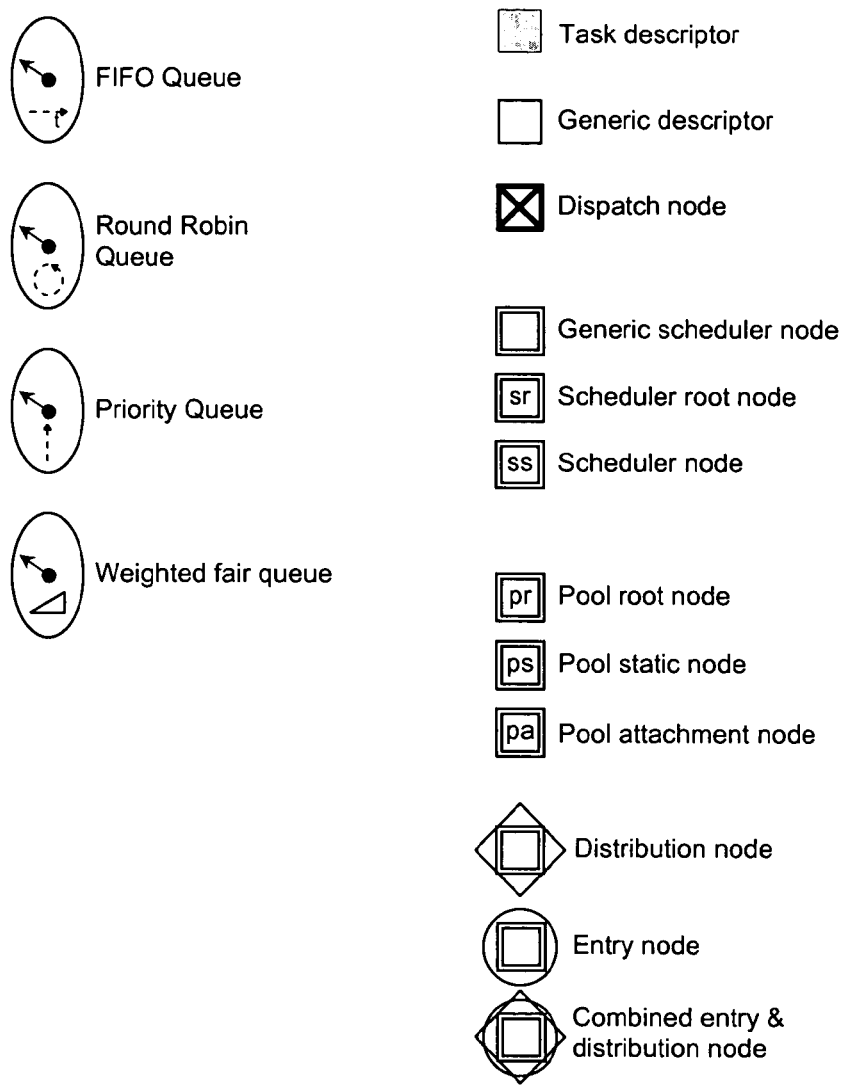
Figure 36: Key to scheduling diagrams

Figure 39: SystemWeaver server conceptual diagram

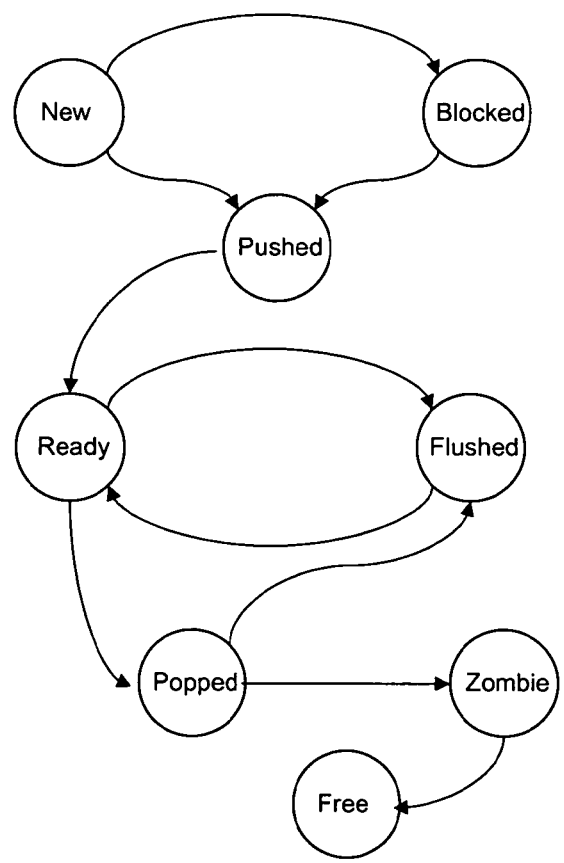
Figure 41: SystemWeaver internal thread state diagram

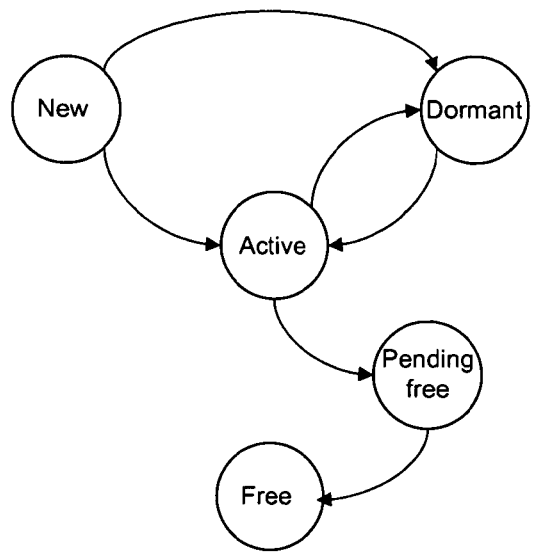
Figure 42: SystemWeaver scheduler tier state diagram
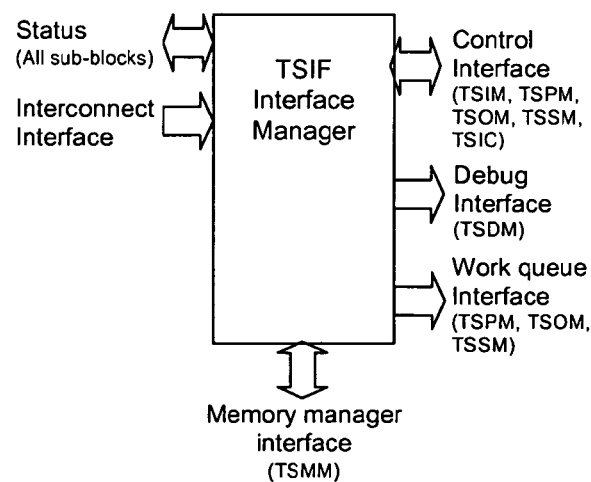
Figure 43: TSIF primary IO

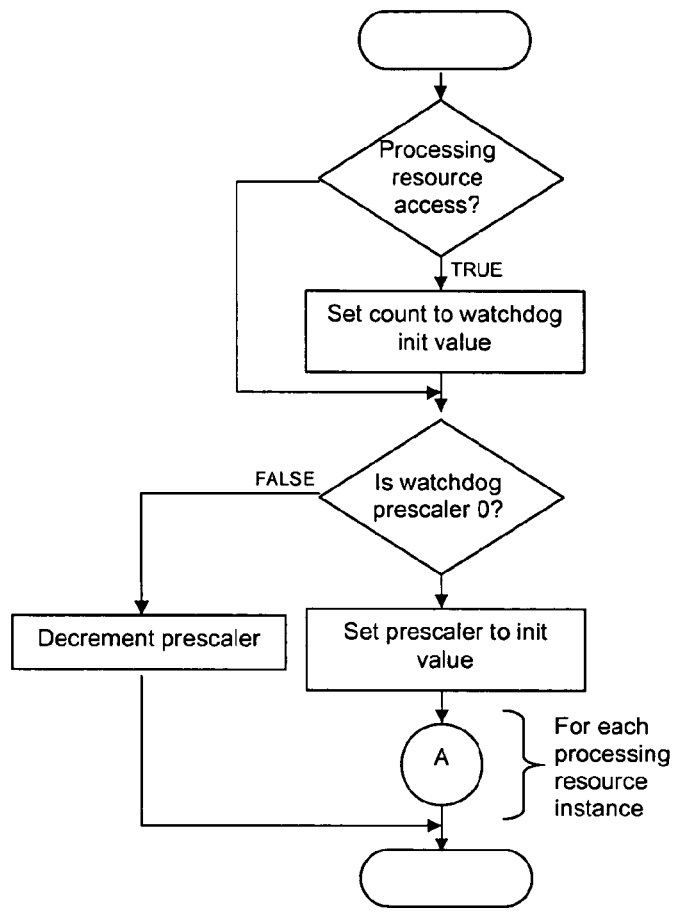
Figure 44: Watchdog interrupt control per cycle
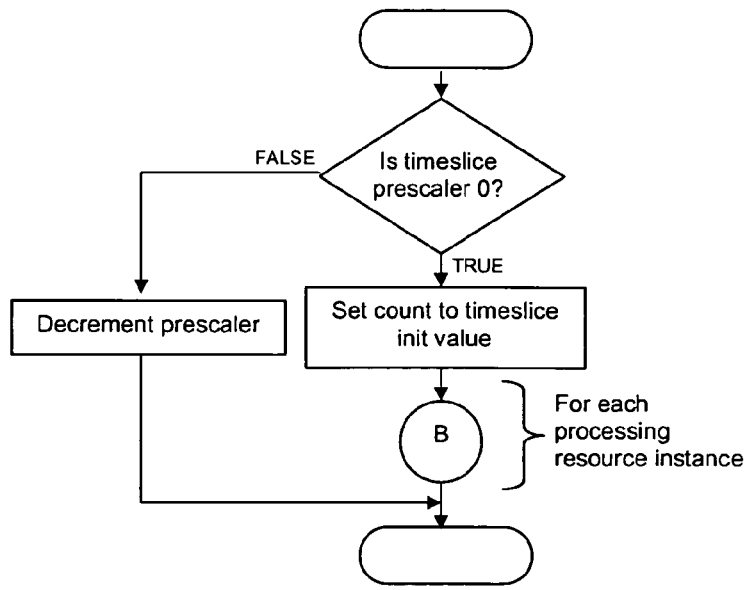
Figure 45: Timeslice control

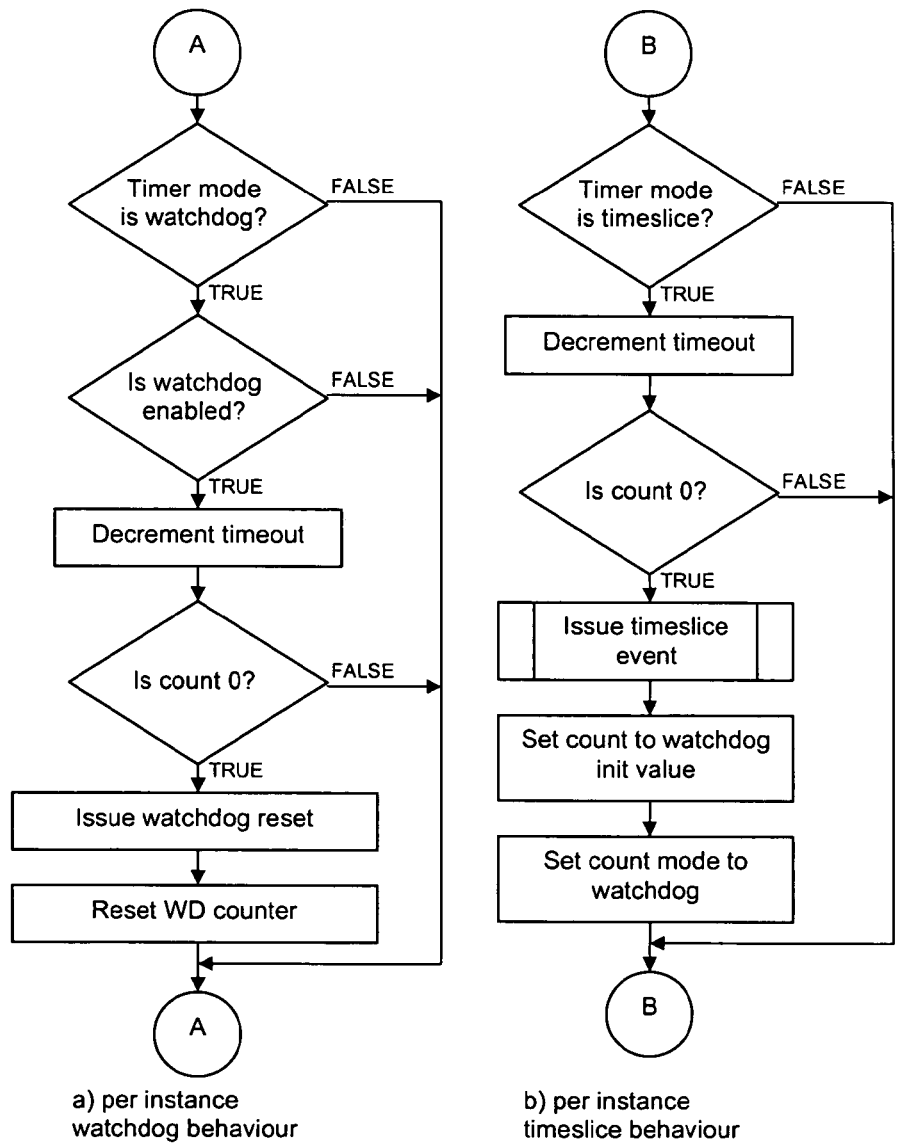
Figure 46: Active timer cycle flow diagram

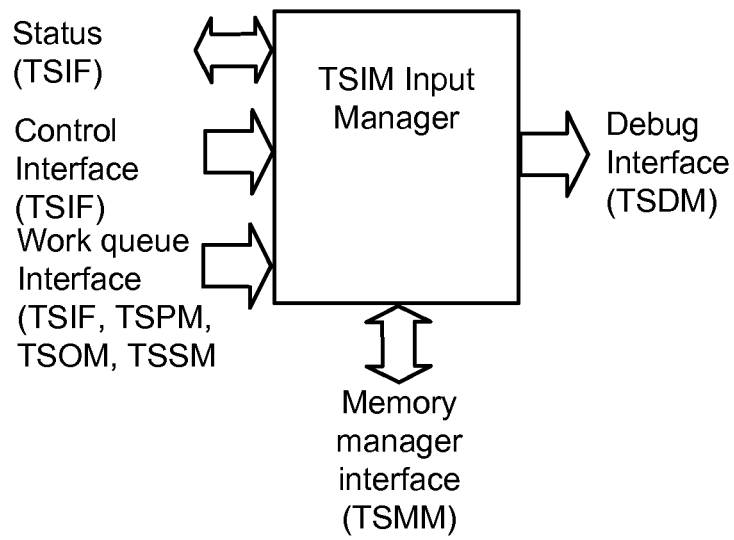
Figure 47: TSIM primary IO
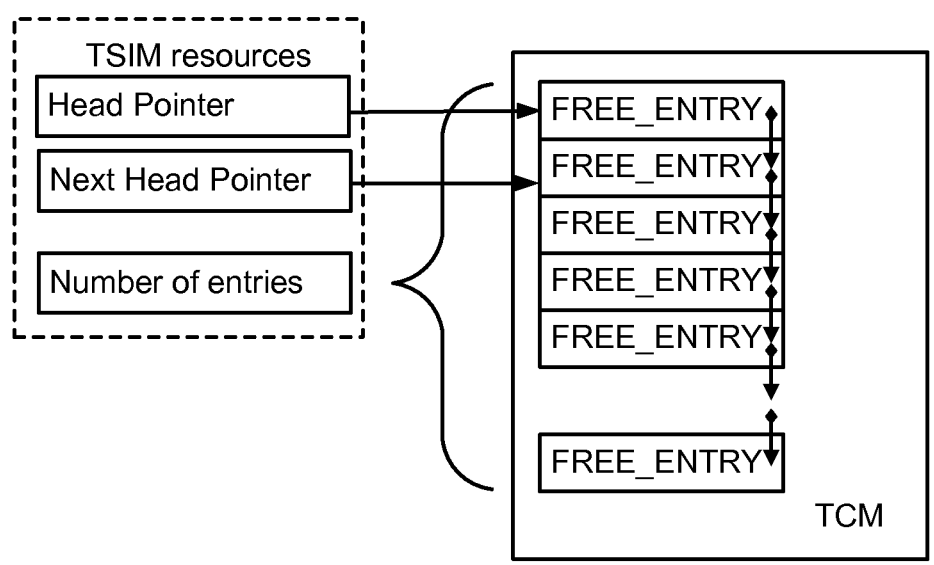
Figure 48: TSIM internal architecture

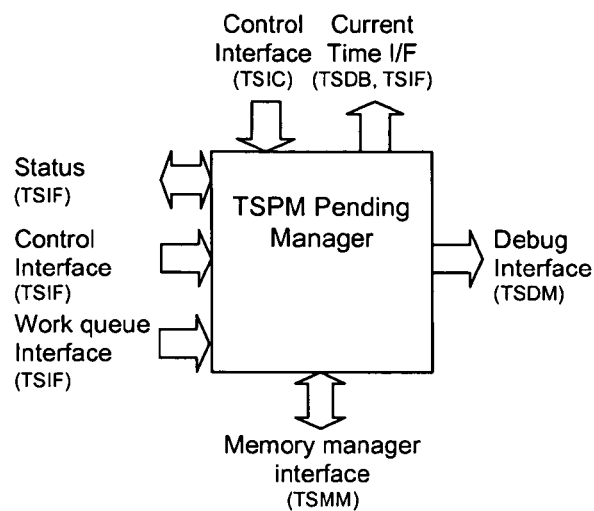
Figure 49: TSPM primary IO
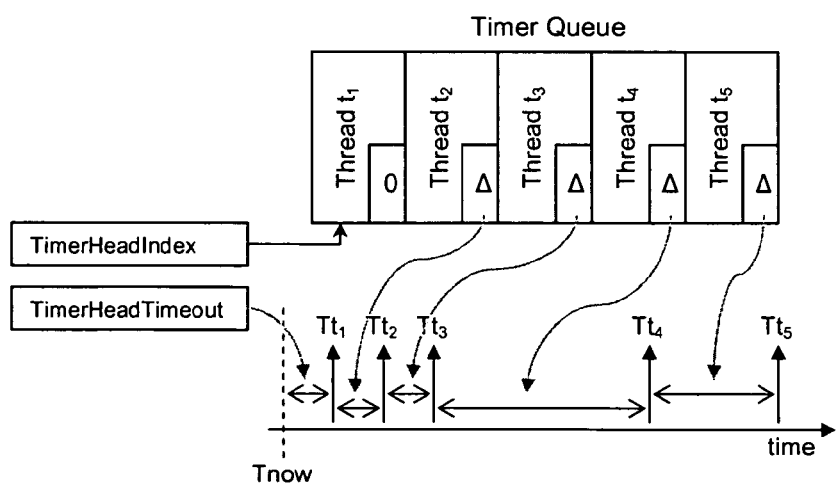
Figure 51: Basic timer queue structure (wait state)

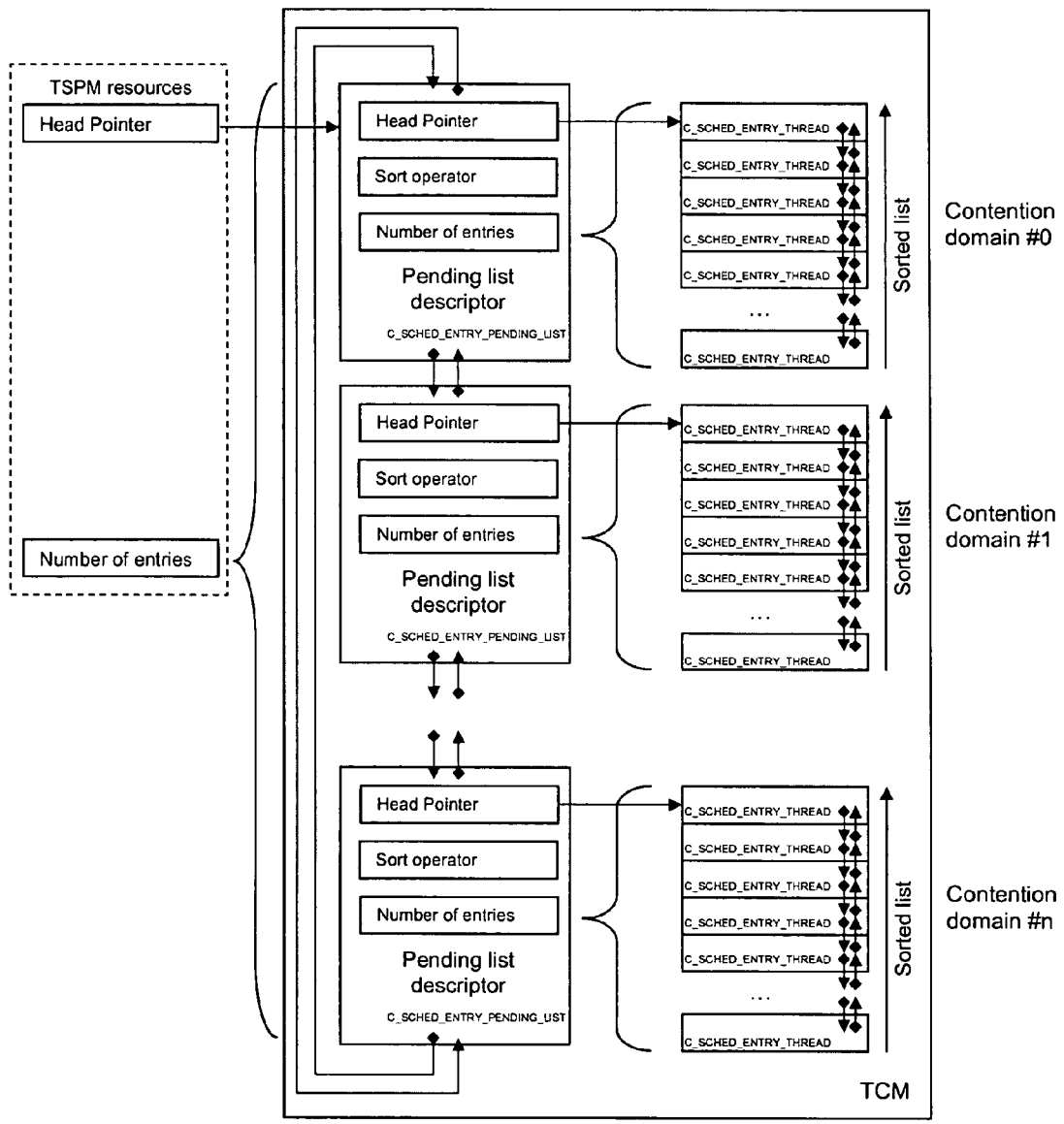
Figure 50: TSPM pending queue structure

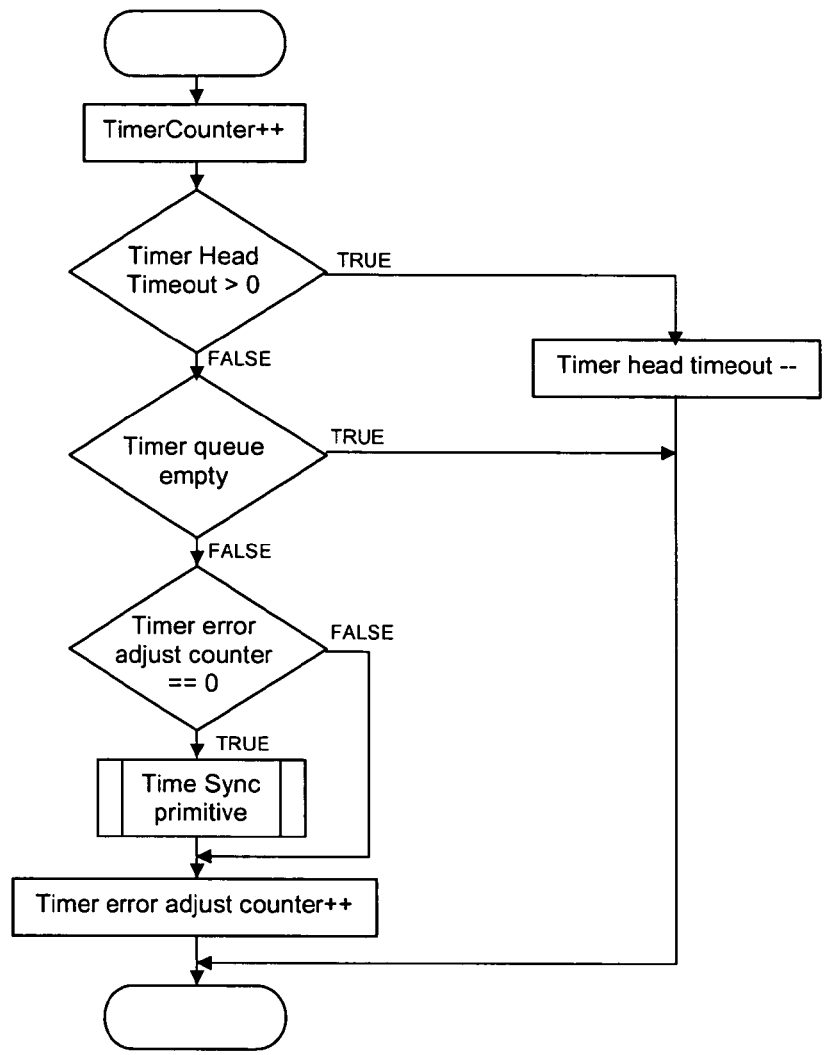
Figure 52: Active timer cycle flow diagram
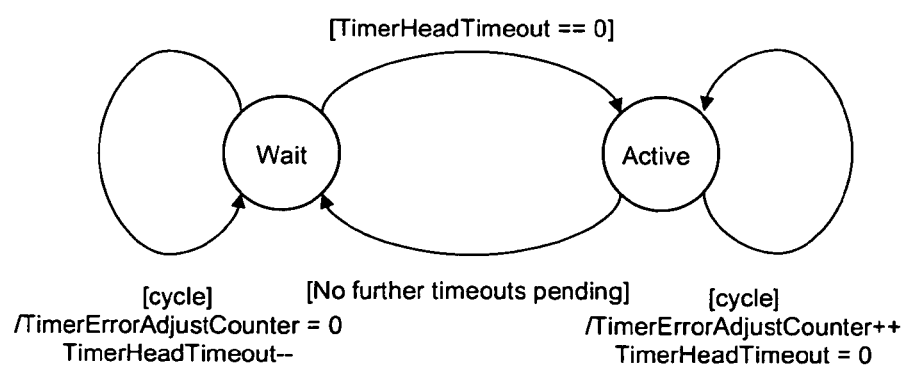
Figure 53: Basic timeout state machine

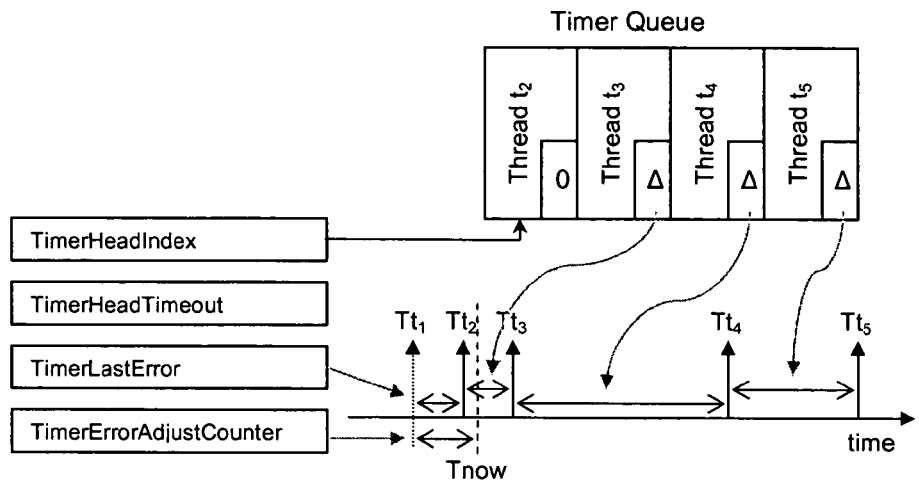
Figure 54: Basic timer queue structure after pop of thread 1
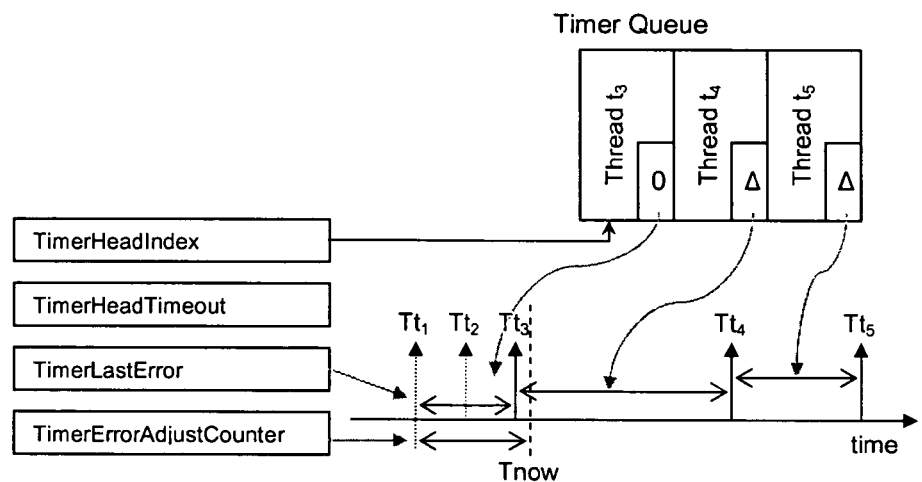
Figure 55: Basic timer queue structure after pop of thread 2

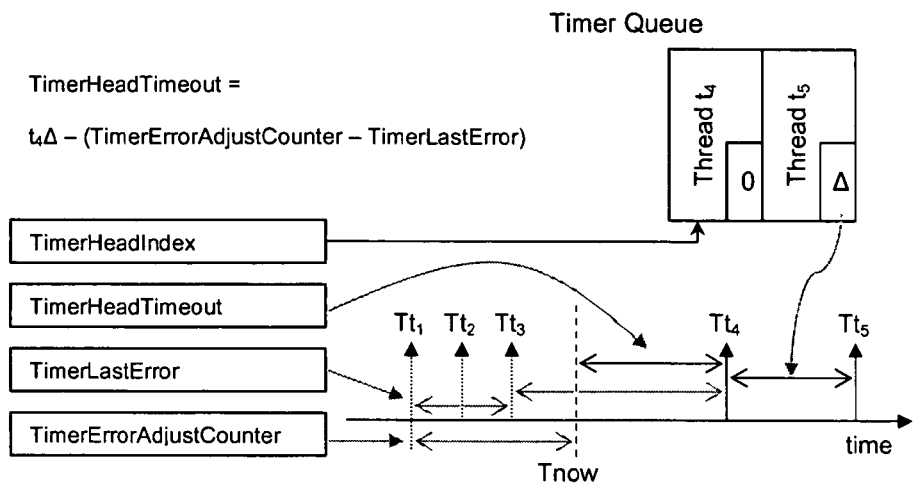
Figure 56: Basic timer queue structure after pop of thread 3
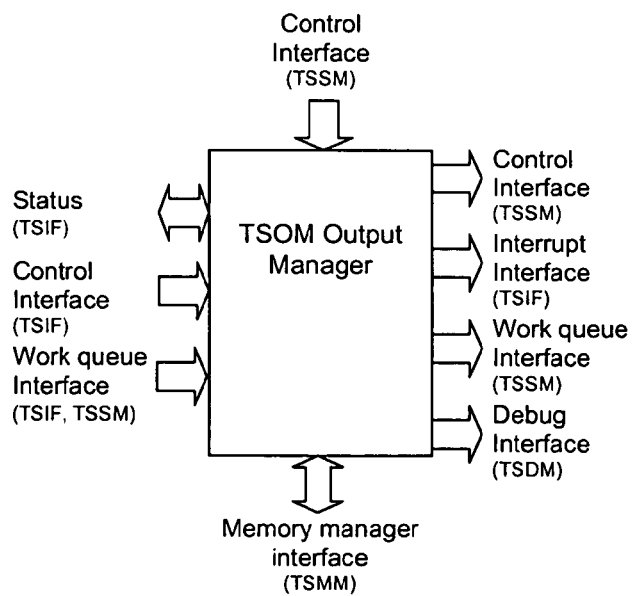
Figure 57: TSOM primary IO

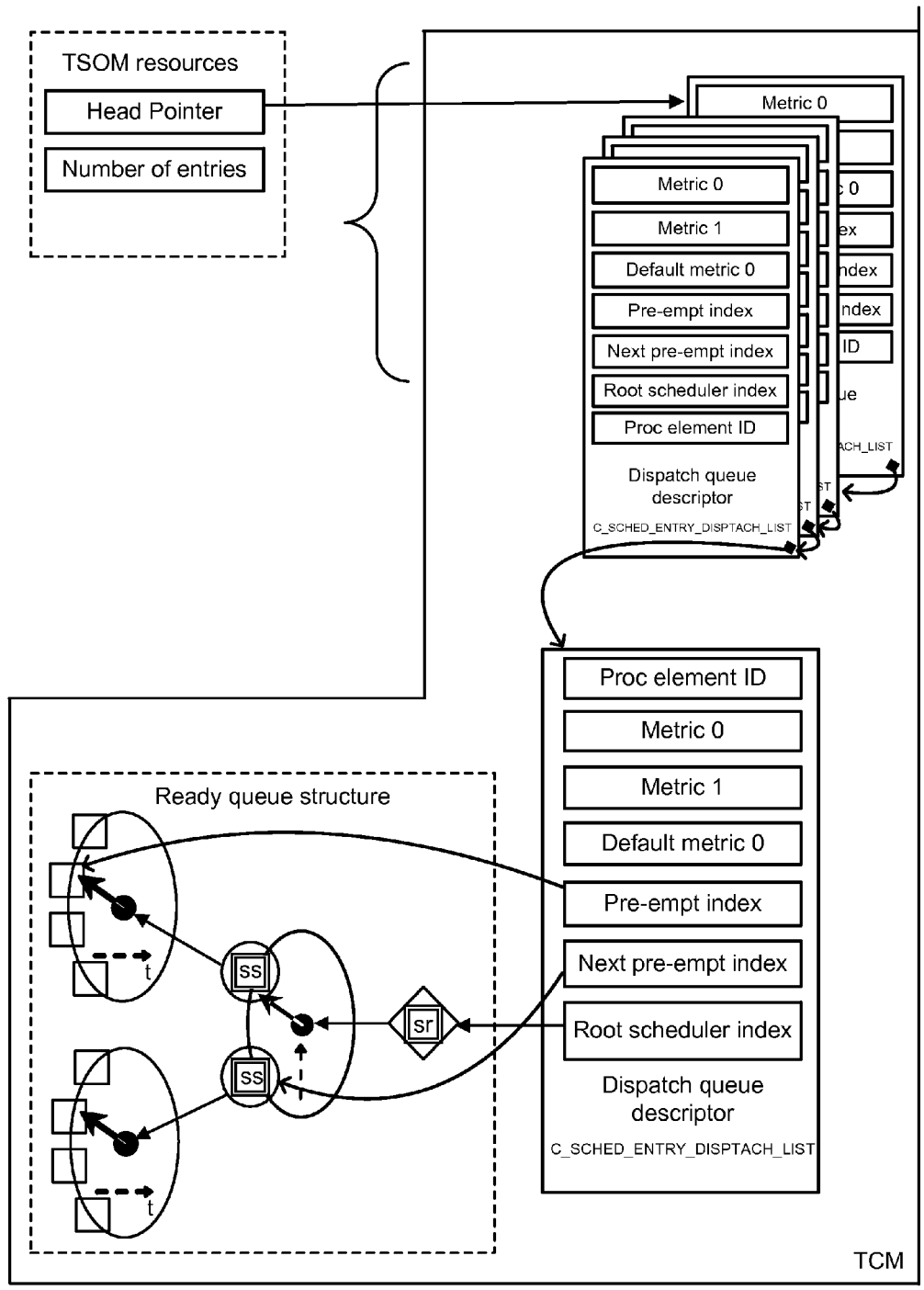
Figure 58: TSOM internal architecture

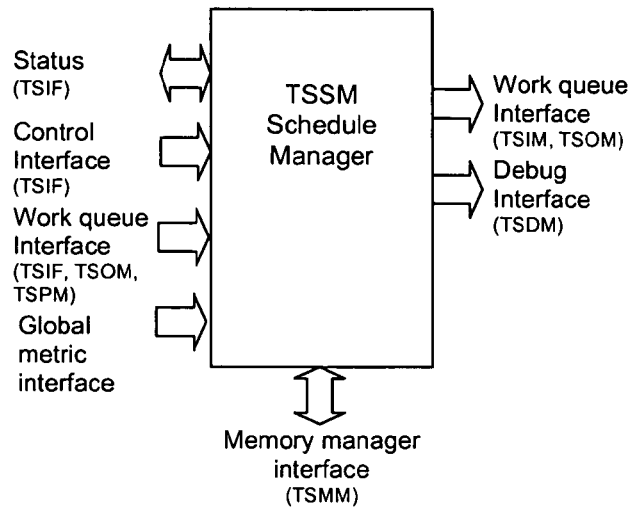
Figure 59: TSSM primary IO
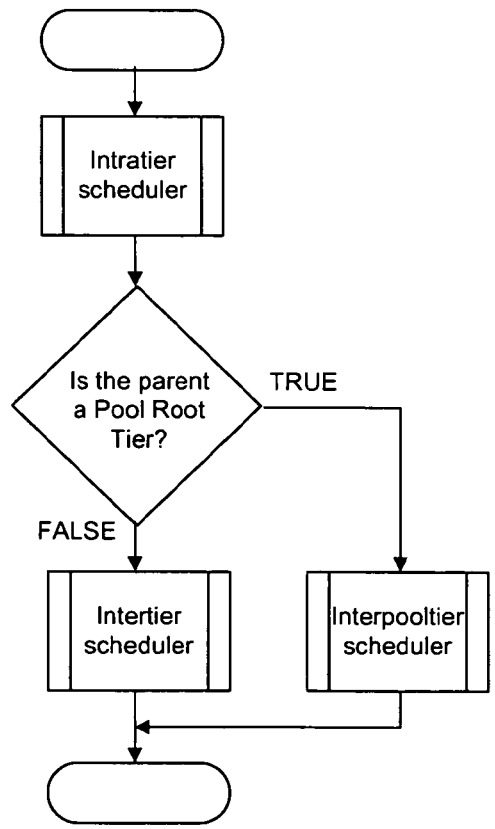
Figure 60: Reschedule flow

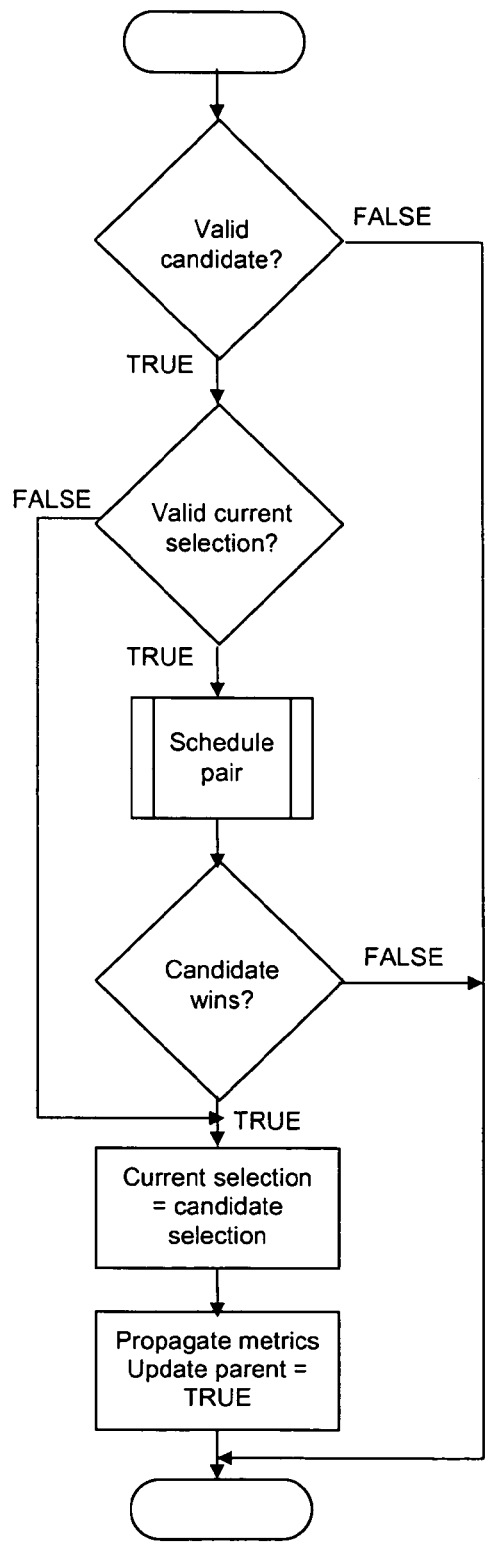
Figure 61: Single pass scheduling operation

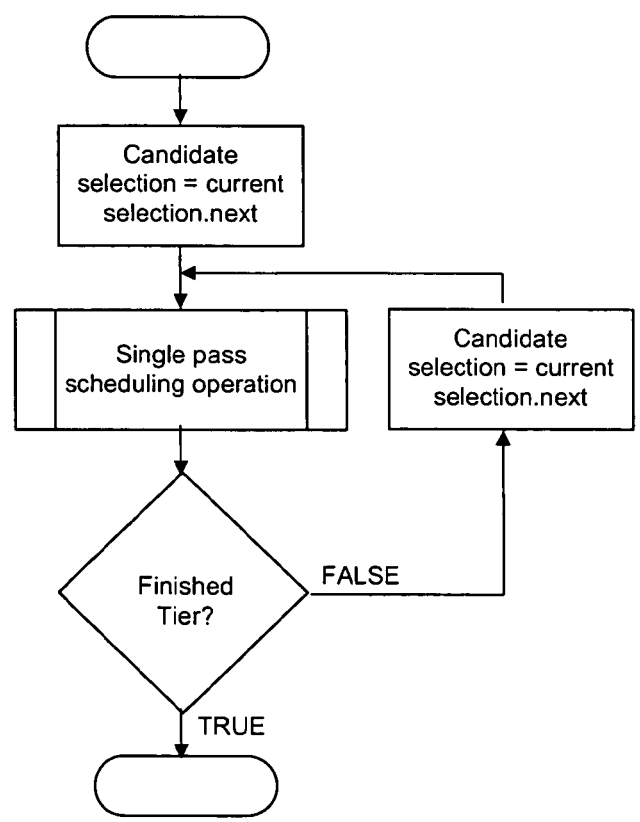
Figure 62: Intra-tier scheduling for pop and generic scheduling operations

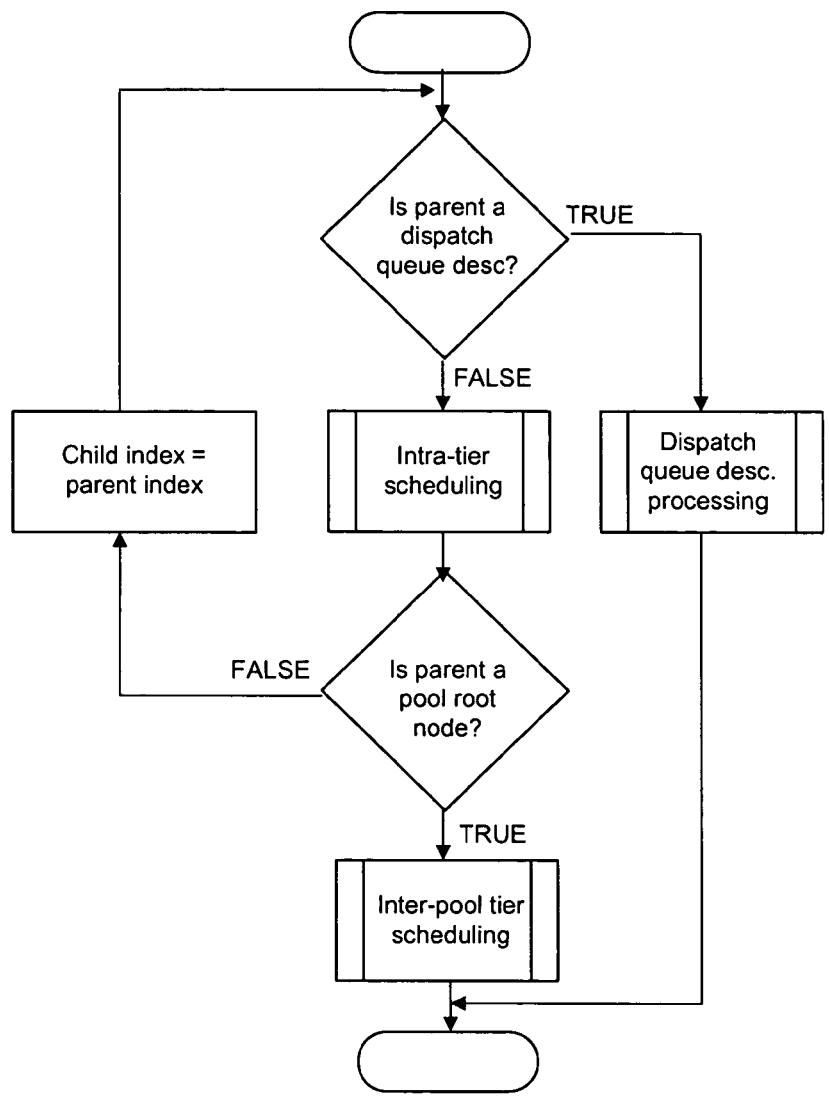
Figure 63: Inter-tier scheduler processing

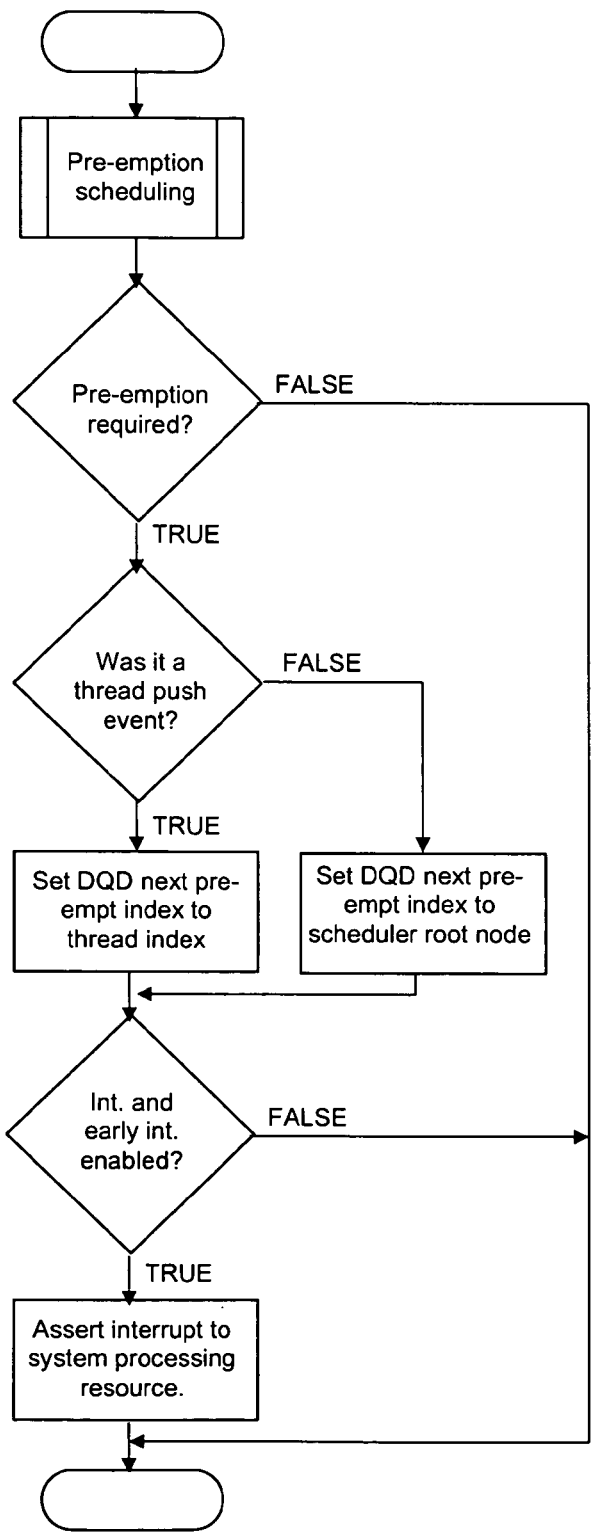
Figure 64: Inter-tier scheduler dispatch queue processing

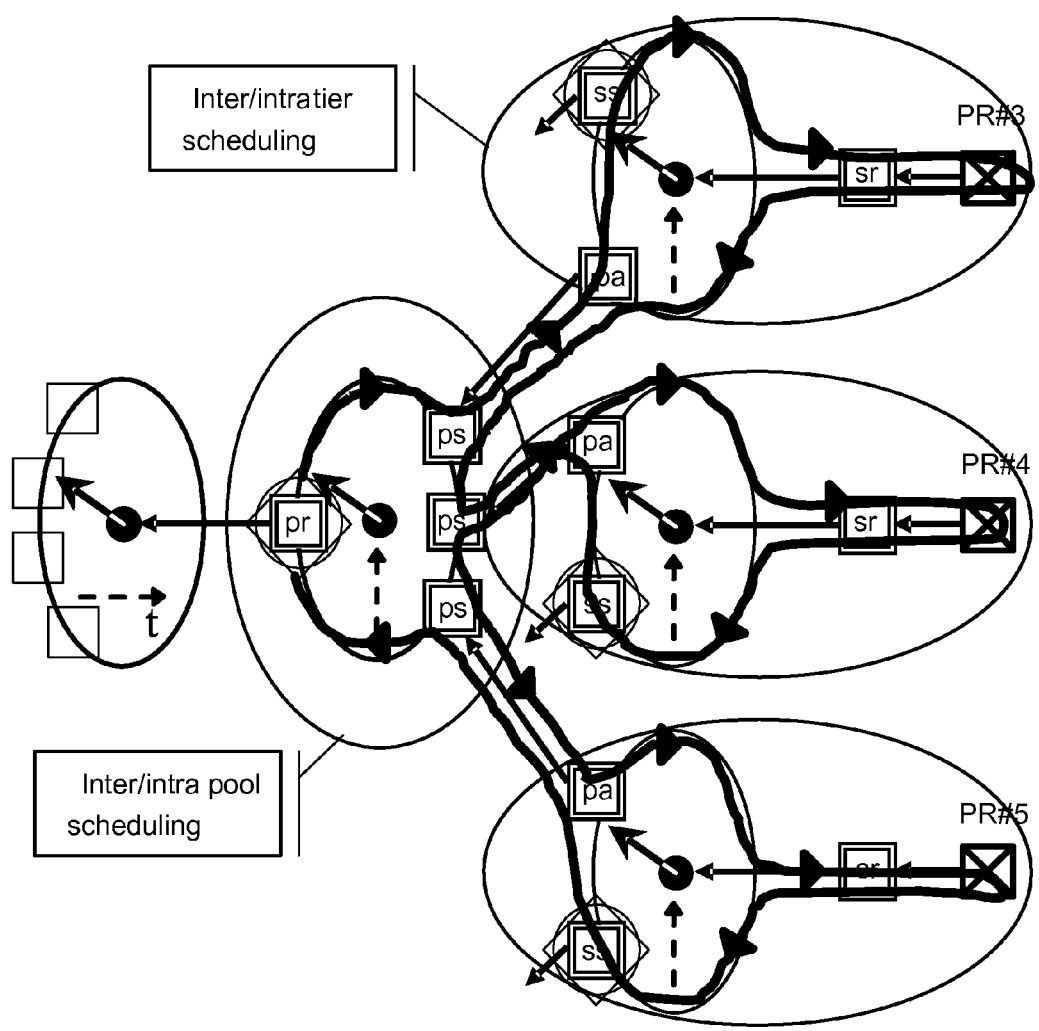
Figure 65: Iterating pool distribution tiers in inter-pool scheduling

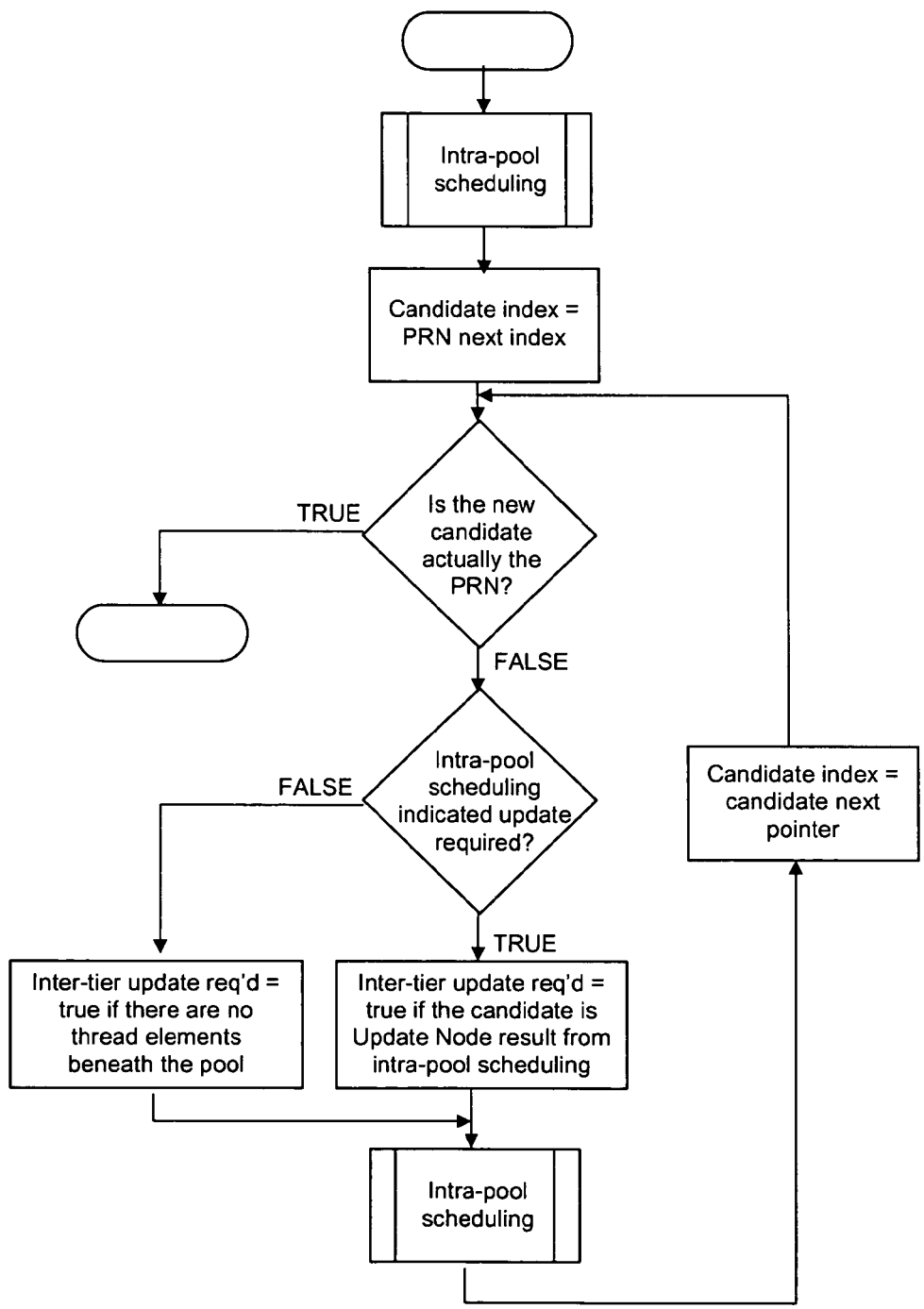
Figure 66: Inter-pool distribution tier scheduler processing

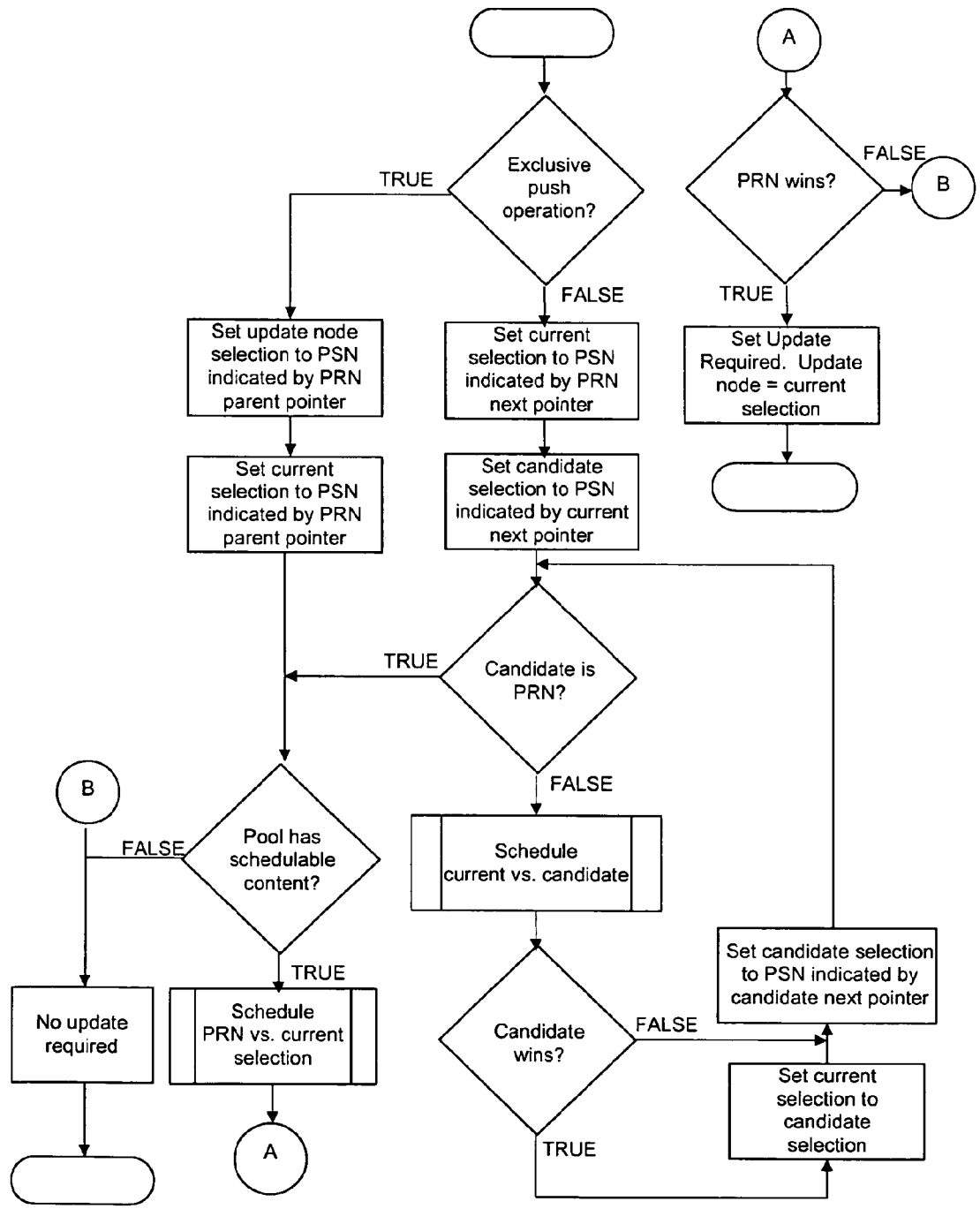
Figure 67: Intra-pool tier scheduler processing

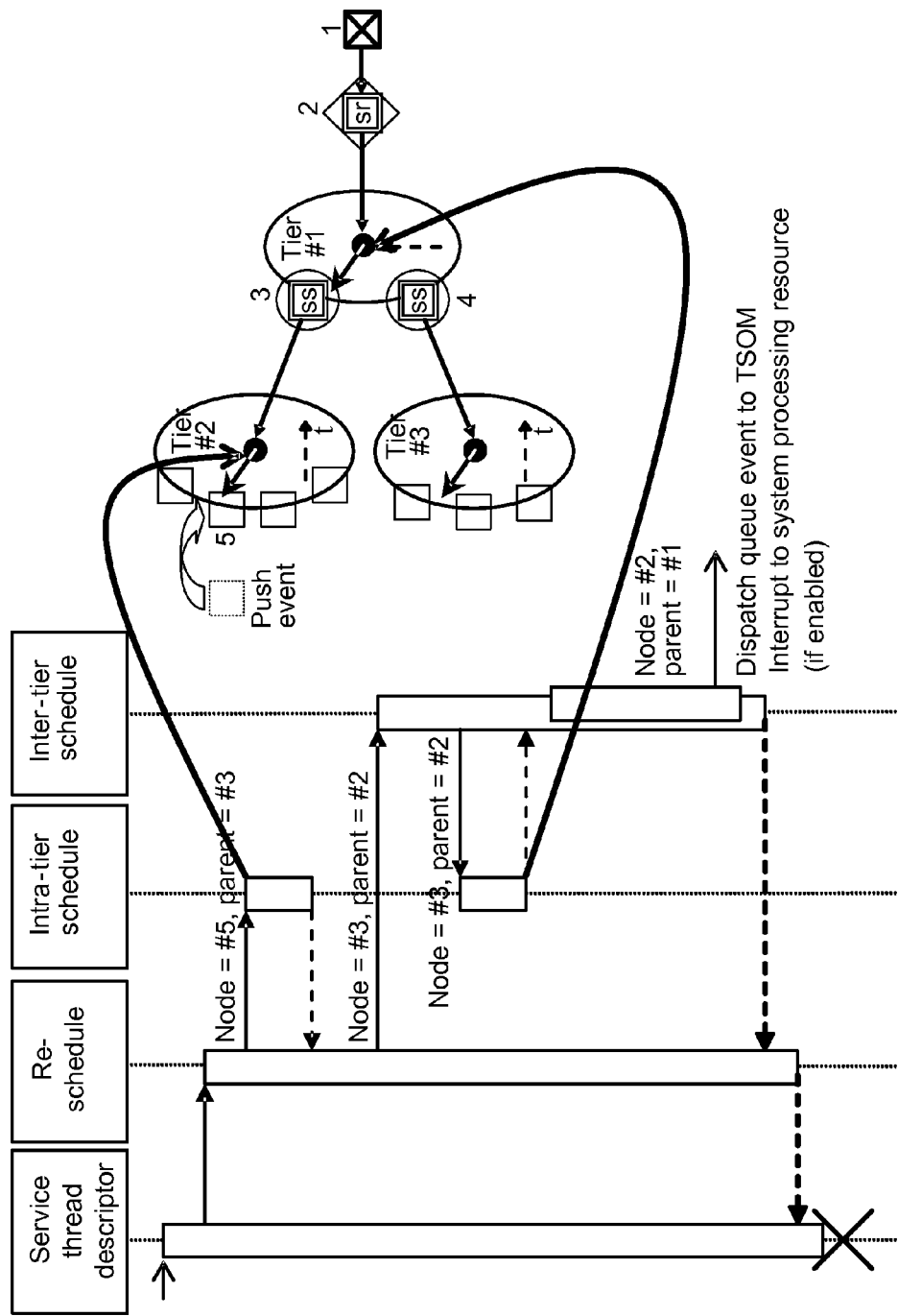
Figure 68: A basic scheduling hierarchy sequence diagram

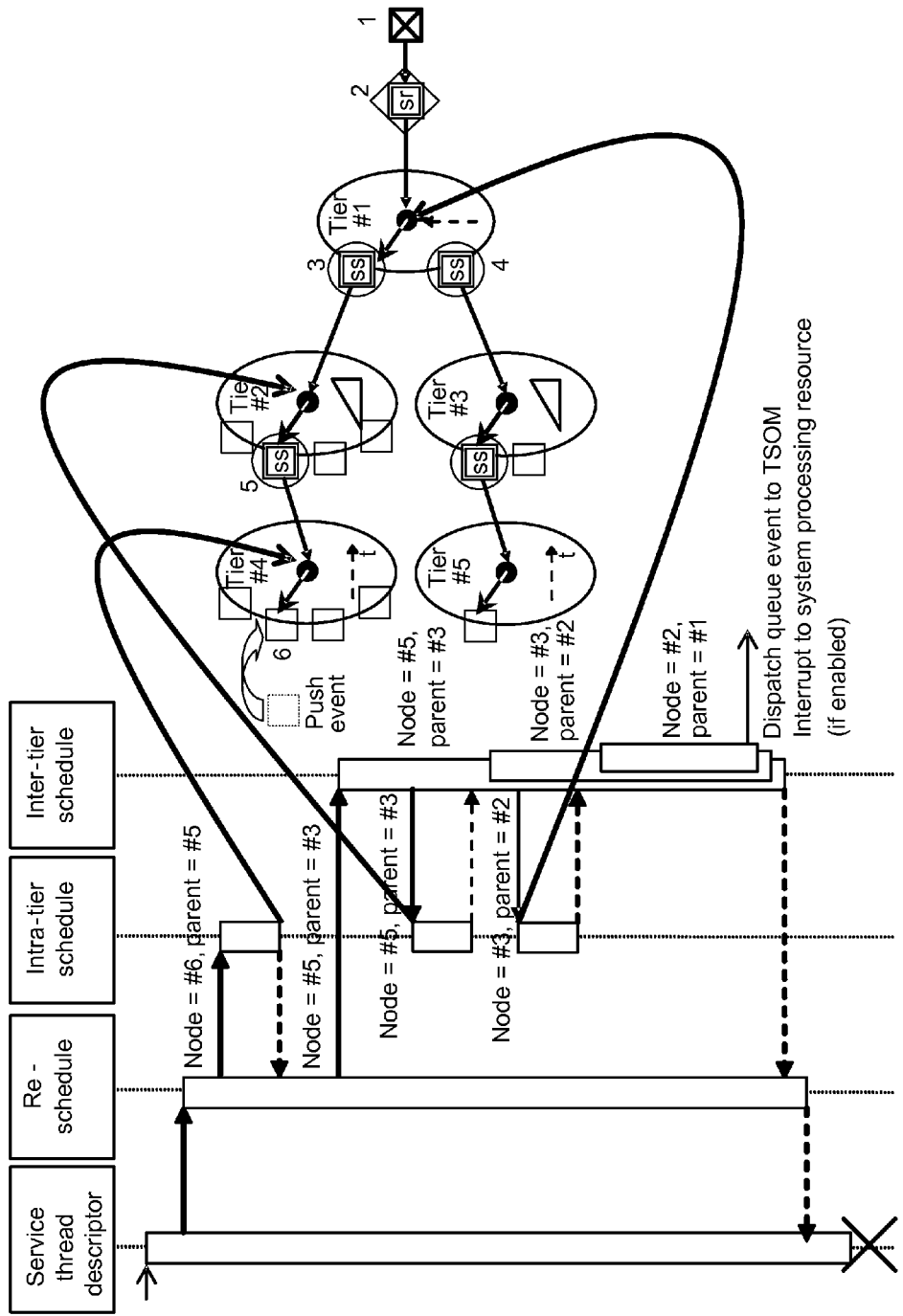
Figure 69: A cascaded scheduling hierarchy sequence diagram

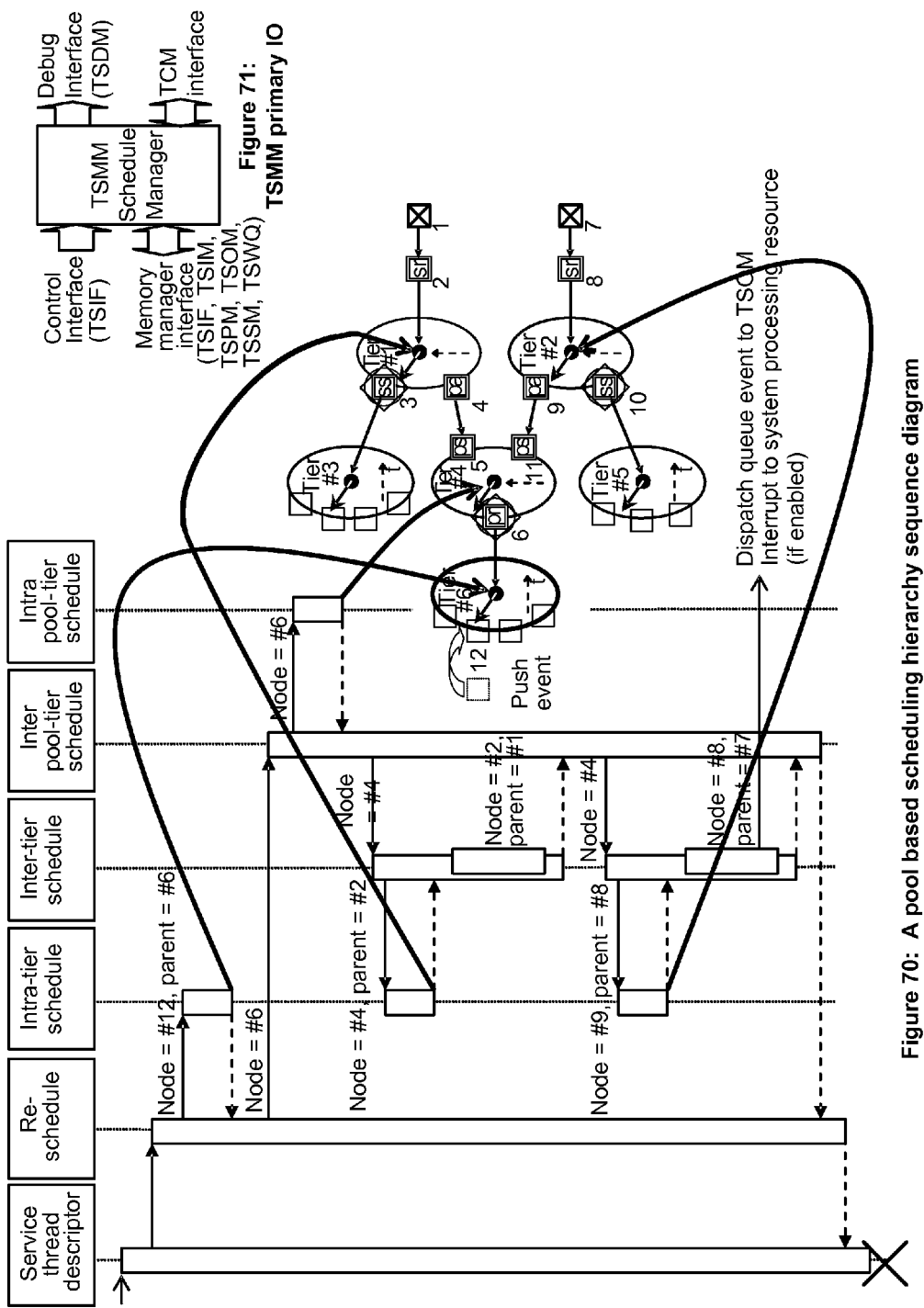
Figure 70: A pool based scheduling hierarchy sequence diagram
Figure 71: TSMM primary IO

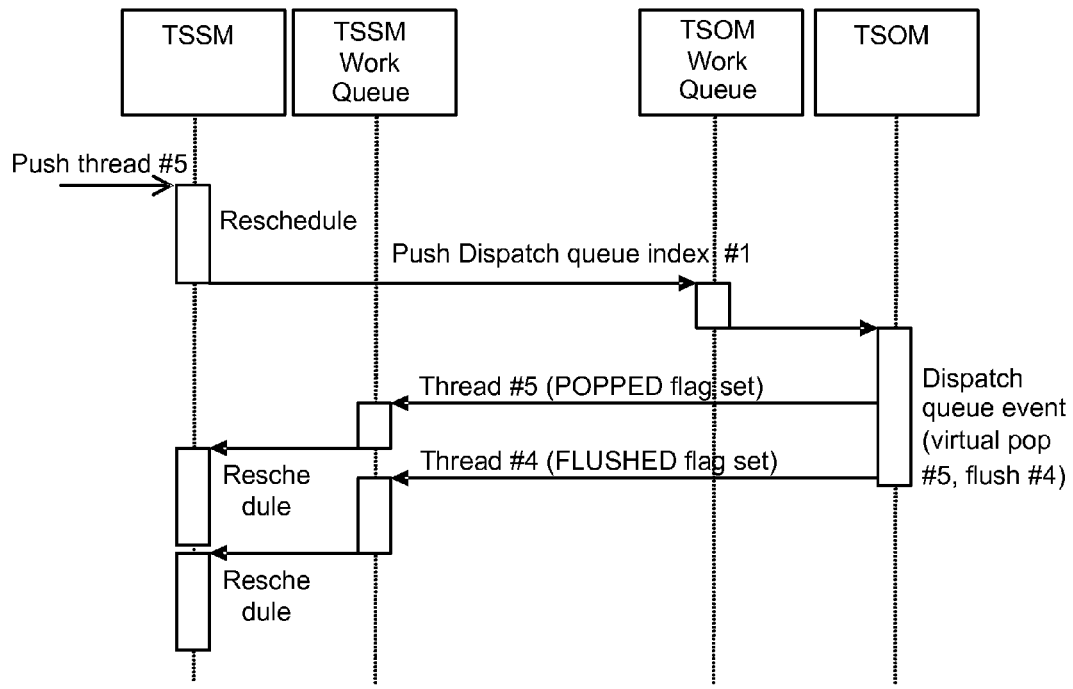
Figure 72: Push event TSOM, TSSM interaction
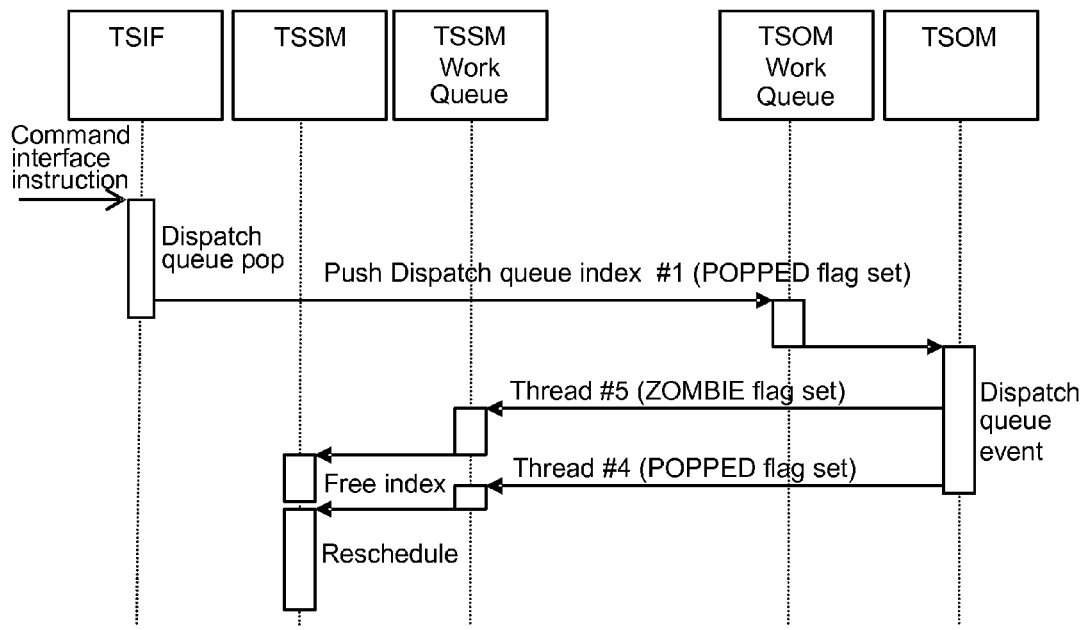
Figure 73: Pop event TSOM, TSSM interaction

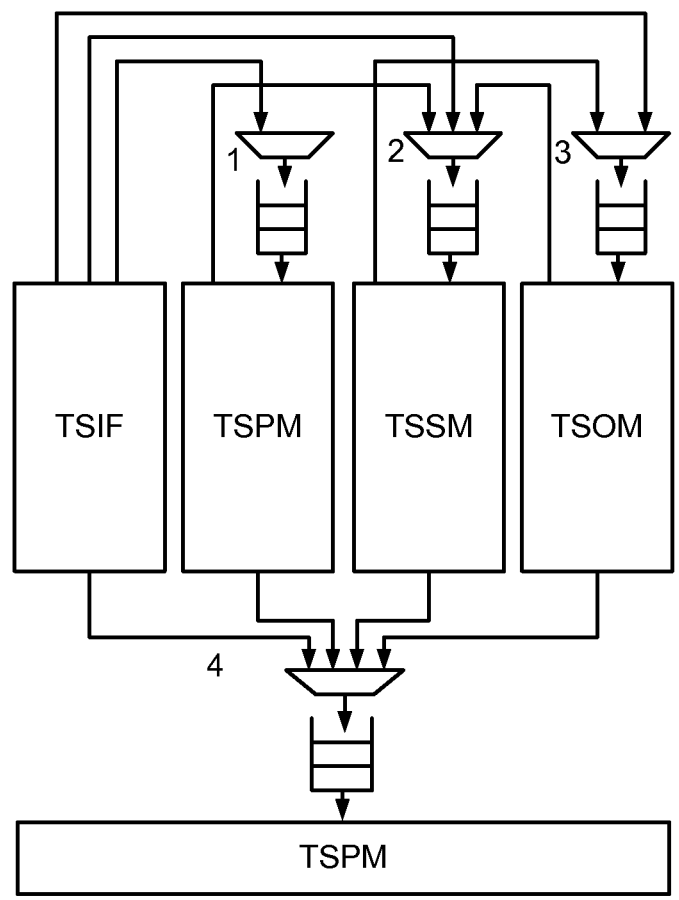
Figure 74: SystemWeaver server inter sub-block work queue architecture

SCHEDULING IN A MULTICORE ARCHITECTURE

CROSS REFERENCE TO RELATED APPLICATIONS

This application is a continuation of U.S. application Ser. No. 14/267,830, filed May 1, 2014, which is a divisional of U.S. application Ser. No. 13/965,124, filed Aug. 12, 2013, now issued as U.S. Pat. No. 8,751,773, which is a continuation of U.S. application Ser. No. 11/540,146, filed Sep. 29, 2006, now issued as U.S. Pat. No. 8,732,439, which claims the benefit of Great Britain Priority Application Number 0519981.5, filed Sep. 30, 2005, entitled "Scheduling In A Multicore Architecture", which are each incorporated herein by reference in their entirety.

BACKGROUND OF THE INVENTION

1. Field of the Invention

This invention relates to a method and apparatus for scheduling in a multicore architecture.

2. Description of the Related Art

In recent years, there has been a trend towards producing processors containing multiple cores, in order to maximize silicon efficiency (i.e. "application-available" MIPs/mm$^2$ or MIPs/mW). Such multicore architectures are ideally suited to running applications based on threads, because a thread defines an autonomous package of work containing an execution state, instruction stream and dataset, which may execute concurrently with other threads.

Scheduling is the general term for the discovery and allocation of the most suitable thread (e.g., set of instructions) for execution to particular processing resources, which is required by both the application program and the underlying hardware platform upon which it is being executed.

Accordingly, the concurrency of execution within a multicore architecture, combined with the possible availability of multiple cores suitable for executing a particular thread, introduces additional problems into the scheduling used to allocate threads within these multicore architectures.

SUMMARY OF THE INVENTION

According to a first aspect of the present invention, there is provided a method of scheduling executable transactions, more often referred to as threads, within a multicore processor.

By providing a multilevel, and more preferably hierarchical, scheduling system, the present invention enables the construction of complex scheduling algorithms out of one or more simpler scheduling algorithms. The ability to use such complex scheduling algorithms improves the performance of an application, including multiple threads, during its execution. The present invention improves the runtime performance of an application by more efficiently allocating the executable transactions, or threads, to processing resources. This can increase the speed of execution and reduce bottlenecks on certain resources. It can also increase the usage of otherwise less active parts of the multicore processor.

In the preferred embodiment, the method is carried out by a dedicated hard-coded, therefore efficient, embodiment. The preferred hard-coded embodiment is in a server-client topology, including the system server (referred to hereafter as SystemWeaver), and a client per processing resource, or core, within the multicore processor. In other embodiments where the abilities of the processing resources in question allow, a single client may aggregate access to multiple processing resources.

To further improve performance of the overall system incorporating the present invention, the preferred embodiment uses pointers within a dedicated memory for scheduling allocations, storing values for decision purposes, and the like. These pointers preferably contain fields for storing parameters upon which the scheduling decisions are made, and preferably contain further fields for storing values for use in subsequent decisions, or simply to store other values of interest. The fields are collectively referred to hereinafter as metrics or operators.

According to a second aspect of the invention, there is provided a method of scheduling executable transactions within a multicore processor, the executable transactions defining an application, and the multicore processor having a plurality of processor elements, the method including maintaining a hierarchy of executable transaction schedulers, wherein the hierarchy is adapted to schedule executable transactions in accordance with the requirements of the application when in use, wherein each level of the scheduler hierarchy includes at least one scheduler, and wherein the at least one scheduler includes at least one rule to sort the executable transactions into an order of the most eligible transactions for execution on one or more of the processor elements.

According to a third aspect of the present invention, there is provided a method of managing power consumption in a multicore processor.

In the case where a multicore processor has multiple processing resources, each capable of executing a particular thread, the present invention allows these multiple processing resources to be placed into a pool together. It is then this pool of processing resources that is allocated threads. In such a situation, however, when the number of threads needing execution does not surpass the executing capability of the pool, i.e. some of the processing resources within that pool are either being under utilized, otherwise not being utilized at all, the present invention allows each of the processing resources to be placed into a power saving mode. The processing resources may even have multiple, different, levels of power saving.

Preferably, processing resources are taken out of a power saving mode, or at least moved to a lesser power saving mode with its associated lower cost of return to full power mode, when the thread execution load requires it.

According to a fourth aspect of the present invention, there is provided a method of scheduling executable transactions, or threads, within a multicore processor having at least one processor element including reconfigurable logic.

In the case where one or more of the processor elements has a reconfigurable logic part, for example in the case of the reconfigurable execution part of a Field Programmable Gate Array (FPGA), the present invention can improve performance by aggregating threads together that utilize the same configuration of the logic. This serves to reduce the need, or lessen the impact of, context switches, i.e. when the reconfigurable logic part is being reconfigure.

This invention may also improve performance in the case of reconfigurable logic, in the form of a local cache memory storing the instructions ready for execution next on the processor element in question.

This is because the effect of local cache misses, or local cache flushes can be minimised by aggregating threads for execution that use the same area of cached memory.

According to a fifth aspect of the present invention, there is provided a computer program, which, when executed by digital logic, carries out a process of scheduling executable transactions within a multicore processor including a plurality of processor elements. There is also provided a computer readable medium containing the instructions for executing this process.

Processor elements, processing resources, cores, and processors are to be construed as equivalent when utilizing the teachings of the description herein.

The busy status of a processor element may equate to its current workload.

According to a further aspect of the present invention a multicore processor is provided, the multicore processor including: a plurality of processor elements; at least one distribution queue, the distribution queue listing executable transactions in order of eligibility for execution; and a multilevel scheduler including: a plurality of individual executable transaction schedulers, wherein each individual executable transaction scheduler includes a scheduling algorithm for determining the most eligible executable transaction for execution from a number of candidate executable transactions ready for execution; wherein the schedulers are linked together and the multilevel scheduler is arranged to output the most eligible executable transaction from therein to the at least one distribution queue.

An executable transaction may include a thread descriptor, which may be selected from a plurality of states. The thread descriptor may be changed between states from the plurality of states, according to a state transition configuration, thereby identifying the executable transaction, such that it may be managed, amongst a plurality of executable transactions, to provide low scheduling latency and integrity of the scheduling hierarchy. A scheduler may identify the thread descriptor. The scheduler may include a scheduler state, selected from a plurality of scheduling states. The scheduler state is controlled to support a dynamic scheduling hierarchy, wherein the scheduling hierarchy may be adjusted during the normal operation of the system, whilst maintaining the ordering and integrity of items scheduled within that hierarchy.

The multicore processor may further include a hardware timing resource, which may be arranged to provide a watchdog timeout, and wherein the watchdog timeout indicates that a processing resource instance has entered an inoperable state. The hardware timing resource may alternatively provide a timeslice timeout, wherein the timeslice timeout indicates that a processing resource instance, or group of processing resource instances, is shared fairly between multiple equally eligible executable transactions. Fair sharing may include providing an equal share of the time, or a share of the time proportion to the requirements of the executable transaction. The hardware timing resource may be arranged to switch between a first mode in which it is configured to provide the watchdog timeout and a second mode in which it is configured to provide the timeslice timeout. The hardware timing resource is preferably configured to switch to the first mode, once a timeslice timeout is provided.

The pending manager of the multicore processor may further include a timer queue, each timer queue being arranged to receive timer queue elements. Timer queue elements may include executable transactions. A first executable transaction in the timer queue may be associated with a first time parameter. The first time parameter indicates the timeout time, the timeout time being the time when the associated executable transaction should become eligible for execution. Preferably, the timeout time of the first executable transaction is closest to the current time. A second executable transaction may be associated with a second time parameter. The second time parameter indicates the difference between the timeout time of the second executable transaction and the timeout of the first executable transaction. A third executable transaction may be associated with a third time parameter. The third time parameter indicates the difference between the timeout time of the third executable transaction and the timeout time of the second executable transaction.

A first executable transaction in a queue may be associated with a time parameter. This time parameter indicates the time difference between the timeout of the associated executable transaction and the timeout of a second executable transaction, also in the queue. Preferably the second executable transaction is the executable transaction in the queue having a timeout occurring before and closest to the timeout of the first executable transaction.

The multicore processor may further include a plurality of dispatch queues. Preferably, a dispatch queue is arranged to identify a further dispatch queue. Each dispatch queue may include a dispatch queue descriptor. This enables a flexible number of served processing resource instances, and also enables the dispatch queue descriptors to be serially interrogated. A dispatch queue may be further arranged to identify an executable transaction, from a group of pre-emption executable transactions, currently using a processor element. The dispatch queue may be further arranged to identify a further executable transaction, from the group of pre-emption executable transactions, which will subsequently use the processor element. The dispatch queue thereby holds the index of the latest scheduling decision as made by the schedule manager.

The linkage of individual executable transaction schedulers to provide the multilevel scheduler defines a scheduling hierarchy, wherein each executable transaction scheduler has an associated scheduling tier. An executable transaction scheduler may be configured to identify an executable transaction scheduler which previously scheduled an executable transaction. Optionally, the executable transaction scheduler may identify if the executable transaction originates from a distribution queue associated with a processor element. The executable transaction scheduler may identify if the executable transaction comes from a group of pre-emption executable transactions. Processing may be optimized for cases where the scheduling event is a "push" event. When an executable transaction is scheduled by an executable transaction scheduler, the executable transaction scheduler may be further configured to communicate a correction parameter to each executable transaction scheduler which previously scheduled the executable transaction. The correction parameter allows the propagation of the scheduling decision and the maintenance of the integrity of counters within the multilevel scheduler.

A method of operating a multicore processor system may also be provided including: providing a client; and selecting an interaction state for the client. The interaction state may include: an idle state, during which the client may be configured to operate in a power management mode; and a user state, during which the client is configured to execute an executable transaction in a user or normal mode. Preferably the interaction state may further include an API interaction state, during which the client is configured to execute an executable transaction in a privileged state. Optionally, the interaction state may include a client shim state, during which the client may be configured to prepare a context for an executable transaction. Preferably, the method also includes providing a server, wherein the interaction state is shared between the client and server. Preferably, an out of band signal may be provided to cause the interaction state to change. The server may provide the out of band signal. Optionally, an executable transaction may cause the interaction state to change.

BRIEF DESCRIPTION OF THE DRAWINGS

The present invention is illustrated by way of example, and not by way of limitation, in the figures of the accompanying drawings and in which like reference numerals refer to similar elements:

FIG. 1 shows a task state diagram similar to the one implemented in SystemWeaver for the management of tasks or threads in a multicore system in accordance with one embodiment of the present invention.

FIG. 2 shows a representation of the scheduling points with respect to the queuing points which they engender in accordance with one embodiment of the present invention.

FIG. 3 shows the principle elements of a software client shim in accordance with one embodiment of the present invention.

FIG. 4 shows a state diagram of the SystemWeaver client in action in accordance with one embodiment of the present invention.

FIG. 5 shows a conceptual scheduling structure in accordance with one embodiment of the present invention.

FIG. 6 shows a scheduler hierarchy diagram which demonstrates the parent and child relationship in accordance with one embodiment of the present invention.

FIG. 7 shows an example scheduling cone implementation in accordance with one embodiment of the present invention.

FIG. 8 shows a typical processing resource pool configuration in accordance with one embodiment of the present invention.

FIG. 9 shows the scheduling metrics present within a task descriptor in accordance with one embodiment of the present invention.

FIG. 10 shows a basic configuration for a single processor in accordance with one embodiment of the present invention.

FIG. 11 shows a more representative scheduling structure for a single processing resource instance in accordance with one embodiment of the present invention.

FIG. 12 shows the detail view of one of the FIFO scheduling tiers in accordance with one embodiment of the present invention.

FIG. 13 shows a representation of this type of structure for a pool containing two processing resource instances in accordance with one embodiment of the present invention.

FIG. 14 shows an example structure where a processing resource participates in two pools in accordance with one embodiment of the present invention.

FIG. 15 shows a configuration comprising five processing resource instances and two distribution pools in accordance with one embodiment of the present invention.

FIG. 16 shows exemplary scheduling analysis, policies and operators in accordance with one embodiment of the present invention.

FIG. 17 shows the rescheduling scope for an event on a basic scheduling hierarchy in accordance with one embodiment of the present invention.

FIG. 18 shows the rescheduling scope for a simple two instance processing resource pool in accordance with one embodiment of the present invention.

FIG. 19 shows an exemplary rescheduling scope in accordance with one embodiment of the present invention.

FIG. 20 shows a sequence diagram for the rescheduling which occurs as a result of a push event in accordance with one embodiment of the present invention.

FIG. 21 shows exemplary metric propagation in accordance with one embodiment of the present invention.

FIG. 22 shows the two parts of the running state in accordance with one embodiment of the present invention.

FIG. 23 shows an exemplary timeslice configuration in accordance with one embodiment of the present invention.

FIG. 24 shows an exemplary task priority delta diagram in accordance with one embodiment of the present invention.

FIG. 25 shows the classical case with a single processor and three timeslice tasks in accordance with one embodiment of the present invention.

FIG. 26 shows the same scenario with two processors in accordance with one embodiment of the present invention.

FIG. 27 shows three exemplary processor timeslice tasks in accordance with one embodiment of the present invention.

FIG. 28 shows exemplary dual processor timeslice tasks in accordance with one embodiment of the present invention.

FIG. 29 shows the "executing priority" of a processing resource instance (PRI) as time passes in an idle state using ascending priority in accordance with one embodiment of the present invention.

FIG. 30 shows a logical view of the management of outstanding tasks in accordance with one embodiment of the present invention.

FIG. 31 shows an exemplary architecture in accordance with one embodiment of the present invention.

FIG. 32 shows the conceptual effect of such a system in accordance with one embodiment of the present invention.

FIG. 33 shows an exemplary hysteresis scheduling configuration in accordance with one embodiment of the present invention.

FIG. 34 shows the results of a simulation of the presented scheduling algorithm in accordance with one embodiment of the present invention.

FIG. 35 shows an exemplary compound scheduling algorithm in accordance with one embodiment of the present invention.

FIG. 36 shows an exemplary key to scheduling diagrams in accordance with one embodiment of the present invention.

FIG. 41 shows the internal thread state diagram through which both thread descriptors and marker thread descriptors traverse in accordance with one embodiment of the present invention.

FIG. 42 shows an exemplary scheduler tier state diagram in accordance with one embodiment of the present invention.

FIG. 43 shows exemplary primary IO in accordance with one embodiment of the present invention.

FIG. 44 shows exemplary watchdog interrupt control in accordance with one embodiment of the present invention.

FIG. 45 shows exemplary timeslice control in accordance with one embodiment of the present invention.

FIG. 46 shows an exemplary timer cycle flow diagram in accordance with one embodiment of the present invention.

FIG. 47 shows an exemplary primary IO in accordance with one embodiment of the present invention.

FIG. 48 shows an exemplary internal architecture in accordance with one embodiment of the present invention.

FIG. 49 shows an exemplary primary IO in accordance with one embodiment of the present invention.

FIG. 50 shows an exemplary pending queue structure in accordance with one embodiment of the present invention.

FIG. 51 shows an exemplary basic timer queue structure in accordance with one embodiment of the present invention.

FIG. 52 shows an exemplary active timer cycle flow diagram in accordance with one embodiment of the present invention.

FIG. 53 shows an exemplary basic timeout state machine in accordance with one embodiment of the present invention.

FIG. 54 shows a basic timer queue structure after pop of a first thread in accordance with one embodiment of the present invention.

FIG. 55 shows a basic timer queue structure after pop of a second thread in accordance with one embodiment of the present invention.

FIG. 56 shows a basic timer queue structure after pop of a third thread in accordance with one embodiment of the present invention.

FIG. 57 shows exemplary primary IO in accordance with one embodiment of the present invention.

FIG. 58 shows exemplary internal architecture in accordance with one embodiment of the present invention.

FIG. 59 shows exemplary primary IO in accordance with one embodiment of the present invention.

FIG. 60 shows an exemplary reschedule flow process in accordance with one embodiment of the present invention.

FIG. 61 shows an exemplary single pass scheduling process in accordance with one embodiment of the present invention.

FIG. 62 shows an exemplary intra-tier scheduling process in accordance with one embodiment of the present invention.

FIG. 63 shows an exemplary inter-tier scheduling process in accordance with one embodiment of the present invention.

FIG. 64 shows an exemplary inter-tier scheduling process in accordance with one embodiment of the present invention.

FIG. 65 shows an exemplary iterating pool distribution diagram in accordance with one embodiment of the present invention.

FIG. 66 shows an exemplary inter-tier distribution process in accordance with one embodiment of the present invention.

FIG. 67 shows an exemplary intra-pool tier scheduling process in accordance with one embodiment of the present invention.

FIG. 68 shows an exemplary scheduling hierarchy in accordance with one embodiment of the present invention.

FIG. 69 shows an exemplary cascaded scheduling hierarchy in accordance with one embodiment of the present invention.

FIG. 70 shows an exemplary pool-based scheduling hierarchy in accordance with one embodiment of the present invention.

FIG. 71 shows exemplary primary IO in accordance with one embodiment of the present invention.

FIG. 72 shows an exemplary push event in accordance with one embodiment of the present invention.

FIG. 73 shows an exemplary pop event in accordance with one embodiment of the present invention.

FIG. 74 shows an exemplary SystemWeaver server in accordance with one embodiment of the present invention.

DETAILED DESCRIPTION

Figure 37:
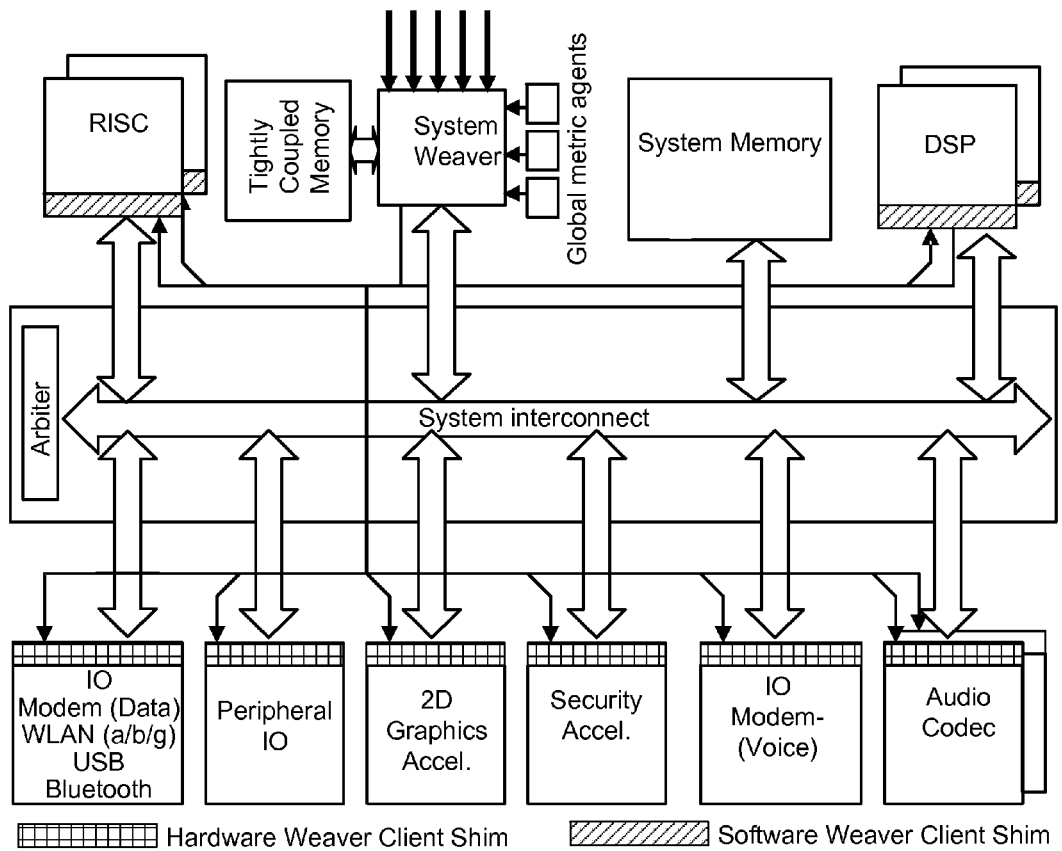
FIG. 37 shows an exemplary hardware and software configuration in accordance with one embodiment of the present invention.

FIG. 1 shows a task state diagram similar to the one implemented in SystemWeaver for the management of tasks or threads in a multicore system.

In multicore systems, the scheduler provides packets of work at the optimum time to the optimum resources according to a set of predefined rules (the "schedule"). Scheduling is required by both the application and the underlying hardware platform:

Application scheduling includes synchronization and eligibility. Synchronization ensures that resources within the system can be shared without compromising the integrity of the data and possibly the system as a whole. Eligibility ensures that ready tasks are issued to the processing resources in a manner consistent with the needs of the application, expressed in the scheduling policy.

Platform based/distribution scheduling defines a policy in which application tasks are distributed amongst the appropriate processing resource instances. This may imply sharing a processing resource amongst multiple users and/or multiple different algorithms.

FIG. 2 shows a representation of the scheduling points with respect to the queuing points which they engender.

From left to right the first queue point encountered is the pending queue. Blocked tasks are stored in the pending queue according to their priority and liberated by synchronization events, further discussion of the pending queue structure and behavior is beyond the scope of this document. The second queuing point is the ready queue, which includes both the application and distribution scheduling. In FIG. 2 this is split into three logical sections; the application and distribution scheduling. Conceptually, between these two scheduling stages is a point where all the currently ready application tasks have sorted according to their eligibility (expressed in user defined metrics and scheduling policies). This is point referred to as the distribution node.

Before the distribution node a set of application specific scheduling policies are configured which determine how tasks of differing classes and task instances of common classes compete for access to the processing resource instances. This hierarchy of scheduling policies is referred to as the scheduling cone and is application specific.

After the scheduling cone a set of platform specific scheduling policies are configured which determine how the most eligible application tasks are distributed to the processing resource instances present in the underlying hardware platform. This hierarchy of scheduling policies is referred to as the distribution cone and is platform specific.

The effectiveness of a scheduling policy and implementation may be judged on a combination of many properties, including:

Throughput—the number of scheduling decisions which may be made per second.

Latency—the time which elapses between an event within the system and the completion of the scheduling operation associated with the event.

Predictability/determinism—the ability to determine how the system will behave under all circumstances.

Efficiency—the efficiency within which any given scheduling algorithm may be implemented. This may be measured in instructions per decision (a measurement of instruction set efficiency) and/or silicon footprint (memory and other die area)

Policies—the diversity of supported policies and the ability to combine them to form complex hierarchies.

Components

There are two primary components of SystemWeaver: the server core and the client shims. These may be connected in a variety of ways. A SystemWeaver enabled system would include a server core and at least one client shim.

SystemWeaver Core

The SystemWeaver core includes a hardware engine and a tightly coupled memory. The memory contains scheduling configuration and dynamic descriptors used to represent units of work within the system. Each SystemWeaver core is aggregated across multiple clients, which may be either instructions set based architectures or hardware accelerators. SystemWeaver communicates with each client individually through two logically separate datapaths:

An out-of-band signal to alert the client to a change in system state requiring attention. The SystemWeaver core is the master of this interface, which is typically embodied as an interrupt (assumed here and after).

A datapath through which the client may interrogate SystemWeaver. The client is the master of this interface, which may be embodied as a bus, duplex serial interface or any other bidirectional implementation.

During the boot process the SystemWeaver core must be initialized. Typically one client will be nominated the boot master and will initialize SystemWeaver, and its associated memory, on behalf of the rest of the system.

SystemWeaver Client Shim

In a classical configuration each client has an individual client shim, however more conservative implementations may aggregate client shims over multiple clients. Client shims may be embodied in hardware or software. FIG. 3 shows the principle elements of a software client shim:

The SystemWeaver HAL implements the command formatting required for the register interface of the SystemWeaver core.

The SystemWeaver API enables the application to make calls to the SystemWeaver core at a task based abstraction.

The user thread(s) are application threads which use the SystemWeaver task management capabilities. At any instance in time, only one user thread is directly under the management of each individual client.

The client shim handles the out of band signal servicing (typically interrupt servicing). Primarily the client shim managed contexts within the processing resource instance, ensuring that integrity is preserved through task switching and pre-emption. Typically the client shim contains an architecturally agnostic part and an instruction set architecture specific part.

The idle agent implements a management task which handles power-down modes of individual processing resource instances or macro-architectures.

FIG. 4 shows a state diagram of the SystemWeaver client in action. The client shim performs two primary functions:

Management (allocation, storage and restoration at appropriate times) of the "context" (for a classical processor context can contain processor stack space and content, register values, program counter etc.) within which the processing resource instance is executing. There are two types of context—user or task context, which is the context within which a user task executes, and processing instance specific context, which is a context dedicated to client shim administrative operations.

Management of operating mode (in a classical processor user (normal) and supervisor (privileged) modes are available which define the right to access certain key system resources—for example, unlike a supervisor mode task, a user mode task will not be permitted to access resources which may adversely affect other user mode tasks sharing the processing resource).

The following description is for a general purpose processor, although similarities exist for all client types.

"Idle" state—During the idle state, user defined algorithms may utilize the power-down modes made available by the end processing resource instance (for example, clock gating or other low power states) or the system architecture as a whole (for example, clock gating or reducing or eliminating the power supply to a particular processing resource instance). Whilst in this state the processing resource instance may operate in a privileged mode and will be using the processing resource specific context.

Note that the SystemWeaver server does not instruct the client to enter the idle state—the client does so as a result of an absence of scheduled tasks.

Each client remains in the "idle" state until instructed to respond through an out of band signal (typically an interrupt) from the SystemWeaver server.

"Client shim" state—The client shim state manages the executing context of the user and idle tasks. When in the "client shim" state, the client shim saves the context of any task which has finished execution, been pre-empted or has blocked and recovers or creates a context for the next executing task (in the case of the idle task this is the processing resource instance specific context). Whilst in this state the processing resource instance may operate in a privileged mode. At times the client shim may be operating in either the processing resource specific context or the user or task context.

The "client shim" state is entered as a result of out of band signalling from the SystemWeaver server (transitions from the "user" or "idle" states to the "client shim" state) or as a result of a SystemWeaver API call which has caused the executing task to become blocked ("SyWAPI" state to "client shim" state, for example as a result of a failed attempt to lock a semaphore).

Upon completion of processing, the client shim may transition the "client shim" state to the "idle" state (if there are no outstanding tasks for the processing resource instance) or into the "user" state (if eligible tasks exist for the processing resource instance) without any further external signalling.

"User" state—When in the "user" state the client shim executes user application code. Whilst in this state the processing resource instance would normally operate in a "user" or "normal" mode. The "User" state would operate entirely within the user or task context. The "User" state may be entered from the "client shim" state as a result of commencing or resuming a user task or from the SyWAPI state, as a result of a return from a SystemWeaver server API call.

The client shim may transition from the "User" state to the "client shim" state as a result of task completion or pre-emption (the receipt of out of band signalling from the SystemWeaver server). The client shim may transition from the "user" state to the SyWAPI state as a result of a call to the SystemWeaver server API.

"SyWAPI" state—Where a user task requires interaction with the SystemWeaver core it does so through the SystemWeaver API which causes a client shim state change to "SyWAPI". Whilst in this state the processing resource instance may operate in a privileged mode. The "SyWAPI" state would operate entirely within the user or task context.

The "SyWAPI" state is entered following a call to the SystemWeaver API. For non-blocking calls the client shim will return from the "SyWAPI" state to the "user" state, however, some accesses—for example those associated with semaphores—can cause the user task to become blocked (blocked tasks must wait until some shared system resource becomes available). In this case the client shim transitions into the "client shim" state.

Concepts

The following section discusses the concepts required to understand the operation of the SystemWeaver scheduler.

SystemWeaver Memory Elements

SystemWeaver requires an attached tightly coupled memory, the use of this memory for storage of scheduling policies enables full scheduling modification and tuning flexibility throughout the system development process. The SystemWeaver memory is divided into SystemWeaver memory elements (WMEs). WMEs are used to represent task and scheduling descriptors discussed below.

Task Descriptors

Task descriptors are the key "unit of currency" of the SystemWeaver architecture. They are representative of units of work which compete for access to processing resource instances according to the rules configured within the scheduling hierarchy. Task descriptors contain:

A reference to a task control block, which in turn contains a reference to the task to be executed and the dataset upon which it must be executed.

Scheduling metrics, defining the eligibility of the task.

Synchronization references and timeouts may also be included for tasks which will be blocked initially. A more detailed description of blocked task behavior is outside the scope of this document.

A reference to an "Entry Node", which defines the part of the scheduling hierarchy to which the task descriptor must be added (possibly after synchronization).

Scheduling and Distribution Cones

Two types of cones are used to describe SystemWeaver scheduling behavior; scheduling and distribution cones. Scheduling cones are used to describe a hierarchy of schedulers which converge from many "entry" points to a single aggregated point—a many to one mapping. Distribution cones are used to describe a hierarchy of schedulers which diverge from a single aggregated point to multiple "dispatch" points—one-to-many mapping.

Scheduling Cones

Scheduling cones (shown in red in FIG. 5) define the "application decision node" hierarchies, which are driven by the needs of the application (also shown as "Application Scheduling" within the ready state of FIG. 2). Scheduling cones are many-to-one mappings, defining the rules by which multiple classes of task and multiple instances of task classes compete for system resources.

Distribution Cones

Distribution cones (shown in purple in FIG. 5) define the "distribution decision node" hierarchies, which are driven primarily by the properties of the underlying hardware platform (also shown as "Distribution scheduling" within ready state of FIG. 2). Distribution cones define the rules by which the most eligible candidates of the scheduling cones are distributed amongst the available and appropriate processing resources.

Primary Scheduling Nodes

There are three primary nodes used to describe scheduling configuration; entry nodes, distribution nodes and dispatch nodes. The primary nodes are an overlay on the underlying secondary node structure, which more closely reflects the detailed implementation of the scheduler.

Entry Nodes

Entry nodes define the point at which new tasks are queued. Entry nodes typically map many-to-one onto distribution nodes as the two extremes of a scheduling cone. Entry nodes may be associated with specific classes of task or according to other application derived policies. A given entry node may only map onto a single distribution node.

Distribution Nodes

Distribution nodes define the delineation between scheduling and distribution cones. They are typically representative of a class of processing resource. Scheduling cones typically map one or more entry nodes onto a single distribution node, distribution cones typically map a single distribution node onto multiple dispatch nodes and therefore ultimately processing resource instances.

Dispatch Nodes

Dispatch nodes define an exit point associated with an individual processing resource instance. They will typically map one to one with the IP cores which exist within the hardware platform (although hardware multi-threaded processor cores may be allocated multiple dispatch queues). Multiple distribution cones may map onto individual dispatch nodes.

Secondary Scheduling Nodes

Two types of decision nodes are defined; application decision nodes and distribution decision nodes. Although application and distribution decision nodes map directly onto scheduling tiers, they do not exhaustively define the numbers or types of underlying tiers within the scheduler implementation.

Application Decision Nodes

Application decision nodes define interim scheduling or aggregation points within the scheduling cone. Each application decision node defines a rule by which the most eligible candidate of a set may be selected.

Distribution Decision Nodes

Where multiple distribution nodes map onto a single dispatch node, a distribution decision node is required to set the policy which determines the distribution cone which gains access to the processing resource instance.

Schedule Configuration

The ready state structure (FIG. 2) contains threads that are ready for execution. The entire ready state structure may include numerous scheduling and distribution cones. These threads were created with independent thread primitives (i.e. they were created in the ready state), or they have received the synchronization primitive or timeout upon which they were dependant. Synchronized threads have previously transitioned from the blocked state.

The ready state structure may contain scheduler node descriptors and independent thread descriptors. The structure is largely defined during system initialization although thread descriptors and their associated dynamic scheduler tier descriptors are allowed to come and go during runtime.

The ready state structure allow threads to be scheduled to a pool of processing nodes, or a specific processing node. This enables load balancing or other distribution behavior across multiple compatible processing resources whilst maintaining the ability to target specific tasks at specifically capable processing resources (for example hardware accelerators or IO devices).

Scheduling tiers are the primitive resource used to implement the primary and secondary scheduling nodes which make up the ready state structure. Scheduling tiers may have parent, child or peer relationships with other scheduling tiers and task descriptors.

FIG. 6 shows a scheduler hierarchy diagram which demonstrates the parent and child relationship. In this example, y is the parent of a, b and c, and y is the peer of x and z. Parents may only be scheduling tiers, whereas children may be scheduling tiers or task descriptors. A given peer group (a, b and c for example) may consist of a mix of task descriptors and scheduling tiers. In turn, all scheduling tiers have parents (the dispatch node is the only descriptor which does not define a parent).

During runtime, parent tiers may inherit "metrics" (priority etc) from the most eligible child according to user defined policies. This feature may be used where deeply embedded scheduling policies require some knowledge of eligible candidates from the scheduling branches which are being compared (this topic is covered in detail in the Metric Propagation section below).

The following sections describe the building blocks of any SystemWeaver scheduling hierarchy.

Basic Scheduler Tiers

Scheduler tiers define the hierarchy used to schedule thread descriptors. Each scheduler tier typically defines a scheduling algorithm, some metrics used to determine scheduling decisions, an inheritance policy used to define how the metrics are propagated from the child to the parent and a list of child elements that may be further scheduler tiers or thread descriptors. There are three types of scheduler tier descriptor; root, static and dynamic (where dynamic tiers are a special type of static scheduling tier). FIG. 7 shows an example scheduling cone implementation. FIG. 36 shows the diagram reference key for all scheduling figures from FIG. 7 onwards.

Scheduler Root Descriptor

Scheduler root descriptors have a one-to-one mapping with dispatch queues. They represent the ultimate node in the ready state structure. Root descriptor metrics always contain a copy of metrics derived from the ready state structure according to the defined inheritance policy.

Scheduler root descriptors are configured during system initialization and exist in perpetuity.

Static Scheduler Descriptor

Scheduler static descriptors exist beneath root nodes in the scheduling hierarchy. The parents of static scheduler descriptors may be other static scheduler descriptors or root descriptors. They compete with sibling nodes according to their parents defined scheduler algorithm and their own scheduler metrics.

Scheduler static descriptors are configured during system initialization and exist in perpetuity. During operation, SystemWeaver maintains the scheduler metrics according to the selected scheduling and metric propagation algorithms.

Dynamic Scheduler Descriptor

Scheduler dynamic descriptors exist beneath root and optionally static nodes in the scheduling hierarchy. The parents of dynamic scheduler descriptors may be either static scheduler descriptors or root descriptors. They compete with sibling nodes according to their parents defined scheduler algorithm and their own scheduler metrics.

Dynamic Scheduler descriptors may be configured at any time. This enables the system to support a far higher number of scheduling tiers than would be possible with a purely static provision. SystemWeaver achieves this by capitalising on the likelihood that, although over all time a large number and diversity of threads and dynamic scheduler tiers are used, during a finite period the transient demand is smaller. For example, in a networking system with attached memory supporting a maximum of 4 k dynamic elements (threads and dynamic scheduler descriptors) it may be possible to support 16 k connections as at any instant in time, data units from only a fraction of the overall connection space will be active in the processor. This flexibility is achieved with a small penalty in performance, since, if a dynamic scheduler descriptor is not present, it must be created prior to the addition of child thread descriptors.

During operation, SystemWeaver maintains the scheduler metrics according to the selected scheduling algorithm. Under certain circumstances SystemWeaver will release the dynamic scheduler descriptors back to the WME free list.

Processor Resource Pools

Processor resource pools enable the aggregation of instances of a specific processing resource into a single distribution node. The distribution nodes may then provide load balancing, intelligent pre-emption and power management across the individual members of the processing resource pool.

FIG. 8 shows a typical processing resource pool configuration. Three new definitions of Weaver Memory Element support the processor pool configuration structure:

Pool Attachment Nodes

Pool attachment nodes (PAN) are used to attach the scheduler root tier to the processing resource pool root tier. PANs must exist within the scheduler root tier (i.e. their parent must be a scheduler root node). During operation PAN metrics are automatically updated with a copy of the metrics of the pool root node (PRN), which have, in turn, been inherited from the scheduling cone.

The schedule operators defined within the PANs are not used.

Pool Static Nodes

Pool static nodes (PSN) are used to attach the scheduler root tier to the processing resource pool root tier. They exist within the pool root tier (i.e. their parent must be a PAN) and automatically hold a copy of the metrics of the dispatch node (i.e. the currently executing thread).

The scheduler operators within the PSN of a given pool must all be set to the same algorithm, defining the policy used to select the appropriate processing resource instance to be pre-empted.

Pool Root Nodes

There is a single pool root node (PRN) for each processing resource pool. The pool root node defines the distribution node for the processing resource pool. The metrics within the PRNs reflect the most eligible thread held within the scheduling cone associated with the distribution node. The PRN parent pointer must be set to point to one of the pool static nodes.

The scheduler algorithms should be set according to the needs of the adjacent tier of the scheduling cone, as normal.

Dynamic Scheduler Configuration

SystemWeaver supports creation and deletion of scheduling nodes at runtime as well as providing capabilities to migrate a task class from one entry node to another without loss or mis-ordering. Two additional concepts must be introduced when discussing dynamic scheduler configuration; dormant scheduling tiers and marker threads.

Dormant scheduling tiers exist within the hierarchy and may accept push operations (i.e. may accumulate child entries) but are ineligible for scheduling and therefore never popped.

Marker Threads are only scheduled when they are the last thread dependant on a particular part of the scheduling hierarchy. The number of threads dependant on a part of the scheduling hierarchy includes the number of ready threads and the number of blocked threads which will use this part of the scheduling hierarchy when they become ready. The marker thread can carry task references like any other thread and will typically be used to complete the management of a transition operation between one part of the scheduling hierarchy and another.

The following section details an example sequence of a transition of a task stream from one part of the hierarchy. Note that this is a superset of the deletion of a part of scheduling hierarchy.

Sequence of Operation

It is the responsibility of higher level software to ensure that the appropriate sequence of operation is observed. Failure to observe this sequence may result in unexpected behavior, in particular, new threads must not be introduced to a part of scheduling hierarchy into which a marker thread has been inserted.

In this example sequence it is assumed that a stream of tasks, $t_{stream}$, are transitioning from scheduler hierarchy $h_1$ to new scheduling hierarchy $h_2$.

Create dormant scheduler hierarchy $h_2$.
Assign all new task descriptors on $t_{stream}$ to $h_2$.
Insert a marker thread into $h_1$.
Await emergence of marker thread.
Awaken the dormant hierarchy $h_2$.

Scheduler analysis, algorithms, operators and operands

Scheduling analysis takes many forms (EDF, RMA etc) and is typically application, or at least sector, specific. The result of scheduling analysis is a set of policies which control the runtime deployment of the application, either statically or dynamically. Through its unique micro-architecture, SystemWeaver executes these predefined policies/algorithms efficiently at runtime.

Scheduling Algorithms

SystemWeaver is designed to enable specialised algorithms to be defined at silicon design time without disruption to the architecture or implementation. However, a number of algorithms are offered by default:

FIFO scheduling: simple first-in, first-out queueing.
Priority scheduling: the most eligible candidate has either the highest (ascending priority) or the lowest (descending priority) priority metric.
Round robin: Updates the scheduling decision to the next peer when a task is popped from the scheduling hierarchy. Note that round-robin is not a relevant scheduling policy at the "leftmost" extreme of a scheduling hierarchy.
Weighted fair queuing: A complex scheduler in which eligible candidates are selected according to an assigned weight and some measure of load (i.e. length of packet).

With some attention to the overall scheduler hierarchy, complex combinations of scheduler algorithms may be created to provide sophisticated traffic and task management capabilities in application systems.

Operators

Scheduling algorithms are further decomposed into individual scheduling and metric operators, both defined within the parent node:

Scheduling operators: define the manner in which the operands, stored within the child nodes, are used to determine the most eligible candidate. Scheduling operators do not modify the operands within the child nodes.

Metric operators: define the manner in which the most eligible child's operands are propagated into the parent's operands. The propagation operator may be null (no update to the parent), a copy (overwriting the parent's operands), or involve a mathematical function over some or all of the child and parent operands. In all cases, the child operands are not changed.

The scheduling and metric operators are implemented natively in the SystemWeaver scheduler hardware. A combination of scheduling and metric operator will typically be used to define a given scheduler algorithm. Scheduling algorithms commonly imply different behavior under a push event (where a new task has been pushed into the scheduler hierarchy) than under a pop event (where a task is popped from the scheduling hierarchy). For example, consider a FIFO scheduler, when a new task is pushed into a non-empty FIFO scheduling stage, no scheduling update is performed, whereas when an item is popped from a FIFO scheduling stage, the scheduler must be updated.

Scheduling Operators

Scheduling operators are designed to be extensible, but a selection of default operators are defined. The scheduling operators are typically comparative and the result is therefore always a Boolean. In the table below M represents one of the two metrics in either the members of a scheduling tier or the scheduling tier descriptor itself according to the following scheme:

$M_{current}n$ refers to those metrics which belong to the current most eligible candidate $M_{candidate}n$ refers to those metrics which belong to a candidate to which the current descriptor is being compared in the course of a scheduling update $M_{tier}n$ refers to those metrics which belong to the scheduler tier descriptor to which the current and candidate are attached

TABLE 1

Scheduling operators

| Instruction | Scheduler Update Decision |
| --- | --- |
| GTR | $M_{current}0 > M_{candidate}0$ |
| GTR_EQ | $M_{current}0 >= M_{candidate}0$ |
| LESS | $M_{current}0 < M_{candidate}0$ |
| LESS_EQ | $M_{current}0 <= M_{candidate}0$ |
| EQ | $M_{current}0 == M_{candidate}0$ |
| UPDATE_EXIT | TRUE |
| UPDATE_NO_EXIT | TRUE |
| NO_UPDATE_EXIT | FALSE |
| HYSTERESIS | $(M_{current}1 + M_{tier}1) < M_{candidate}1$ |

Compound Scheduling Operators

Compound scheduling operators are also available, which are combinations of the scheduling operators in Table 1. For example:

Update Required=$(M_{current}0 > M_{candidate}0)$ &&
$(M_{current}1 < M_{candidate}1)$ The parameters in question may draw upon the metrics in both parent and child descriptors. These compound operators may be used in both traditional scheduling tiers and pool distribution tiers.

For further information and examples, consult the Scheduling sequence diagrams section below.

Metric Operators

Metric operators are arithmetic in nature. As with scheduling operators, they are designed to be extensible but have a set of default operators, see Table 2. Metric operators range in complexity from null or simple copy operations to complex multiply accumulate operations.

TABLE 2

| | Metric operators | | | | | |
|---|---|---|---|---|---|---|
| | Scheduled Element Metrics | | Old Metric Contents | | New Metric Contents | |
| Instruction | 0 | 1 | 0 | 1 | 0 | 1 |
| ALL | A | B | X | Y | A | B |
| NONE | A | B | X | Y | X | Y |
| PROP_0 | A | B | X | Y | A | Y |
| PROP_1 | A | B | X | Y | X | B |
| PROP_WFQ | A | B | X | Y | X + Y * B | Y |
| ADD | A | B | X | Y | X + A | Y |
| SUB | A | B | X | Y | X - A | Y |

Operands

Scheduling operands, or metrics are divided into two groups:

Local metrics are associated with processing resource instances, scheduler tiers and thread descriptors. The manipulation of a local metric automatically causes a reschedule event.

Global metrics are optional and typically associated with system resource state (some heuristics such as bus busyness or free memory)

A given scheduling algorithm can only use two metrics of which one must be local. The type of the second metric is determined by the Metric1IsGlobal flag:

when Metric1IsGlobal is reset, metric 1 is a local and will be used as a literal in scheduling operations when Metric1IsGlobal is set, metric 1 is an index into the array of global metric ports.

Local Metrics

Both task descriptors and scheduling tier descriptors contain two 32 bit operands, or scheduling metrics. These operands are used by their respective parents during scheduling operations and may be transformed and/or propagated during the scheduling operations into the parent's operands, for subsequent scheduling higher in the hierarchy.

FIG. 9 shows the scheduling metrics present within a task descriptor. Within a task descriptor, metric 0 will typically be used to represent the priority of the task. The least significant byte of this metric is reserved for internal use within the SystemWeaver hardware and client software. There is no such limitation on scheduler tier metrics.

Global Metrics

Global metrics are passive in nature, a change in the global metric value does not cause a reschedule event on all potentially affected scheduling resources. Global metrics are interrogated at the instant in which a dependant scheduling resource is scheduled, as a result of some other system event.

Although the SystemWeaver architecture imposes no limitation on the use of global metrics, they may be used for system heuristics (bus utilization, memory fill over a time window etc), hence the rate of change will be comparatively low. Filters may also be applied to average the data.

Scheduling Hierarchy Configuration Detail

All configuration diagrams referenced in the following sections use a common format as illustrated in FIG. 36.

The most basic configuration for a single processor is shown in FIG. 10, this shows the configuration a single processing resource instance (single dispatch node), with its mandatory scheduling root node. In this simplest case the scheduler cone consists of a single FIFO stage and the distribution stage is null, since there is only a single processor. Hence, the scheduler root node is both the entry node and the distribution node.

Note that the arrows on the scheduler node implementations are shown from right to left (parent to child), this is contrary to the "flow" of tasks, which flow from the children through to the processing resource instances.

Schedulers are implemented in a modular fashion and configured in volatile memory, this enables very sophisticated scheduler hierarchies to be constructed from a succession of scheduler tiers of differing policies and tuned and tailored throughout the development process. However, invalid configurations are possible, and particular care must be taken to ensure that appropriate metrics are available to deeply nested scheduler tiers.

Intra Tier Structure

The scheduling tiers store entries in order of arrival, or, according to a default FIFO queuing policy. The manner in which the defined scheduling policy is overlaid onto this structure is described later. New nodes (or descriptors) are added to the intra-tier structure by means of a push operation, and are removed as a result of a pop operation. Scheduling operations do not manipulate the intra-tier links.

FIG. 11 shows a more representative scheduling structure for a single processing resource instance. From the left, in this example two FIFO stages feed a priority stage. There are three scheduling tiers at two stages of hierarchy. Note that scheduling tiers only have one "exit" node (shown on the right side of the diagram) but potentially many entry nodes (shown on the left of the diagram).

FIG. 12 shows the detail view of one of the FIFO scheduling tiers. This diagram shows a set of pointers maintaining a dually linked list between all peers on the tier. A dually linked list is used to maximise the performance of the removal (pop) of an arbitrary member of the tier.

Although this detailed view shows task descriptors only, the structure is equally applicable to tiers containing any mix of threads and scheduling nodes.

The intra-tier links between peer elements are only manipulated during push and pop operations.

Inter Tier Structure

With the exception of pool root tiers, the structure of inter-tier links is shown in FIG. 12. Each tier has a parent node, which must be either a scheduler root node or a scheduling node. These nodes store a pointer to the most eligible member of this tier. These child pointers are updated upon receipt of a scheduling event in accordance with the scheduling policy and metrics defined within the parent node and the child nodes respectively.

Each child node must also refer to its parent.

Pool Root Tier Structure

The pool root tier structure is a special case where a tier has a single entry node and many exit nodes. The entry node is the point upon which a scheduling cone converges (as shown by the "application scheduling" part of the ready queue structure in FIG. 2), also known as the "distribution node". The "exit nodes" link the pool root tier to the "distribution scheduling" structure for the processing resource instances over which tasks may be distributed. FIG. 13 shows a representation of this type of structure for a pool containing two processing resource instances.

Each pool distribution tier must contain a pool root node (PRN) and one or more pool static nodes (PSN), no other node types are permitted. The PRN contains a reference to the first tier of the scheduling cone (stored within the HeadIndex field) and reference to the first PSN entry to be considered for distribution. A common distribution and metric update policy must be stored within the scheduler and metric push and pop operators respectively of every PSN.

Every PSN must reference the PRN as its child (using the HeadIndex field).

The parent of a pool static node must be a pool attachment node (PAN). PANs and PSNs must have a one to one mapping. However, each processing resource instance may have multiple PANs associated with each distribution pool in which it participates. FIG. 14 shows an example structure where a processing resource participates in two pools. No limitation is placed on the number of pool in which a given processing resource may be a member. Furthermore, any pool may share an arbitrary number of its constituent processing resources with an arbitrary number of other pools.

Within the scheduling root node there are two PANs associated with each of the distribution cones in which the processing resource instance participates. In addition, there is a scheduling node which provides specific access to the processing resource instance where required.

The scheduling policy defined within each PSN of a pool distribution tier identifies the manner in which the most eligible processing resource instance for execution of a given task is selected. For example, the policy may be one of priority, where the processing resource instance currently executing the lowest priority task is selected for pre-emption upon the arrival of a high priority task from the associated scheduling cone.

FIG. 15 shows a configuration including five processing resource instances and two distribution pools. Note that PRI#3 participates in both pools.

Behavior

The following section describes the behavior of SystemWeaver scheduling.

General Principles

The following sections provide some basic background information explaining some of the key underlying principles of the SystemWeaver scheduling architecture.

Pointer Based Queuing

Although there are multiple potential queuing points within SystemWeaver, elaborated in FIG. 2, these are realised using pointers only. The queued entity, a SystemWeaver memory element (WME), is never copied.

Event Based Scheduling

SystemWeaver only updates scheduling decisions when required to do so by some change in system state. The changes in state may be separated into three event classes:

A "push event", where the change in system state has caused the introduction of a new thread descriptor to the ready queue structure (note that this may be a new thread descriptor, or an existing thread descriptor for which the change in system state has caused the thread to become ready)

A "pop event", where the change in system state has resulted in the removal of a thread descriptor from the ready queue structure.

An "update event", where scheduling parameters have been modified, requiring the re-evaluation of the scheduling decision.

These changes may be:

An interrupt (a "push event", since the blocked thread associated with the interrupt is moved to the ready state).

The arrival of a new task created by an executing task (this may be a push event, if the new task is not dependant on other factors or events)

A synchronization event—for example, a semaphore signal (assuming that there is a thread blocked waiting for the signal, this is a "push event", as the blocked thread descriptor transitions into the ready state.

A change in the executing "priority" of a task, an "update event".

The consumption of a task (transition from ready to executing) within a processing resource instance (a "pop event")

The modification of a task's scheduling metrics (an "update event")

The modification of a scheduler tier's scheduling algorithm or metrics (an "update event")

The modification of the scheduler hierarchy itself (an "update event")

Where the system is in steady state SystemWeaver remains idle. In principle, in the most power-efficient solutions, this could enable SystemWeaver to be powered-down pending the arrival of an event requiring additional scheduling. Note that changes to global metrics do not cause reschedule events.

"Just in Time" Scheduling

New entries, which are queued to a given scheduling tier, are compared with the current most eligible entry (as identified by the parent HeadIndex) only. If, according to the tier scheduling policy, they are more eligible than the current head, the HeadIndex field is updated to reference the new entry. New entries are always placed at the back of the current linked list structure.

If the scheduling policy is a FIFO, the HeadIndex pointer is never updated when a new entry arrives unless the queue is empty. Hence the default behavior, where the new entry is placed at the back of the queue, is equivalent to a FIFO algorithm.

This scheme ensures that minimal time is spent processing push operations, which are generally observed as latency in scheduling performance. Consequently, pop scheduling is more onerous as, in the worst case, the entire contents of a scheduling tier must be evaluated to update the scheduling decision on each pop operation. However, always using a native FIFO algorithm in the physical queue structure is desirable because modification of the scheduling algorithm does not require the scheduler tier to be re-linked. Furthermore, pop scheduling may, in general, be executed in parallel with application execution and therefore has a lesser impact on overall system performance.

Scheduling Analysis, Policies and Operators

There are numerous methods of analysing systems to ensure that real-time deadlines are met, examples of which are EDF (earliest deadline first), RMS (Rate monotonic scheduling) and various other stochastic methodologies. These approaches tend to be application specific and possibly proprietary in nature. However, in all cases the result of such scheduling analysis is a set of scheduling policies (i.e.

priority, FIFO, round-robin, weighted fair queuing), which must be deployed efficiently at runtime. SystemWeaver technology is targeted at the efficient runtime execution of the policies identified by scheduling analysis. For deployment within SystemWeaver, each scheduling policy is further decoded into a set of scheduling operators.

Each scheduler tier has two operators that are used to determine how the scheduling decision is updated as a result of a push to the scheduling tier (or subordinate scheduling tiers), or a pop from the scheduling tier (or subordinate scheduling tiers). In some cases the scheduling operators will require operands, which are stored within the metric fields of both schedulers and task descriptors alike.

Scheduling Metrics and Metric Propagation Operators

Scheduling metrics store information that may be required by the selected scheduling algorithms, the most basic example of which is priority. In some cases, it is necessary to forward metrics from the most eligible candidate to parent nodes in order that the information may be used either directly in subsequent scheduling decisions, or as an operand in a metric update operation. The metric propagation operators define how this is achieved, for both push and pop scenarios.

According to the position of the scheduling node within the hierarchy, the metric fields may also reflect the priority of the currently executing thread on a given processing resource. In this case, they are used to determine whether a pre-emption is required (see the Scheduling Behavior section below).

Scheduling Resources

The following section describes the various resources used to implement the scheduling algorithms at runtime.

Scheduler Tiers

A scheduler tier consists of a parent, which may be a scheduler root node, a pool root node or a basic scheduling node and a number of children, FIG. 6. The children may be basic scheduling nodes, thread or task descriptors or pool attachment nodes. By enabling child nodes to be scheduling nodes (i.e. the parent node of further scheduler tiers) in their own right, complex scheduler hierarchies may be built up.

Pool Distribution Tiers

Pool distribution tiers may contain only pool root nodes (1 only) and pool static nodes. There is only one pool root node per processing class.

Dispatch Queue Descriptor

Scheduler operators: used to define the scheduling policy that determines whether the currently executing task should be pre-empted.

Metric propagation operators: there are no metric propagation operators in a dispatch queue descriptor Metrics: the metric elements normally store the metrics of the currently executing thread.

Scheduler and Pool Root Nodes

Scheduler operators: used to determine the most eligible candidate of the scheduling cone.

Metric propagation operators: these are always set to inherit the metrics of the most eligible candidate of the scheduling cone.

Metrics: Hold the metrics of the currently most eligible candidate of the scheduling cone.

Scheduler Tier Element

Scheduler operators: used to determine the most eligible child candidate from the attached tier.

Metric propagation operators: user defined. Set according to the needs of subsequent scheduling stages.

Metrics: user defined. Set according to the needs of subsequent scheduling stages. Note that some metric propagation operators will update these fields automatically.

Pool Static Nodes

Scheduler operators: used to determine the most eligible candidate for pre-emption in a pool distribution tier.

Metric propagation operators: used to determine the propagation of the executing task metrics.

Metrics: Set according to the needs of the pool distribution algorithm. By default these will reflect the metrics of the currently executing thread, however, for certain distribution strategies a static allocation may be required.

Pool Attachment Nodes

Scheduler operators: not used.

Metric propagation operators: used to control the propagation of the most eligible task metrics.

Metrics: used to store the metrics of the most eligible task of the scheduling cone attached to the associated pool root node.

Thread Element

Metrics: used to convey information directly about the eligibility of the task for scheduling or from which a scheduler may calculate the eligibility.

Scheduling Behavior

The scheduling operation is split into two sub-categories:

Standard tier scheduling, where one or more entries within a scheduler tier compete to be the most eligible entry within a tier.

pool distribution scheduling—identifying which of a selection of processing resource instances should be interrupted.

No scheduling activity takes place unless a scheduling event is received.

Scheduling Push and Pop Events

As stated previously, changes in system state may cause a "push event" or a "pop event"—these events cause a reschedule to takes place. All scheduling operations are work conserving. Only parts of the scheduling hierarchy that could conceivably be affected by a given event are re-evaluated, these are the to exist within the rescheduling scope. FIG. 17 shows the rescheduling scope for a event on a basic scheduling hierarchy, FIG. 18 shows the rescheduling scope for a simple two instance processing resource pool.

Tier Scheduling

Tier scheduling is the most basic building block of the SystemWeaver scheduling algorithm. A scheduling event may cause a succession of tier scheduling operations as defined by the user configurable scheduling hierarchy. The result of each tier scheduling operation is the update of the parent scheduler (either a scheduling node or a scheduler root node) HeadIndex pointer. The metrics of the parent scheduler may also be updated according to the defined metric propagation algorithm.

In principle, tier scheduling starts at the current HeadIndex and iterates around the members of the scheduler tier (Although in practice, to minimise latency, push operations only update the scheduling decision against the current head pointer) establishing whether an update to the HeadIndex is required according to:

The event, which may be either a push or a pop operation
The scheduling algorithm associated with the event type (push or pop)
The metrics of the tier members If a more eligible entry is found, the HeadIndex is updated accordingly. Several special cases are observed which refine the behavior of the scheduling operation. In all cases dormant scheduler tiers are ignored in the scheduling operation.

At all times each scheduling node must be aware of the number of thread or task descriptors that exist in its child hierarchy to ensure that key fill parameters are maintained. However, it is not always necessary to fully schedule each tier—a flag is maintained which identifies where the immediate downstream reschedule operation has caused a scheduling decision update—if it has, the parent tier must also be fully evaluated, if it has not, there is no further need to reschedule the remaining upstream scheduler hierarchy (although certain other state updates are required).

The last operation in any reschedule is to determine whether the most eligible ready task should be allowed to pre-empt the currently executing task on a given PRI. The dispatch queue descriptor contains both a scheduling algorithm and the currently running tasks' metrics—these can be evaluated against the scheduler root node metrics, which contain a copy of the most eligible thread metrics from the scheduling cone.

Pool Distribution Scheduling

Pool distribution scheduling only takes place within pool distribution tiers. Whereas basic tier scheduling seeks to find the most eligible thread/task candidate for execution, pool distribution scheduling seeks to find the most eligible processing resource instance candidate for pre-emption. Typically this means identifying the processing resource instance running the task with the lowest eligibility of the pool of resources and comparing that with the metrics of the most eligible 'ready' task from the attached scheduling cone.

Where the most eligible ready task is of lower eligibility than all the running tasks, the remaining distribution cone on every attached processing resource instance is updated to ensure that each all scheduling tiers remain aware of the total number of accessible downstream tasks, however, no further scheduling is necessary.

Where a pre-emption candidate is identified, the scheduling update propagates towards that processing resource instance only.

FIG. 20 shows a sequence diagram for the rescheduling which occurs as a result of the push event shown in FIG. 18. A basic tier scheduling operation takes place at the pool root tier (tier #6) followed by a pool distribution scheduling operation. In this example node 5 was selected as eligible for pre-emption, hence the tier scheduling operation in tier #1 is executed. The subsequent dispatch tier scheduling operation results in a pre-emption to the attached processing resource instance. Thereafter tier #2 is also updated to ensure that its count of downstream task/threads is maintained.

Co-Operative and Pre-Emptive Scheduling

Pre-emptive scheduling enables the currently executing task to be asynchronously interrupted by a more eligible (higher priority) task. Pre-emption makes certain demands of the executing processing resource and context, for example, the ability to store state and resume once the pre-empter has left the resource. Typically pre-emptable tasks or threads will retain the same scheduling eligibility through the ready and executing states.

In contrast, co-operative threads only yield upon completion, for which a higher priority task must wait. In the SystemWeaver task management solution, co-operative threads maximise their eligibility when they enter into the executing state, thereby precluding the existence of a higher priority task and the potential consequent pre-emption.

Metric Propagation Behavior

Metric propagation can be caused by either scheduling events or modifications in the metrics of the executing task or thread.

Scheduling Event Metric Propagation

When the HeadIndex of the parent to a scheduling tier is updated as a result of a scheduling event, the metrics are propagated, from the most eligible child metrics into the parent metrics, according to defined metric propagation operators in the parent tier. These are dependant on the nature of the operation (push or pop event) and range in complexity from a simple copy to a multiply-accumulate.

Executing Thread Metric Propagation

The metrics of the currently executing thread may be modified dynamically—this may be used to obviate priority inversion conditions on locked resources. Where the executing processing resource instance is not participating in a distribution cone, only the dispatch queue descriptor metrics are updated. In the case of a distribution pool, the executing metrics are propagated to the pool static nodes associated with the processing resource instance (FIG. 21). The update of the PSN metrics are controlled by the metric propagation operators held within the PSNs themselves. In certain scheduling scenarios, static values must be persistent within pool static nodes.

In both cases a rescheduling event is instigated to ensure that the new executing metrics do not cause a change in the comparative eligibility of the executing and ready tasks. In the non-pool case, this is simply a reschedule of the scheduler root node metrics with respect to the new executing metrics. In the pooled case, the pool distribution tier, and all subsequent tiers, must be re-evaluated.

Idle Handling

When a processing resource instance enters the idle state, it uses the executing metrics to inform the scheduling structure. In essence, an idle processing resource instance is one which is "executing" the lowest possible priority task, and will therefore be pre-empted by the arrival of any task. The setting of the executing metrics to the idle value instigates a re-scheduling event in the usual way, thereby causing a "pre-emption" of the idle task by tasks waiting in the ready state structure for this processing resource instance.

For a more detailed description about the "idle task" and its impact on power management in processing resource pools, see section power management in pool scenarios section below.

Advanced Scheduling Modes

Several advanced modes and behaviors are capable either inherently or by adopting certain SystemWeaver configurations. The following modes are described in the following section.

Note that this is not an exhaustive list of available scheduling modes within SystemWeaver.

Timeslicing

Although SystemWeaver systems are principally event driven, traditional timer based systems, such as timeslicing, are available. Time-sliced tasks share a processing resource according to individual time slices periods, which determine the interval during which a task may occupy a processing resource (assuming no pre-empting tasks become ready during this interval).

Time-sliced tasks exhibit a slightly modified "running" behavior to ordinary tasks (shown in FIG. 1). FIG. 22 shows the two parts of the running state; normal and deprecated.

This section describes the behavior of Timeslice tasks, together with the rules which must be observed when configuring them.

SystemWeaver Core Resources

The following section discusses the resources used to implement the Timeslice feature within the SystemWeaver server core.

A.1.1.1 Counters

A per-processing resource instance counter is used within the SystemWeaver core to facilitate Timeslice behavior. A single pre-scaler is also provisioned, which is fed by the system clock. The bit resolution of the pre-scaler is set at chip design time.

A.1.1.2 Timeslice Status Indicator

A status bit within the per-processing resource instance interrupt status register is set aside for Timeslice behavior. This status bit registers the expiry of the Timeslice counter and may be used by software to determine whether a Timeslice event has taken place.

Configuration

All tasks within a Timeslice group must share the same priority and the same parent-scheduling tier, furthermore, Timeslice tasks should not share scheduling tiers with other non Timeslice tasks. The scheduling algorithm of the Timeslice parent should be set to FIFO. FIG. 23 shows a typical timeslice configuration, where a Timeslice group operates in the background with a group of foreground, event driven tasks, taking priority as and when they require service.

Behavior

When a Timeslice task first commences execution, a system-wide Timeslice value is copied into the Timeslice counter associated with the processing resource instance. The Timeslice task is said to enter its 'normal' running state (FIG. 24). In the normal state, each cycle decrements this counter. Upon reaching 0, the executing priority of the task (stored within the dispatch queue descriptor) is automatically decremented by the hardware and the task enters the 'deprecated' state. At this point the timeslice interval counter switches over to the traditional watchdog mode.

In the case of a single processing resource instance serving a number of Timeslice tasks, the act of decrementing the executing priority (with the associated reschedule operation) will cause a pre-emption by another member of the Timeslice group within the ready state structure. By interrogating the timeslice status bit the software client can determine that the timeslice duration has expired and push the, now pre-empted, task to the back of the FIFO queue. Hence the group obeys the configured Timeslice rules whilst largely maintaining the normal operating mode of SystemWeaver core scheduling and client behavior.

When a timeslice task is pre-empted by a non-timeslice task, whilst in the 'normal' timeslice state, the outstanding timeslice duration is copied into the task control block. The task is then pushed back into the Timeslice group at the head of the FIFO queue. When any pre-empting task processing is complete, the timeslice tasks are resumed with the remaining Timeslice of the pre-empted task being re-instated to the Timeslice counter.

When a timeslice task is pre-empted in the 'deprecated' state, it is pushed back to the tail of the timeslice group FIFO queue. In both cases the priority metric of the timeslice tasks remain at their original configured value.

Where a Timeslice group is served by a pool of processing resource instances (assuming no pre-empting tasks), entry into the 'deprecated' state may not necessarily cause an immediate switch to another Timeslice group member. Note the following observations:

$$T_p = (t*d)/p \text{ where } (1 \le p \le t)$$

$$T_{ready} = T_p - d$$

$T_p$ The period of a full rotation of a timeslice group (executing each member task once).

$T_{ready}$ The amount of time per cycle during which a given task is waiting in the ready state.

t The number of Timeslice tasks p The number of processing resource instances in the pool d The duration of each Timeslice interval Note that, when p=t, in the absence of any other pre-empting tasks, the Timeslice tasks run continually.

Execution Profiles

The following execution profiles illustrate SystemWeaver timeslice behavior:

FIG. 25 shows the classical case with a single processor and three timeslice tasks. They each timeshare according to the timeslice interval until a pre-empting task arrives at which point the timeslice task (number 2 in this case) yields. Upon completion of the high priority pre-empting task, the original timeslice task resumes to complete the interrupted interval.

FIG. 26 shows the same scenario with two processors. Initially the three timeslice tasks are shared amongst the two processors. When the pre-emption arrives, the timeslice tasks share the remaining processor and, upon completion of the pre-emption task, they resume execution on two.

FIG. 27 demonstrates that, when the number of available processing resources equals the number of timeslice tasks, each timeslice task runs continuously on one of the processors. When a high priority task takes control of one of the processors the timeslice group automatically share the remaining processors according to the defined timeslice interval.

Power Management in Pool Scenarios

The default behavior of a processing resource pool is to evaluate a scheduling decision from the first pool static node within a distribution tier. The pool root node (PRN) has a parent pointer which ordinarily points to the first pool static node (PSN) in a distribution tier (FIG. 28). When evaluating a candidate for pre-emption, the comparisons start from this entry and progress around the list using the peer pointers.

If all static nodes are of the same eligibility, and that eligibility is lower than the candidate from the scheduling cone, the first node encountered will be chosen. Hence, in low load scenarios, where one or more of the processors is idle (having set their metrics to the idle value), the processing resource instances nearest the parent pointer of the PRN will be favored for processing new tasks and processing resources furthest from the parent pointer will exhibit long idle periods.

This behavior is useful when the processing resource instance or macro-architecture has the ability to modulate power consumption (i.e. by clock-gating, voltage/frequency modulation, power isolation etc). These features may be leveraged by adding appropriate driver code to the software client shim.

Different power saving measures tend to exhibit differing impacts when the processing resource must re-awaken—for example, clock gating may maintain all state within a micro-architecture whereas aggressive voltage/frequency scaling may sacrifice all existing state and exhibit undesirable in-rush currents when re-awakened. In cases where a given PRI has many power-down options of differing costs, and with the scheduling behavior described above, it makes sense to manage their usage according to the time spent idle.

The 'idle' state can be split into multiple sub-states according to the capabilities of the processing resource instance and system macro-architecture. It is likely that it will be more costly to restart from some states than others (for example contrast a state retaining clock-gating power-down with a power isolated state). To support these scenarios SystemWeaver supports multiple idle priorities.

For those processing resources with multiple sub-states, interrupt response may be to transition steadily back into the idle state before thread execution resumes. This permits gradual re-introduction of a processing resource into the active set of a given distribution.

EXAMPLE

FIG. 29 shows the "executing priority" of a processing resource instance (PRI) as time passes in an idle state using ascending priority. In the first instance, the idle task sets the priority to its lowest possible setting, giving the PRI the highest possible chance, when compared to its distribution pool peers, of a task assignment from the scheduler.

After time the idle task invokes a power down mode, perhaps supported within the processing resource micro-architecture. At this point the idle task increases the executing priority of the PRI to reduce the likelihood of a task assignment (PRIs in the previous state will take precedence).

Similarly after another period, the idle task (or some other agent), increases the executing priority still further, (perhaps isolating the power to the PRI—thereby eliminating static leakage). The modulation of the priority makes the PRI's eligibility for a task allocation still lower—consistent with the cost (in this case in-rush current, cold cache effects etc) of re-awakening this processing resource.

The favored pre-emption of the first entry in a distribution tier is sometimes undesirable. Where this is the case, a different behavior may be selected where the previous scheduling decision becomes the new starting point for subsequent scheduling operations. This selection exhibits a more fair distribution of high priority pre-emption tasks amongst processing resource instances within a distribution pool.

Hysteresis Based Scheduling

In some cases it is desirable to maintain a scheduling decision regardless of its ongoing absolute correctness. Generally this is where the cost of establishing a context for a particular class of task or dataset is high and therefore should be aggregated over multiple tasks where allowable. Examples where this is the case include:

Processor caches—a cache memory which has been populated for a historical algorithm or dataset will show poor affinity with a disparate algorithm and/or dataset. This is referred to as a cold cache effect and exhibits a high cache miss ratio and consequently poor performance.

Reconfigurable FPGA partitions—Partial runtime reconfigurability enables a portion of the FPGA to be dynamically reconfigured whilst the chip is deployed and operational, enabling the execution of different algorithms over time. However, the cost of switching from one algorithm to another is high and must be aggregated over larger datasets to ensure system efficiency.

Both of these are examples of costly context switches.

Hysteresis based scheduling may be used to avoid some of the ill effects by aggregating the cost of context switches across multiple user operations. By using one of the metrics to represent a 'system cost' parameter, hysteresis based scheduling can be enabled. The hysteresis metric may be based on numerous measures of cost within the system:

Task memory occupancy; where memory is at a premium, the accumulated footprint of a given task queue may be used to determine when to schedule the new configuration.

Processing requirement; where it is desirable to aggregate the cost of a context switch over a substantial "active processing" period.

Timeslice; where jitter on latency is important.

For example, in the case of a dynamically reconfigured FPGA, a memory may be accumulating work for each of the algorithm contexts multiplexed on a single portion of reconfigurable fabric—in this case the memory occupancy may be a factor in deciding when to reprogram the array. In all cases it is possible that a scheduler hierarchy will be designed to accommodate forced switches due to the arrival of high priority tasks.

The key system level challenges are summarised below:
The impact of the cost of a context switch (time to switch, inrush current)
The timing of the switch
How to manage the accumulation of work for a given context whilst it is not active.

The following sections describe possible approaches to managing dynamic FPGA reconfiguration using SystemWeaver. Management of cold caches can be achieved using similar scheduling techniques and simpler software client shim behavior.

FPGA Runtime Reconfiguration

Although there are very strong analogues with processor context switching, a couple of (re) definitions are required:

Configuration—one of a suite of programming variants which may be targeted at a given portion of the FPGA fabric.

Context switch—the act of changing the configuration of a reconfigurable portion of the FPGA.

Task—a single unit of work carried out by a given FPGA configuration.

In this proposal configurations targeted at the reconfigurable portion of the FPGA are regarded as cooperative (as opposed to pre-emptive), that is to say that individual tasks are indivisible and must complete before a context switch can take place. This ensures that tasks need not be re-entrant and bounds the problem of state retention between contexts to one where the number of tasks awaiting a particular configuration must be an integer value. A logical view of the management of outstanding tasks is shown in FIG. 30:

Tasks are organised into queues. These queues exist in perpetuity; in particular, they accumulate work for FPGA configurations which are not currently active. The scheduler determines when to switch tasks and manages the order of execution of tasks within a task group. The reconfiguration support logic manages the mechanics of reprogramming the fabric and signalling when it is complete. According to the cooperative nature of this model, there is no data that requires retention within the fabric when a context switch is scheduled.

A.1.1.3 The Scheduler

The scheduler performs two distinct functions:
It continuously evaluates the current scheduling decision according to the changing state of the task queues.

It manages the execution order of tasks within an individual task queue.

Each and every task arrival causes an update of the scheduling decision to ensure that the FPGA fabric is in the correct state at all times (greedy scheduling). Within the task queues the scheduler mandates the order of execution according to attributes defined by the system architect. As a minimum the scheduler should provide FIFO, round robin and priority policies.

A.1.1.4 Reconfiguration management using SystemWeaver

The SystemWeaver solution provides a rich set of scheduling and interprocessor communications capability which can be deployed to manage runtime parallel execution and interprocess communication. The features of SystemWeaver may efficiently manage tasks and context switches within traditional instruction set architectures, fixed hardware elements and reconfigurable FPGA blocks alike. An example architecture is shown in FIG. 31:

SystemWeaver handles the management of scheduling of FPGA fabric context switches and the ordering of tasks within the individual tasks queue. Naturally, this is in addition to scheduling more traditional tasks to the fixed configuration elements within the platform.

The reconfiguration itself is handled with a particular SystemWeaver hardware client shim. Note that similar scheduling techniques to manage cache "warmth" place no additional requirements on the standard client shim. Each scheduled task control block received by the client shim is compared with the existing configuration of the fabric. If the currently loaded configuration and the scheduled task's configuration differ, the client shim reconfigures the fabric without further interaction with the SystemWeaver core. The fabric update decision, then, is exclusively under the control of the output ordering of tasks, as dictated by the scheduler. The client shim can be re-designed to accommodate dissimilar reconfiguration strategies.

A.1.1.5 The Scheduling Policy

The scheduling policy should be determined by the system designer. However, there are key capabilities which must be available to support this feature. In particular, it should be possible for scheduling algorithms to exhibit hysteresis, i.e. to stick on a scheduling decision until a sufficient cost has accumulated elsewhere to warrant a switch to an alternative decision.

In the example shown, each "task" has a randomly generated metric which is added to the accumulated metrics representing the task group. When a given task group is served the "pop" operation, which removes a task from the queue, decrements this accumulated count.

When a "push" (a new task arriving) or a "pop" operation occurs the fabric scheduler evaluates each candidate against the metrics of the currently executing task group. According to the algorithm given in FIG. 32:

$$\text{Update Required} = (C_{candidate} > C_{current} + \text{Hysteresis})$$

$C_{candidate}$ The accumulated cost of the tasks within the candidate scheduling tier.

$C_{current}$ The accumulated costs of the outstanding tasks within the currently selected scheduling tier.

Hysteresis The hysteresis added to avoid context thrashing.

FIG. 33 shows a scheduling hierarchy which could be chosen to implement the algorithm described above. In this case metric 1 of the "hysteresis scheduler" stores the hysteresis operand. Metric 0 may be used to store the static priority of the hysteresis group, this priority is used when scheduling between the hysteresis group and the pre-empter group. The assumption is that there are some tasks which are of sufficient priority to force a context change.

A.1.1.6 Results

FIG. 32 shows the conceptual effect of such a system. The task scheduling output is deliberately blocky in nature, which gains maximum use of any given configuration whilst managing the impact on system traffic shaping.

FIG. 34 shows the results of a simulation of the presented scheduling algorithm. The accumulated "cost" of tasks awaiting each of four configurations are plotted along with the overall sum of all the costs ("cumulative"). The selection trace indicates which of the available configurations will be selected by the algorithm.

Compound Scheduling Algorithm Example

Compound scheduling operators are useful, for example, when scheduling processing resource pools in pool distribution tiers. For example, perhaps a subset of the members should only be eligible when the queue fill of tasks awaiting processing exceeds a certain threshold.

Consider the case where three processing resources are available; 1 RISC processor and two DSPs (FIG. 35). Each of these resources is theoretically capable of performing a speech encoding operation, but the DSP devices are more efficient. In this case, the RISC processor would be present in the speech encoding pool, as shown, but its eligibility to participate in the execution would depend upon the depth of the queue of tasks waiting for the function.

In such a configuration, the pool root node metric 0 might represent priority whilst metric 1 might represent queue fill. In each of the candidate PSNs, metric 0 will normally represent the executing priority of the tasks running on their respective processing resource instances (PRIs). In this case metric 1 will represent the queue fill required to make their associated PRI eligible for scheduling. In this case the compound scheduling algorithm is:

$$\text{Update Required} = (M_{current}0 > M_{candidate}0) \&\& \\ (M_{current}1 > M_{candidate}1)$$

In the PSNs associated with the DSP devices, M1 will be set to 0, therefore the algorithm is purely determined on the basis of priority. In the case of the RISC processor, M1 will be non-zero, hence the queue fill, represented by $M_{current}1$ must have grown to exceed this value for the RISC processor to participate in the execution of the algorithm.

The following describes the SystemWeaver server at a macro-architectural, or transactional, level.

As mentioned previously, there are four elements to the SystemWeaver hardware solution:

the SystemWeaver server core
the SystemWeaver tightly coupled memory
the SystemWeaver debug manager
the SystemWeaver client shims Global metric agents are optional and are used when the system design requires the inclusion of system global state in the scheduling decision.

Primary Connection Groups

Figure 38:
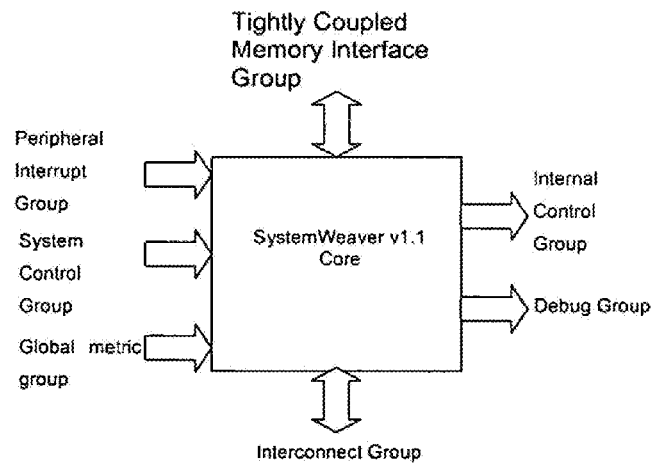
FIG. 38 shows the interface groups found on the core periphery in accordance with one embodiment of the present invention.

FIG. 38 shows the interface groups found on the core periphery.

To ensure that the SystemWeaver core may be easily integrated all signals are unidirectional and synchronous to a single clock. Details of the constituent members of these groups are given below. All signal directions are given with respect to the SystemWeaver core.

System Control Group

The system control group contains the miscellaneous signals required to ensure the correct operation of the SystemWeaver core. These include system clock, real time clock and reset signals.

Global Metric Group

In some systems it is desirable that certain system metrics are used during the scheduling decisions. These metrics may represent various factors, such as interconnect busyness, cache hit ratio, memory occupancy etc, Peripheral Interrupt Group The peripheral interrupt group consists of a group of interrupts sourced from outside the SystemWeaver controlled system. Signals in the peripheral interrupt group may be driven from, for example, input interfaces with the outside world or directly from outside the SoC device via pins. The number of peripheral interrupt inputs is defined at SoC design-time.

Internal Interrupt Group

The internal group consists of two groups of synchronous interrupts sourced by the SystemWeaver system and a single group of runtime system debug signals. The number of each signal within a signal group will typically correspond with the number of processing resources within the system and will be defined at SoC design-time.

Tightly Coupled Memory Interface Group

This group interfaces SystemWeaver to its own private tightly coupled memory resource. The attached memory is assumed to be a synchronous SRAM device. The width of the address path, n, and the width of the datapath, m, are defined at SoC design-time.

Interconnect Group

The individual interconnect strategy, including protocol and number of layers, must be set at SoC design time. The details of any given bus interface signals may be found in the corresponding bus-specific implementation.

Debug Interface Group

For details of the interfaces to the debug manager please consult co-pending International PCT Application No. PCT/GB2005/003525, which is herein incorporated by reference.

Tightly Coupled Memory (TCM)

SystemWeaver TCM is a standard compiler SSRAM technology supplied by numerous EDA vendors. The TCM contains an integer number of SystemWeaver Memory Elements (WMEs) as defined at SoC design time according to the needs of the application. Each WME consumes 256 bits of memory space. SystemWeaver supports a maximum of 65536 WMEs, or a 16 Mb memory.

Although queue descriptors do consume WMEs, in a typical system the number of WMEs required would be dominated by thread support requirements. For example, a system capable of supporting 400 threads simultaneously within the SystemWeaver server would require approximately 128 kb of attached memory.

At SoC design-time, the memory interfaces can be modified to simplify routing.

Server Core Sub-Block Description

Figure 39:
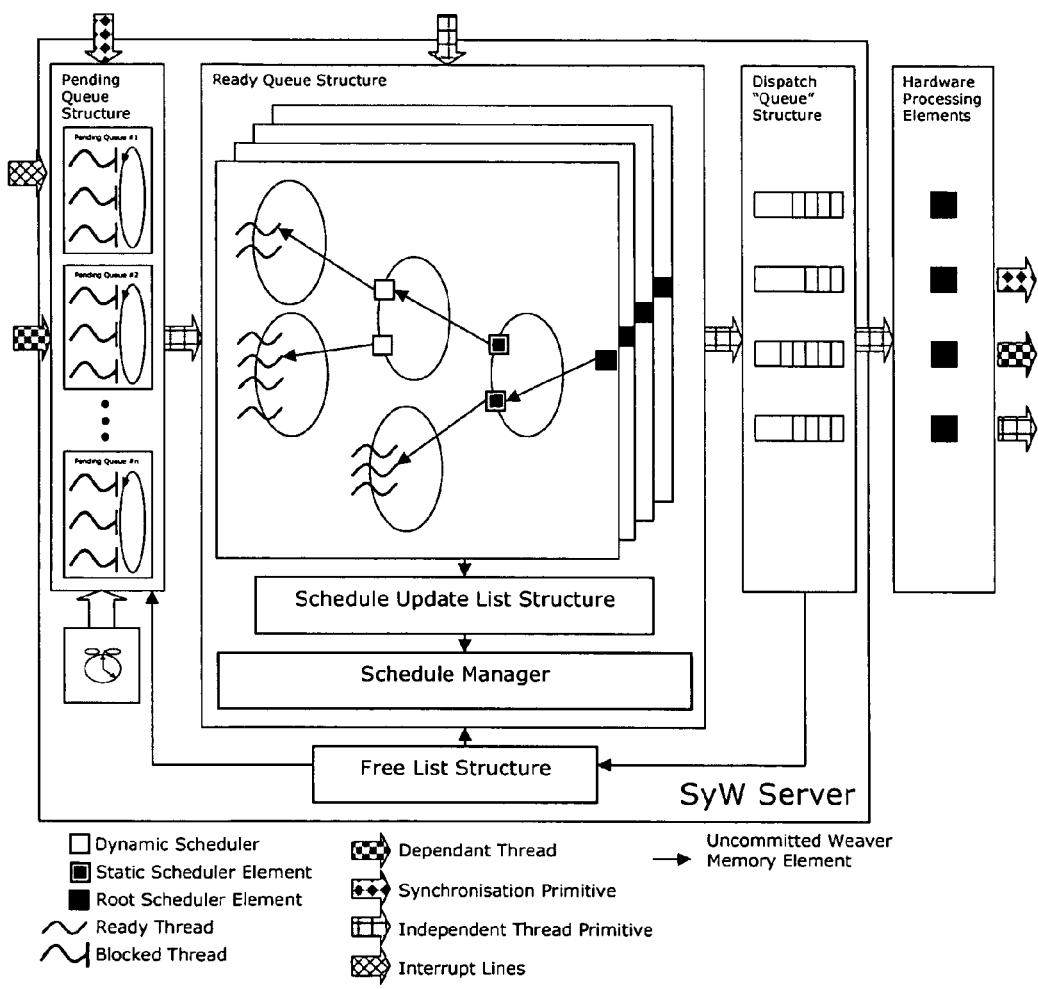
FIG. 39 shows exemplary logical components of the SystemWeaver server entity in accordance with one embodiment of the present invention.

The main logical components of the SystemWeaver server entity are shown in FIG. 39. These functions are mapped onto the architecture shown in FIG. 40. The functionality is split amongst four primary internal parallel processing elements, performing the following functions:

Thread Scheduler Input Manager (TSIM): Free list maintenance, WME recovery.

Thread Scheduler Pending Manager (TSPM): Pending list maintenance, synchronization, promotion to Ready queue structures. The Thread Synchronization manager maintains the integrity of the pending queue structures (insertion and extraction).

Thread Scheduler Output Manager (TSOM): Ready queue maintenance, dispatch queue maintenance, processing resource power management, interrupt generation. Maintenance of integrity of the ready queue structures (insertion and extraction)

Thread Scheduler Schedule Manager (TSSM): Maintenance of scheduling decisions for each processing resource within the ready queue structure.

Additionally a number of blocks provide support functions:

Thread Scheduler Memory Manager (TSMM): Aggregate access to the attached SystemWeaver memory, including mutual exclusivity and locking.

Thread Scheduler Interrupt Manager (TSIC): Convert incoming system interrupts to internal synchronization primitives.

Thread Scheduler Interface Manager (TSIF): Providing interconnect interfacing and configuration and run-time access to SystemWeaver resources.

Figure 40:
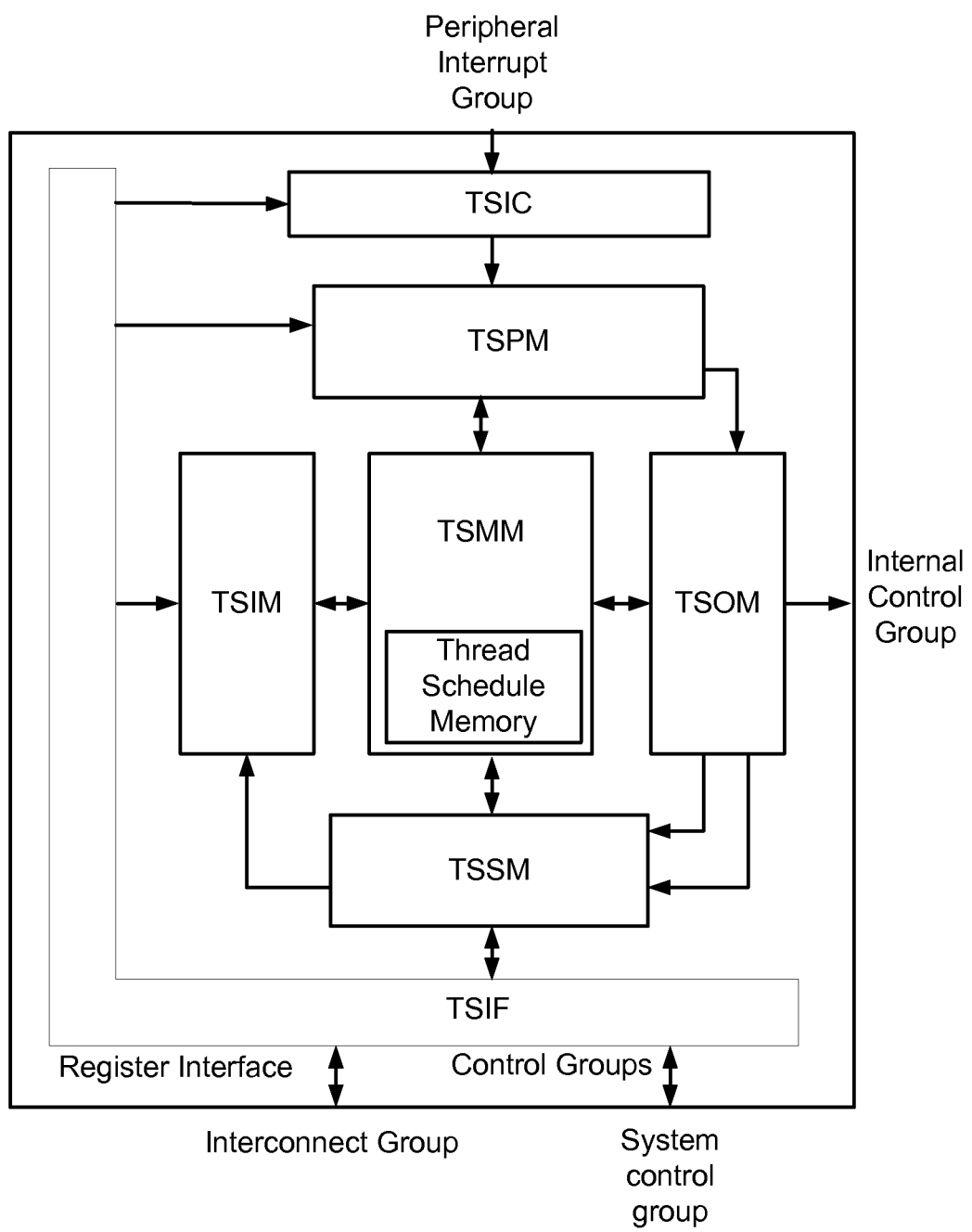
FIG. 40 shows exemplary principle sub-blocks of the SystemWeaver architecture in accordance with one embodiment of the present invention.

FIG. 40 shows the principle sub-blocks of the SystemWeaver architecture. The following sections elaborate the intra-subblock interaction between these components. Each sub-block presents a set of "public methods" to other sub-blocks, enabling each to instruct its peers to execute manipulations on their respective maintained structures.

Where a command may complete with particular conditions, status flags are administered within the sub-block.

Arrow directions on sub-block interface diagrams indicate master-ship of the bus and are no reflection on the direction of individual elements of the signal group.

Stateful Descriptor Behavior

Numerous descriptor types are used during the operation of SystemWeaver (for further details see co-pending International PCT Application No. PCT/GB2005/001154, which is herein incorporated by reference). The majority of these descriptors are stateless, however, thread descriptors and scheduler descriptors may transition through numerous states under certain circumstances. This document describes these state transitions and the events which cause them Thread Descriptors There are two types of thread descriptor recognised internally by SystemWeaver; the standard thread descriptor and the marker thread descriptor. The latter are used exclusively for synchronizing the process of removing scheduling hierarchy whilst guaranteeing the integrity and ordering of previously queued thread descriptors.

FIG. 41 shows the internal thread state diagram through which both thread descriptors and marker thread descriptors traverse. Note that states New and Free are meta-states which have no direct correlation with a persistent state within SystemWeaver. A literal state variable does not exist within the thread descriptor instead the state is represented by a number of flags. Table 3 gives the correlation between flag state and the state in which the thread exists in FIG. 41.

Standard Thread Descriptor State Descriptions

The following sections give a brief description of the state and the events which cause entry and exit from it.

New

The new state is transient. New threads are introduced to the TSIF by a push independent or dependant thread command. The two cases are processed as follows:

Independent threads (threads with no time or synchronization dependency) immediately transition into the pushed state. In this instance the TSIF instructs the TSSM to introduce the thread into the ready queue structure.

Dependant threads (threads with a time or a synchronization dependency) transition into the blocked state. The TSIF instructs the TSPM to introduce the thread into the pending and timing queue structures as appropriate.

Blocked

In the blocked state thread descriptors are waiting for either an external synchronization and/or a timing based synchronization. Blocked threads originate at the TSIF. When the appropriate synchronization is received the TSPM transitions the thread into the Pushed state and instructs the TSSM to introduce the thread into the ready queue structure.

Pushed

Threads in the pushed state have either been synchronized or where originally independent, the TSPM (dependant threads) and TSIF (independent threads) would have managed the transitions into the pushed state in these respective cases. The TSSM pushes the thread into the ready queue structure and transitions the thread into the ready state. A transition into the ready state causes a reschedule to take place.

Ready

Threads in the ready state have either transitioned from the pushed state or have been flushed back into the ready queue structure (by the TSSM). The transition into the ready state always instigates a reschedule. Threads can transition out of the ready state into either the popped state or the flushed state, the latter being as a result of a specific condition which traverses the popped condition to flushed in a single operation. Threads transition into the popped state when they have been nominated as the most eligible candidate for scheduling by the TSSM.

Popped

Threads in the popped state have been nominated by the scheduler (TSSM) as the most eligible threads for processing by a particular processing resource instance or a group of instances, they are transitioned into this state by the TSOM. Threads can transition into either the flushed state or the zombie state from the popped state:

Threads are transitioned by the TSOM into the flushed state as a result of a more eligible thread being identified as a result of a reschedule.

Threads are transitioned by the TSOM into the zombie state as a result of commencement of processing in one of the system processing resource instances. The zombie state maintains the thread descriptor until it can be freed.

Zombie

Zombie threads are processed within the TSSM. The existence of the zombie state is to guarantee that all dependencies on a given thread descriptor have been dispensed with prior to the freeing of the thread. This is guaranteed once the thread has reached the front of the TSSM processing queue, therefore no further processing is required.

Flushed

Flushed threads are processed by the TSSM. Flushed threads must be re-introduced into the ready queue structure, causing a reschedule operation. Once this is complete the thread is transitioned back into the ready state by the TSSM.

Free

The free state is a transient state indicating that the WME consumed by the thread descriptor is placed back on the free list.

Marker Thread Descriptor State Descriptions

The following sections give a brief description of the state and the events which cause entry and exit from it.

New

The new state is transient. New marker threads are introduced to the TSIF by a push marker thread command. Marker threads always traverse the blocked state, to ensure that any processing which exists in the input and output work queues of the TSPM, which could affect the status of the scheduler tiers which marker threads are ultimately deleting, has been completed prior to the arrival of the marker thread itself.

Blocked

The TSPM immediately transitions marker threads into the Pushed state and instructs the TSSM to introduce the thread into the ready queue structure.

Pushed

The TSSM pushes marker threads into the ready queue structure and transitions the thread into the ready state. A transition into the ready state causes a reschedule to take place.

Ready

When marker threads are introduced to the ready queue structure, they unlock their immediate parent. The liberation of that parent scheduling tier is then under the control of the count of the number of dependant threads. Marker threads are only eligible to transition out of the ready state when their parent's dependant thread count has reached zero, i.e. there are no further thread descriptors within SystemWeaver which are dependant on the existence of the parent scheduling tier.

Like standard threads, Marker threads can transition out of the ready state into either the popped state or the flushed state, the latter being as a result of specific condition which traverses the popped condition to flushed in a single operation. Marker threads transition into the popped state when they have been nominated as the most eligible candidate for scheduling by the TSSM.

Popped

Marker threads in the popped state have been nominated by the scheduler (TSSM) as the most eligible threads for processing by a particular processing resource instance or a group of instances, note that this scheduling decision is a special case, indicating that the scheduling tier is empty and that no further dependant threads exist. Marker threads can transition into either the flushed state or the zombie state from the popped state:

Marker threads are transitioned into the flushed state as a result of a more eligible thread being identified as a result of a reschedule.

Marker threads are transitioned into the zombie state as a result of commencement of processing in one of the system processing resource instances. The zombie state maintains the marker thread descriptor until it can be freed. Additionally, the parent of the marker thread is also marked for deletion during within this state.

Zombie

The processing of zombie marker threads is similar to that of normal thread descriptors. The parent scheduling tiers of marker threads will also be deleted within this state.

Free

The free state is a transient state indicating that the WME consumed by the thread descriptor is placed back on the free list.

Scheduler Tier State Diagram

Scheduler tiers also have implicit state. For a static tier, i.e. one whose persists throughout the runtime of the system, the only state is active. The remaining states are used by dynamic scheduling tiers, i.e. those that come and go during runtime. Table 4 gives the correlation between flag state and the state in which the scheduler tier exists in FIG. 42.

Scheduler Tier Descriptor State Descriptions

The following sections give a brief description of the state and the events which cause entry and exit from it.

New

The new state is transient. New scheduler tiers are introduced to the TSIF by a push independent element during initialization or at runtime.

Dormant

In the dormant state, the scheduler tier is permitted to accumulate threads and potentially additional child-hierarchy but will never be scheduled by the TSSM. The dormant state may be entered in two ways:

A new scheduling descriptor can be created in the dormant state

A scheduling tier may be modified at runtime and placed into the dormant state through an explicit system command issued through the TSIF.

The dormant state can only be exited by an explicit system command.

Active

Scheduler tiers in the active state actively participate in scheduling and are locked, meaning they will not be removed when they become empty. Static schedulers will typically be created in this state. Dynamic schedulers transition into this state via an explicit system command received through the TSIF. The scheduler tier only exits the active state when a marker thread is received, wherein it enters the "pending free" state.

Pending Free

Scheduler tiers remain in the pending free state until the following two criterion are both satisfied:

The number of dependant elements, which is a count which keeps a measure of the number of descriptors which reference this one, becomes 0

The number of child elements becomes zero

Note that this implies that the marker thread descriptor, which caused the transition into the Pending free state has also been popped, an action which only takes place when the scheduler tier has no further dependencies.

Free

The free state is a transient state indicating that the WME consumed by the scheduling tier descriptor is placed back on the free list.

Inter Subblock Behavior

The following section covers aspects of SystemWeaver behavior which involve multiple subblocks.

Dynamic Scheduling Hierarchy Manipulation

It is possible to add and remove scheduling hierarchy during system runtime. If certain user level procedures are respected, SystemWeaver guarantees the integrity of the system and the ordering of thread descriptors which transition from one part of scheduling hierarchy to another. For further details, please see above.

Dynamic Scheduling Metric Update

It is possible to update the metrics within a standard or marker thread. Behavior is dependant on thread state:

If the thread is in the blocked state, an appropriate command is sent to the TSPM. Since the pending queue is sorted, the thread is removed from and re-inserted into the queue when the metrics are updated to ensure that it reappears at the appropriate point.

If the thread is in any other persistent state a command is issued to the TSSM which performs the metric update and reschedules the appropriate part of the scheduling hierarchy.

TSOM/TSSM Interaction for Scheduling

Both the TSOM and the TSSM play a part in the scheduling of thread descriptors to processing resource instances. Some example sequence diagrams of the interactions between the TSOM and the TSSM are given in FIGS. 72 and 73.

Intra Subblock Architecture and Behavior

Each sub-block is discussed in terms of its primary IO, or physical interface to its peers and the outside world, and also in terms of its command interface, or the methods which may be called using the command protocols over the appropriate physical interface.

TSIF—Interface Manager

The interface manager is responsible for orchestrating the execution of commands received from the interconnect group and distributing them to the other sub-blocks.

The following section describes the functional entities which exist within the TSIF and are above and beyond simple translation of commands for internal consumption.

Architecture

The TSIF primarily interprets commands received over the interconnect interface into one or many internal commands to the remainder of the sub-blocks. The following sections give details of the architectural resources which exist within the TSIF.

Semaphore Region Locks

Semaphore region locks (SRL) provide a resource which may be tested and locked atomically by any system resource to gain exclusive access to a system resource. They may be used for any number of reasons:

To lock a region of system memory containing one or more shared resources (for example, semaphores objects, task control objects etc), thereby guaranteeing integrity.

To lock the SystemWeaver command interface for a multi-cycle command access

To lock the SystemWeaver debug event interface for multi-cycle events.

SRLs have two states; locked and unlocked. Reads from SRLs are defined as attempts to gain lock, writes to SRLs are defined as attempts to unlock. There is no required correlation between the processing resource instance which locks a particular SRL and that which releases it. The behavior is described below:

Unlocked. In the unlocked state a read from an SRL returns a control code which indicates to the reader whether the lock attempt was successful. Writes have no effect in this state.

Locked: In the locked state a read from the SRL indicates that the SRL is not available. A write frees the SRL.

Command Handling

The TSIF breaks commands received from the system interconnect into possibly multiple internal commands.

Watchdog and Time-Slice Support

A dual-mode timer counter is optionally provisioned for each processing resource instance. The two timer modes are watchdog and timeslice, the default mode is watchdog.

Watchdog behavior is defined by a watchdog cycle and the individual counts (FIG. 44). Watchdog cycles are a stepped down version of the system clock, with the step down being defined by a system constant at silicon design time. FIG. 46(*a*) shows the behavior for each processing resource instance on each prescaled watchdog clock cycle:

the individual watchdog counters are interrogated to determine whether a watchdog interrupt is appropriate.

if necessary a watchdog interrupt is generated.

The watchdog timer count is reset on each control access from the processing resource instance into which the timer relates, hence, only processing resources which do not access SystemWeaver over the watchdog interval, experience a watchdog interrupt.

The Time-slicing behavior, described previously, is partitioned between the TSIF and the TSOM. In the TSIF, timers allocated to each processing resource may be dedicated to timeslice support. When a timeslice interval occurs, automated metric manipulation is provided in the TSOM (the running priority is decremented). The processing resource itself is only pre-empted if, as a result of the automated metric update, a standard pre-emption becomes appropriate.

FIG. 45 shows the per system clock cycle behavior of the timeslice support logic within the TSIF. FIG. 46(b) shows the behavior for each processing resource on each cycle of the prescaled timeslice clock. Note that, after a timeslice event has taken place, the timer mode is reverted to watchdog mode.

Interrupt Handling

SystemWeaver accepts interrupts from the system, peripheral interrupts, and sources interrupts to the system, processing resource instance interrupts.

Peripheral Interrupts

Peripheral interrupts may be masked and conditioned within the TSIF (edge/level triggered, negative/positive logic etc).

Processing Resource Instance Interrupts

Interrupt handling resources are provisioned within the TSIF to provide the following facilities:

Maintain interrupt status, including the source of an interrupt assertion (pre-emption, timeslice, watchdog)

Mask ability.

A special feature is implemented within the TSIF to automate interrupt masking on the SystemWeaver command interface. Since the command interface is a common access point for all processing resources within the system, integrity and efficiency must be maintained. For this purpose, SystemWeaver automatically handles interrupt masking when a processing resource gains a lock on the SystemWeaver command interface to ensure that the processing resource is not interrupted during this critical section of code.

A counter is maintained for each processing resource instance which tracks the number of successful SystemWeaver command interface semaphore region lock requests which have been received. Each lock request increments the count and each unlock request decrements it. When the counter is incremented from zero, interrupts are automatically masked, when the count is decremented to zero, interrupts are automatically unmasked.

TSIM—Input Manager

The input manager administers to the WME free list, handling pop requests from the TSIF and push requests from numerous sub-blocks (TSIF, TSPM, TSOM, TSSM).

Architecture

The TSIM contains only one architectural entity, the SystemWeaver memory element (WME) free list. FIG. 48 shows the structure of this list.

The free list operates according to a last in first out (LIFO) policy. Every member of the list is of type C_SCHED_ENTRY_FREE and is singly linked using the pointer referenced by C_FREE_QUEUEPOINTER_INDEX.

Method Interface

As well as basic linked list housekeeping methods (get and set status), the input manager presents the following commands on its interface:

Push Free Index (C_TSIM_CMD_PUSH_INDEX)

Caller: (TSIF, TSSM, TSOM, TSPM)

The push free index command is used to push a liberated WME index back onto the free list. The arguments are summarised below:

| unsigned short Index | Index of newly liberated SystemWeaver memory element |
|---|---|

Pop Free Index (C_TSIM_CMD_POP_INDEX)

Caller: TSIF

The pop free index command is used to pop a free WME index from the free list. The arguments are summarised below:

| unsigned short *pIndex | Reference to location in which to place newly allocated WME Node ID. |
|---|---|

TSPM—Pending Manager

The pending manager administers to task or thread descriptors blocked pending some event; either synchronization or timer based. Individual pending list associations are under user control (or the control of higher layer software), they may represent a semaphore, a contention domain, an interrupt or any combination of these.

Architecture

The pending manager includes two principal elements; a variable number of pending queues and a timer queue. The pending queues store lists of threads awaiting synchronization by some external event whereas the timer queues store a list of threads awaiting a timeout. It is possible, and indeed common, for a thread descriptor to be a member of both lists, whereby a thread descriptor is permitted to wait for an external synchronization event for a bounded length of time.

Pending Queue Structure

The pending queue structure of FIG. 50 is primarily instanced within the tightly coupled memory, with resources and capabilities within the TSPM for processing its contents. The TSPM itself contains a head pointer and a number of elements which reference a list of pending queue descriptors, i.e. a list of lists. Each pending queue contains a list of thread descriptors, the number of pending queues may grow and shrink dynamically at runtime. All thread descriptors in the blocked state exist in a pending queue (in contrast to the timer queue, in which threads only appear if they have a defined timeout). The use of multiple pending queues is dependant upon the needs and preferences of the application and the application programmer Pending queues may be associated with, amongst other things:

A semaphore. This is likely to result in a large number of pending queues containing few threads each. Hence the worst case synchronization response time will be low under these circumstances.

A contention domain. A contention domain is a zone within multiple entities compete for the same resources. For example, a process (as opposed to a thread) may be regarded as a contention domain.

Interrupts. For the fastest response time interrupts will typically be grouped together into an exclusively dedicated pending queue.

Unlike timer queues, the pending queues are purely event based. These events are:
- A push event, where a new thread is introduced to a pending queue which either already exists or must be created.
- A synchronization event, where one or more threads must transition into the ready queue structure.

The following sections describe the behavior under these circumstances:

Push Event

On a push event the TSPM must determine where in the list to insert the thread descriptor (according to an identified sort operator metric[0]). There are two circumstances which must be considered:
- Push to an existing pending queue
- Push to a new pending queue The former case is trivial, the list is interrogated in order until an insertion point is found. In the classical case of ascending priority, the sort operator is set to 'greater than' (C_PEND_MNGR_PUSH_GTR) and the existing list is searched. The insertion point is defined by the point when the new thread's metric[0] is greater than the next list members metric[0].

When a new pending queue is required, the pending queue insertion takes place immediately before the insertion of the new thread entry.

Synchronization Event

Synchronization events may be received from the interrupt controller (TSIC) or through the command interface. Synchronization can take place in two modes:
- A literal mode, where the command arguments make a literal reference to a WME index
- A correlation mode, where a correlation is sought between a field within the thread descriptor and a field within the synchronization primitive.

In the literal mode, since the index of the thread descriptor is passed into the command, there is no search required for the most eligible candidate. The correlation mode requires that the most eligible synchronization candidate(s) is/are at first found.

The correlation mode consists of three sub-types:
- Normal, where only the most eligible candidate within the specified pending queue is synchronized.
- Multicast, where all eligible candidates within the specified pending queue are synchronized.
- Broadcast, where all eligible candidates within all pending queues are synchronized.

The most eligible candidate is identified by an argument passed with the command and an element identifier also within the command. The element identifier dictates which of the candidate thread descriptors' fields is compared to the passed argument in order to identify eligibility. In the normal mode, the algorithm iterates down the pending queue until an eligible candidate is found, at which point it is removed from the pending list and, where applicable, the timer queue and forwarded to the ready queue structure. For multicast and broadcast modes, this process continues until the pending queue or each pending queue becomes exhausted respectively.

Special conditions are associated with the removal of members of the timer queue. See the next section for more details.

Timing Queue Structure and Operation

Each new thread introduced to the timeout queue initially contains an absolute timeout value. This value may have been derived by the interface manager from a 32 bit relative or absolute timeout received as an argument.

The timer queue uses the C_THREAD_PENDING_QUEUE_TIMER_PTR_INDEX to store a list of thread descriptors in order of their timeout, with the closest timeout being at the head of the list. Note that these thread descriptors will also be members of the priority lists, by virtue of the second set of pointers indexed by C_THREAD_PENDING_QUEUE_PRIORITY_PTR_INDEX. The basic structure of the timeout queue is shown in FIG. 51. Rather than storing absolute timeout values within the individual thread descriptor members of the timer queue, the timeout relative to the timeout of the immediate predecessor is stored. This value is stored within a 16 bit field using a floating point representation—where the mantissa of the floating point timer format includes the 11 significant bits of the absolute number with a 5 bit exponent. The timeout field of the head element of the timer queue is always copied into the TSPM TimerHeadTimeout register, and reset thereafter.

The operation of the timing synchronization architecture uses several persistent internal resources:
- TimerHeadIndex; a head pointer to the timer list
- TimerNumElements; the number of elements in the timer queue
- TimerHeadTimeout; a snapshot of the head element's timeout
- TimerDivider; a prescaler for the system clock
- TimerDividercounter; a count-down resource for the divider
- TimerCounter; a 32 bit counter resource monotonically increasing on each prescaled clock tick
- TimerErrorAdjustCounter; a 32 bit counter used to accumulate and accommodate errors If the TimerDivider register is set to 0, timer functions are disabled.

Timer Queue Cycle Behavior

FIG. 52 shows the operation which takes place upon each prescaled clock tick. The TimerHeadTimeout is non zero when there is no pending timer based synchronization (the timer queue is in a waiting state), hence no action is taken. When TimerHeadTimeout becomes 0, and the timer queue is not empty, the system adopts one of two states according to the value of TimerErrorAdjustCounter. If TimerErrorAdjustCounter is zero, then the expiry of TimerHeadTimeout has occurred on this cycle and a timer synchronization primitive is created which will ultimately cause a pop from the timer queue (and priority queue for housekeeping purposes) Immediately thereafter the TimerErrorAdjustCounter is monotonically incremented until it is reset after the processing of a time event primitive has completed.

Timer Queue Events

There are three events which cause timer queue manipulations:
- A time event primitive (C_TSPM_CMD_TIME_PRIMITIVE)
- A thread push event with a non zero timeout (threads with timeout set to zero are not placed in the timer queue)
- A non timer based synchronization event resulting in the removal of a thread from the timer queue as a housekeeping exercise.

FIG. 53 shows a very basic representation of the operating modes of the timeout logic. When in the wait state the TimerHeadTimeout is non zero and monotonically decrementing according to the prescaled clock. TimerErrorAdjustCounter is maintained at zero in this state. When the TimerHeadTimeout reaches 0, the head of the timer queue has timed out and the FSM transitions into the active state, where pop operations are serviced. Within this state, TimerHeadTimeout is zero and the TimerErrorAdjustCounter is monotonically incrementing on each cycle. This error count is used to determine whether the time spent actioning a previous timeout event have made subsequent timeout events eligible. Once there are no further eligible timeout events outstanding, the FSM transitions back into the wait state and the TimerErrorAdjustCounter is reset.

The first of a potential sequence of timer derived pop operations is inferred from a reset timeout field within the thread descriptor (see FIG. 52). As the head of the timer queue, this thread is always popped. Thereafter, the TSPM must assess whether subsequent pops are eligible, to facilitate this an additional resource TimerLastError is used to maintain a sum of all the accumulated popped thread descriptor timeout deltas. On each further iteration of subsequent members of the timer queue, the TimerLastError is subtracted from the TimerErrorAdjustCounter, creating a normalised error count which is compared with the timeout of the new thread descriptor at the timer queue head. If the timeout delta within this thread is smaller than the normalised error count, this thread descriptor should also be popped. Initially the TimerLastError is zero, hence the thread timeout delta is compared directly against the TimerErrorAdjustCounter. FIG. 54 shows the previous timer queue structure after the thread 1 timeout has elapsed and the associated pop operation has taken place. Note that the TimerLastError has been updated by the thread 2 delta and that the duration of the thread 1 pop operation means that thread 2 is now also eligible.

FIG. 55 shows the state of the queue after the pop of thread 2. Note that the thread 2 delta has been added to TimerLastError, creating a running accumulation of the sum of the thread descriptor deltas. Note also that the pop operation on thread 2 took a sufficient length of time that thread 3 is now eligible.

FIG. 56 shows the state after the pop of thread 3. In this case the subsequent thread, thread 4 is not eligible for a pop so the state of the timer queue may return to wait. The TimerHeadTimeout must be reset as shown.

Note that, when transitioning from an active state back into the waiting state, the TimerHeadTimeout must be correctly reset. This is achieved by subtracting the difference between the TimerErrorAdjustCounter and the TimerLastError from the delta of the new timing queue head.

When a new thread is introduced or pushed to the timing queue, two cases must be considered; a push to the head and a push to the body of the timing queue.

For a push to the head, the TimerHeadTimeout is simply set to the thread delta. Where the queue is non-empty, the old head descriptor delta is set to the TimerHeadTimeout minus the new thread delta.

For a push to body the timer queue block must walk the timer list to identify where to insert the thread descriptor. The delta of the next in list is then adjusted to accommodate the addition of the delta of the new thread (the new thread delta is subtracted from the next threads delta).

Pop Operations

Pop operations, whether as a result of a timer or an external event synchronization event, are handled similarly. There are two cases to consider; where the thread popped is at the head of the timer queue and where it is not. In the former case, there are three scenarios; where the timer queue is in the wait state and where the timer queue is in the active state.

For a pop operation from the head of a 'waiting' timer queue, the TimerHeadTimeout is added to the timer delta of the next member of the timer queue to form the new TimerHeadTimeout (note that in timer based pops the value of TimerHeadTimeout will always be zero).

For a pop operation from the head of an 'active' timer queue, and the TimerErrorAdjustCounter is greater than the delta in the next thread descriptor, i.e. the next thread is eligible for a timer based synchronization, the error counter, TimerErrorAdjustCounter, is rebased to the delta of the popped thread.

For a pop operation from the head of an 'active' timer queue, and the TimerErrorAdjustCounter is not greater than the delta in the next thread descriptor, i.e. the next thread is not eligible for a timer based synchronization, the delta is decremented by the error counter and the TimerHeadTimeout is updated with the result. The timer queue effectively reverts to a waiting state.

Where the popped thread descriptor is not at the head of the timer list, the delta of the next thread in the timer queue must be incremented by the delta within the thread currently being removed.

Method Interface

As well as basic linked list status operations (get and set status) for the pending and timer queues, the pending manager presents the following commands on its interface:
Synchronization Primitive (C_TSPM_CMD_SYNC_PRIMITIVE)

Caller: TSIF, TSIC

The synchronization primitive command issues a control packet which liberates a blocked thread descriptor stored within a pending queue. The arguments are shown below:

| unsigned short PendingQueueID | The identity of the pending queue to which the synchronization primitive relates. |
| unsigned char Type | The type of the synchronization. Any of: UNICAST—synchronize the first matching thread from the referenced pending queue. MULTICAST—synchronize all matching threads from the referenced pending queue. BROADCAST—synchronize all matching threads from all pending queues. |
| unsigned long | Reference. The dependency reference to which this synchronization primitive relates. |

Add Thread to Pending Queue

Caller: TSIF

This command adds a thread descriptor to a new or an existing work queue. The command is implied to the pending manager by the presence of a thread descriptor in the work queue. The following table illustrates the fields of the thread descriptor relevant to the command.

| CREATE_NEW_PQ_FLAG | Determines whether a new pending queue must be created for this thread. |
| unsigned short PendingQueueID | The pending queue to which to add the thread descriptor. |
| unsigned long metrics | The eligibility of the thread, for use when ordering the insertion of the thread descriptor. |
| TierID | The ready queue scheduling tier to which this thread descriptor will be enqueued when it becomes unblocked. Used to set the dependant thread count within the scheduling tier. |
| DependancyTimeout | The timeout used for ordering within the timer queue. |

Process Marker Thread

Caller: TSIF

This command simply passes a marker thread through the to schedule manager work queue. It is used to ensure that all dependant threads have been processed by the pending manager before any possibility of a marker thread causing a scheduler tear-down.

Synchronization Primitive

Caller: TSIF

This command issues a synchronization primitive to a specified pending queue. The following arguments are present in the command structure:

| | |
|---|---|
| WME Index | This argument may be used to liberate a WME via a literal reference to its WME address. |
| Pending queue index | The pending queue to which to apply |
| Synchronization reference | The synchronization reference to be compared to blocking references within threads on the specified pending queue. |
| Synchronization type | The type of the synchronization. Any of: UNICAST—synchronize the first matching thread from the referenced pending queue. MULTICAST—synchronize all matching threads from the referenced pending queue. BROADCAST—synchronize all matching threads |

Update Metrics

Caller: TSIF

This command updates the metrics of a blocked thread and causes a resort of the appropriate pending queue. The command may be passed to the TSSM if the identified thread is no longer blocked. The following arguments are present in the command structure:

| | |
|---|---|
| Metrics | The new metrics for the identified thread |

Unlock Pending Queue

Caller: TSIF

This command unlocks a pending queue such that, when it becomes empty, it may be liberated back to the free list. The following arguments are present in the command structure:

| | |
|---|---|
| WMEIndex | The WME index to be unlocked |

TSOM—Output Manager

The output manager administers to the dispatch queue structures, which reference the next executing thread descriptor, and the executing metrics of the current executing thread.

Architecture

The architecture of the TSOM is centred on the dispatch queue structure, shown in FIG. 58. The output manager maintains a list of dispatch queue descriptors, where each DQD is associated with a system processing resource instance via the ProcElementID field. There are two groups of elements to the DQD which refer closely to the functionality of the TSOM as a whole. The first group, the execution-centric elements, including the ProcElementID, Metric 0, Metric 1 and Default Metric 0 refer to and are managed within the executing state of the task. The second group, the ready queue centric elements, including the root scheduler index, the pre-empt index and the next pre-empt index refer to the ready queue structure of threads awaiting execution. The TSOM also manages the out of band signalling (typically an interrupt) to the processing resource instances in the system and the popping of thread descriptors from the ready queue structure.

The Execution Centric Elements

The following is a brief description of the usage of the execution-centric elements within the dispatch queue descriptor:

ProcElementID—this is a static field which stores an index referring to the processing resource instance to which the dispatch queue descriptor is coupled.

Metrics 0, 1 are dynamically updated fields used to store the executing metrics of the currently executing tasks (including the 'idle task' and potentially numerous power-down states).

Default metric 0 is a static field used to support an optimization whereby, when pushing the currently executing thread back into the SystemWeaver server, and hence becoming idle by definition, the idle metrics can be restored automatically.

The Ready Queue Centric Elements

The following is a brief description of the usage of the ready queue-centric elements within the dispatch queue descriptor:

Root scheduler index is a static reference to the scheduling root tier associated with the dispatch queue.

The pre-empt index is a dynamic field which stores the currently most eligible candidate for the next execution of a given processing resource. The pre-empt index is administered entirely within the TSOM and is set, where appropriate, as a result of a dispatch queue event.

The next pre-empt index is a dynamic field which stores the either a parent of the next most eligible thread within the scheduling hierarchy or the thread index itself. The next pre-empt index is only set by the TSSM and is used as a vehicle for informing the TSOM of the position within the ready queue structure of the most eligible threads. The TSOM typically resets the field after processing.

Dispatch Queue Events

Dispatch queue events occur for two reasons:

A reschedule event: a dispatch queue event occurs whenever a re-schedule operation within the schedule manager (TSSM) identifies a change in state required of the dispatch queue, i.e. a pre-emption, typically as a result of processing a ready queue event (push, pop or metric manipulation).

A dispatch queue pop event: the thread index referenced by the pre-empt index has been popped by the interface manager (TSIF). This event is signalled to the TSOM by virtue of a "dispatch queue popped" flag (indexed by C_DISPATCH_DESC_POPPED_FLAG) within the dispatch queue descriptor itself.

In the case of a dispatch queue pop event, the popped thread transitions into the zombie state (see FIG. 41) and, if it is not already present there, it is pushed back into the work queue for liberation by the TSSM. Thereafter the TSOM unlinks the thread from the ready queue hierarchy.

For both reschedule and dispatch queue pop events, the processing of a dispatch queue event goes on to initiate a repopulation of the pre-empt index within the dispatch queue descriptor. By default, if the next pre-empt index is not a thread index in its own right, this is populated by walking down the scheduling hierarchy from the scheduling tier identified by the next pre-empt index. Once this is complete, the identified thread index is placed within the pre-empt index field and the thread is virtually popped from the ready queue, i.e. it transitions from the ready state into the popped state (see FIG. 41). This virtual pop is made manifest by locking the most eligible thread, marking it as popped and flagging an event back to the TSSM for rescheduling.

Under certain circumstances, a dispatch queue event results in an interrupt. If the repopulated pre-empt index contains a valid thread descriptor index and the interrupt is enabled, the interrupt to the system processor associated with this dispatch queue will be asserted under all circumstances except where the early interrupt assertion flag is enabled and the next pre-empt index is a thread, wherein it will already have been asserted by the TSSM.

The dispatch queue metrics are also updated.

Although the dispatch queue metrics are representative of the eligibility of the currently running thread, the dispatch queue is either being pre-empted, or a dispatch queue pop has taken place. Hence, the executing thread is either about to be pre-empted (in which case the update of the metrics is, at worst, a little premature), or a new thread is executing and the dispatch queue metrics will be overwritten anyway.

Where a reschedule has taken place which has usurped an existing next pre-empt index, the existing pre-empt index must be virtually flushed back into the ready queue structure (see FIG. 41). Within the TSOM the thread is simply marked as flushed and pushed back into the TSSM work queue for processing.

If an eligible thread cannot be found, the operation simply completes, the client (processing resource) will idle under these circumstances.

Setting Dispatch Queue Eligibility Metrics

The dispatch queue eligibility metrics reflect the executing priority of the task currently running on the processing resource instance indexed by ProcElementID. However, under certain optimizations, the dispatch queue eligibility metrics may also reflect the executing priority of the task about to commence execution.

The dispatch queue priority metrics are used to control pre-emption, they are manipulated for a variety of reasons:
  Commencing a new task
  Completion of the current task
  Priority inversion
  Power management In all cases the intention is to tune the operation of the scheduling of ready queues. Where the update results in the modification of a pool root node, that node is flagged to the TSSM for a reschedule operation. For more details of metric propagation within pool participants and non-pool participants see above.

As an optimization, when the processing resource instance pushes the currently executing thread back into the ready or blocked state within SystemWeaver, the executing priority is automatically reset to the default metric.

Method Interface

As well as basic status operations on the dispatch queue linked list (get and set status), the output manager presents the following commands on its interface:

Automated Executing Metric Update (C_TSOM_CMD_SERVICE_TIME_SLICE_EXPIRE)
  Caller: TSIF This command automatically modifies the least significant bit of metric 0 of the metric held within the dispatch queue for the identified processor ID. Since the argument is the identity of the processor, not the dispatch queue descriptor itself, the command initially walks the dispatch queue descriptor list to find the appropriate descriptor. The modification is a simply inversion of the least significant bit, assuming that the reserved portion of the metric field is set appropriately, this has the effect of reducing the priority of the executing thread regardless of whether priority is ascending or descending.

The arguments are shown below:

| unsigned char ProcID | The processing resource ID of the processor whose executing priority must be updated. |

Set Dispatch Queue Metrics
  Caller: TSIF (from an explicit system call)

This command sets the executing metrics for a particular dispatch queue. The following arguments are present in the command structure:

| WMEIndex | The index of the dispatch queue descriptor |
| Metrics | The new executing metrics for the identified dispatch queue. |

Set Default Dispatch Queue Metrics
  Caller: TSIF

This command resets the executing metric(0) for a particular dispatch queue to the default value, also held within the dispatch queue. There are no arguments to this function.

Dispatch Queue Event (C_SCHED_ENTRY_DISPATCH_LIST)
  Caller: TSSM

This command causes the dispatch queue descriptor to be updated when required by a change in state of the ready queues.

TSSM—Schedule Manager

The schedule manager administers to scheduling decision inherent in the parent and child linkages of the ready queue structures.

Architecture

The TSSM is fed commands exclusively from its work queue interface and is purely event driven. However, certain behavior is common to several commands, this behavior is described below:

Reschedule

The reschedule function re-evaluates the scheduling decision from a defined point in the scheduling hierarchy. The reschedule operation is work conserving, no additional work is done over and above that which is associated with parts of the hierarchy whose state could conceivably be affected by an event.

There is one particularly interesting argument to the reschedule function; UpdateRequired. UpdateRequired is used to propagate update status between scheduler tier operations. For example, although other state must still be administered, a pop operation which did not update the decision in a child tier, need not cause an entire scheduling iteration within the parent tier. In this case UpdateRequired would be false.

FIG. 60 shows the basic flow of a reschedule operation. Intratierscheduler performs scheduling within a tier, and results in the update of the tier parents head index pointer. Intertierscheduler scales successive tiers within the scheduling hierarchy towards the dispatch node. Note that the intertierschedule function is called with the parent index, thereby immediately scaling a level of hierarchy. Interpooltierschedule is a special case scheduling algorithm which is the only algorithm to fanout from a single node, the pool root node, to multiple nodes, the pool static nodes.

The remainder of this section describes the operation of the scheduling algorithms.

Intra-Tier Scheduler

The most fundamental scheduling operation is traversing the link list of elements within a scheduling tier to identify which is the most eligible and updating the head pointer of the parent accordingly.

In the trivial case, where an appropriate descriptor is pushed to an empty scheduling tier, the parent's head pointer and number of elements are unconditionally updated and the metrics are conditionally propagated (according to metric propagation operators) from the new child to the parent.

FIG. 61 shows the more general case for a push operation. The validity of the current selection and the candidate selection is a combination of a number of factors:
  The selection must have content which can be scheduled. For a thread this is always true, but for a scheduler this is dependant on the content of its subordinate hierarchy.
  If the descriptor is a scheduler, it must not be dormant, nor must its invalid selection flag be set.
  If the descriptor is a standard thread, it must not be locked, nor must it be in a work queue.
  If the descriptor is a marker thread, the parents total dependency count must be zero and the marker thread must be the only entry left in the tier.

Note that the candidate is only compared with the current selection, the most eligible descriptor from a previous scheduling operation—if the candidate beats the winner, it must be the new winner. "Schedule Pair" relates to the algorithm held within the parent scheduling tier, as discussed above. The "Update parent" variable carries an instruction back to the caller that the parent of this tier should also be updated as a result of this operation.

In the general case of a reschedule, for example where metrics have been updated, or where a pop has occurred, the full tier must be re-evaluated to find the new most eligible candidate. This process steps through the operations of FIG. 61 multiple times until the entire tier has been re-evaluated, as shown in FIG. 62.

Inter-Tier Schedule

Inter-tier schedule is run a single time per scheduler tier, which may amount to several times per scheduling event. Inter tier scheduling is highly dependant on the type of the parent. In summary, inter-tier scheduling continues to call intra-tier scheduling until the parent becomes a dispatch queue. There is one exception to this, which is where a pool distribution node is encountered.

FIG. 63 shows the basic flow of inter-tier scheduling. There is unique behavior associated with a dispatch queue descriptor (DQD) parent and a pool root node (PRN) parent. However, in other cases, the inter-tier scheduler simply replaces the current child index with the current parent (thereby iterating up the scheduling hierarchy) and recalls itself.

FIG. 64 shows the dispatch queue processing in the inter-tier scheduling routine. Firstly, the executing metrics, contained within the dispatch queue descriptor (DQD), are scheduled against the metrics held within the scheduler root node, according to the algorithm defined in the DQD. If this operation determines that a pre-emption is required an update is made to the DQD next pre-emption index according to the type of event which started the reschedule operation. If this event was a thread push, the scheduled thread index is placed directly in the next pre-empt index field, otherwise the scheduler root node index is used. It then falls on the TSOM to iterate the scheduling hierarchy to find the thread descriptor Inter-Pool Tier Scheduling Inter pool tier scheduling is used to identify which, if any, of the associated processing resource instances, should be selected for servicing a thread descriptor held within the current pool. In that sense it operates in a unique manner, since, unlike all other scheduling algorithms described here, it is typically seeking the least eligible candidate.

FIG. 66 shows the flow through an inter-pool tier scheduling operation, represented graphically in FIG. 65. The initial intra-tier scheduling operation determines whether the candidate from the scheduling hierarchy is more eligible than any of the executing tasks, as indicated by the metrics held within the pool static nodes within the pool distribution tier. There are two results, an indication of whether an update is required and the identification of the node to which the update must be applied.

The algorithm then proceeds to iterate around the entire pool distribution tier, starting at the pool static node indicated by the appropriate "next pointer" of the pool root node.

On each iteration, as well as administering to housekeeping functions (such as maintenance of thread counters and other state) inter-tier scheduling is called on the pool attachment tier. As is normally the case, inter-tier scheduling continues to propagate up the entire hierarchy of scheduling until it reaches the dispatch node. Inter-tier scheduling takes an argument which indicates whether further scheduling tiers should fully re-evaluate the scheduling decision, "update required". This flag is set under two circumstances in the context of inter-pool scheduling:
  The pool static node currently being processed is the node that was identified by intra-pool scheduling as the most eligible node for processing the most eligible thread beneath the pool root node.
  The hierarchy beneath the pool root node is empty of any eligible scheduling candidates.

Intra-Pool Tier Scheduling

FIG. 67 shows the flow of intra-pool tier scheduling. In the first instance there is an optimization which decreases the scheduling time for push only operations—this improves the responsivity of the system to new tasks becoming available.

Assuming that this is not an exclusive push operation, the scheduling operation sets the current selection and candidate selection to the first two PSN nodes in the pool. The algorithm then enters a loop around the entire pool distribution tier. On each iteration, the current selection is scheduled against the candidate. Note that the same scheduling algorithms are used for pool distribution tiers as other scheduling tiers, however, the individual algorithms selected are likely to differ since, in this scenario the correct selection is showing the least eligible metrics by normal standards.

If the candidate presides over the current selection, the current selection is updated to the candidate, the candidate is updated to the next entry in the tier and the process continues until the candidate becomes the PRN.

In an exclusive push operation this iteration is avoided. The current selection and update node is simply set to the parent of the PRN (which defines the current scheduling selection), and the candidate is the PRN itself.

In all cases the pool root node is then checked for schedulable content, if there is none, then "no update" status is set and the algorithm returns. However, if there is schedulable content the process continues to the second phase, whereby the existing selection from the PRN (in exclusive push operations), or the result of the iteration (in other cases) is scheduled against the PRN itself. If the PRN wins this contest then an update is required, otherwise it is not.

EXAMPLES

FIG. 68 shows the TSSM scheduler processing associated with the push of a thread descriptor (node #5) into a static scheduling element (node #3). The first intra-tier scheduling operation takes place within the context of the reschedule function and is with respect to the parent node #3. Reschedule then moves up a layer of hierarchy and calls inter-tier scheduling with the parent node #2. The iteration immediately after this finds the parent node #1, which is a DQD. Hence there are no further calls to the intra-tier scheduler and a scheduling comparison is done between the metrics of the most eligible candidate stored within the root node and the executing thread, stored within the dispatch node. In this case, a pre-emption is appropriate and a dispatch queue event is communicated to the TSOM.

FIG. 69 shows a more cascaded scheduling hierarchy. Here, an additional call is made to the intra-tier scheduling function for the additional layer of hierarchy. Note though, that the scheduling tiers 5 and 3 remain unaffected as the scheduling event which caused the reschedule operation is out of their scope.

FIG. 70 gives a third example, in this case of a pool scheduling operation. As before the tier into which the thread push event occurs is subject to an intra-tier scheduling operation, in this example, the new thread is the most eligible in the pool root tier. The inter pool tier scheduler then makes a call to the intra pool tier scheduler to determine whether any of the system processing resources should be pre-empted by the newly arrived thread. In this case, the result of intra pool tier scheduling is that the processing resource instance associated with dispatch queue descriptor at WME index 7 should be pre-empted.

Inter pool tier schedule then iterates around the pool distribution tier, first calling inter-tier schedule on node 4. In turn inter-tier schedule calls intra-tier schedule to update scheduler tier 1, although no exhaustive scheduling is required since this is not the pre-emptied tier—processing is limited to maintenance of state information, hence, there is no dispatch queue event to the TSOM, nor interrupt to the system processing resource.

The next call is inter-tier scheduling on tier 2. In this case the tier is properly scheduled to establish whether the newly pushed thread descriptor is more eligible than any other candidates. The candidates metrics are finally compared with those of the executing thread stored within the dispatch queue descriptor to determine whether a pre-emption is appropriate. In this example it is and, accordingly, a dispatch queue event is sent to the TSOM and the system processing resource instance interrupt is flagged.

Once again, only those scheduling tiers which are touched by the scope of the push thread event are re-evaluated.

Method Interface

The TSSM is directed exclusively via the work queue.
Service Thread Descriptor Event
   Caller: TSIF, TSPM, TSOM The behavior of this command is dependant on the settings within the flags of the received thread:

If the pushed or flushed flags are set the parents' total thread elements count is increased. If the popped flag is set, it is decreased (note that the net effect of a combination of the above can be NULL).

Threads with the pushed flag set are then linked into the ready queue hierarchy. Where they have transitioned from the blocked state, the parents' count of dependant threads is also decreased.

The only behavior which is exclusive to marker threads is the unlocking of the parent (transitioning the scheduler tier into the "pending free" state—see FIG. 42).

The TSSM requests that any thread descriptors received in the zombie state are freed when processing this command.

This command always requests a reschedule.

Reschedule Pool Distribution Tier
   Caller: TSOM

This command is called as a result of a change in the metrics of an executing thread. Where the dispatch descriptor participates in a pool, these metrics are propagated through the distribution hierarchy and ultimately call this function to re-evaluate the scheduling decision.

Reschedule or Delete Scheduler Tier
   Caller: TSOM

This command is called by the TSOM for two reasons:
     As a result of a change in the metrics of an executing thread, where the dispatch descriptor does not participate in a pool, to re-evaluate whether a pre-emption is appropriate. This operation passes a scheduling root node. Where the scheduling tier contains thread descriptors in its hierarchy, a reschedule is requested
     To delete a scheduling tier, where the TSOM has determined that it is appropriate to do so. This determination is based on the locked flag, dependant thread counts and number of child elements (false, 0 and 0 respectively). The actually freeing of the descriptor manifests itself as a request to the TSIM.

Push an Independent Element
   Caller: TSIF

This command may be used during initialization to push static scheduling tiers into the scheduling hierarchy, or it may be used dynamically to add thread descriptors or dynamic scheduling hierarchy during runtime.

Update Thread Metrics
   Caller: TSIF

Updates the metrics of a thread descriptor within the ready queue hierarchy. Metrics may only be updated when the thread descriptor is in the ready state (FIG. 41).

This command causes a reschedule.

Update Scheduler State
   Caller: TSIF

This command enables the update of scheduler algorithms, metrics and metric propagation algorithms. The command causes a reschedule.

Activate Scheduler Tier
   Caller: TSIF

This command activates a dormant scheduler tier. The command causes a reschedule.

De-Activate Scheduler Tier
   Caller: TSIF

This command deactivates a dormant scheduler tier.

TSMM—Memory Manager

The memory manager (FIG. 71) provides multiplexing/demultiplexing behavior to for aggregating access to the TCM. It also provides locking capabilities to ensure the integrity of resources shared between multiple sub-blocks.

Architecture

From an architectural perspective, the memory manager can be regarded primarily as a mux/demux which aggregates access to the TCM amongst the six possible requesters. It also maintains the integrity of WMEs, where multiple sub-blocks are attempting access to the same resource, by implementing a lock cache.

Access Aggregation

Access aggregation is under the control of a scheduler. This scheduler is asymmetric:
  TSIF has the highest priority
  TSOM has the next highest priority
  All remaining requesters have equal priority, and are treated in a work-conserving round-robin.

Lock Caching

Each block has an allocation of between one and four locks. These numbers represent the number of WMEs to which the sub-block requester can have exclusive access. A sub-block requesting a locked resource is blocked until the resource becomes available. Contention between multiple blocks spinning on the same resource is resolved by priority.

Scheduling Sequence Diagrams

Push Event

The sequence diagram in FIG. 72 shows the inter sub-block interactions following a push event. Note that the work queues have been introduced to store commands as the TSSM and TSOM are, of themselves, single threaded. Please, refer to FIG. 68 for a representative scheduling hierarchy.

The state before the push event is that thread #4 is the current pre-emption index within dispatch queue descriptor #1. The first reschedule identifies that thread #5 is more eligible than thread #4, as a result dispatch queue descriptor #1 is pushed into the TSOM work queue.

A dispatch queue descriptor in the TSOM work queue causes a dispatch queue event within the TSOM. This event virtually pops thread descriptor #5 and sets dispatch queue metrics accordingly. This pop operation causes a change of state in the ready queues and hence a reschedule must be called. This is achieved by pushing thread #5 into the TSSM work queue with the popped flag set.

Since thread #4 has been virtually popped previously, it now needs to be flushed back into the ready queue structures. This also constitutes a change of state within the ready queue structure and hence another reschedule is required. This is achieved by pushing thread #4 into the TSSM ready queue structure with the flushed flag set.

Note that the second and third reschedule operations cannot be merged as the virtually popped thread and the flushed thread may be in largely distinct parts of the ready queue hierarchy.

Pop Event

The sequence diagram in FIG. 73 shows the interaction between the TSIF, TSOM and TSSM when a thread descriptor is popped from the "virtual" dispatch queue.

The pop command itself is received by the TSIF over the command interface, or system interconnect. The TSIF issues a dispatch queue popped command to the TSOM by pushing the dispatch queue descriptor onto the TSOM work queue with the popped flag set.

The dispatch queue descriptor in the TSOM work queue causes a dispatch queue event within the TSOM. The dispatch queue event handler instructs the TSSM to request that the thread descriptor which has just been popped, in this case thread #5, is placed back on the free list. The next pre-emption index, storing the next most eligible candidate for execution, is then virtually popped by the TSOM. This represents a change of state for the ready queue structure, hence the TSSM is instructed to reschedule by the TSOM—the next pre-empt thread is pushed into the TSSM work queue with the popped flag set.

The invention claimed is:

1. A method of scheduling executable transactions in a multicore processor comprising a plurality of processor elements, wherein at least one processor element comprises reconfigurable logic, the method comprising:
  providing a first configuration queue of executable transactions allocated for execution by a first configuration of the reconfigurable logic and a second configuration queue of executable transactions allocated for execution by a second configuration of the reconfigurable logic;
  providing a multilevel scheduler comprising a plurality of executable transaction schedulers each configured to determine a most eligible executable transaction for execution from a plurality of candidate executable transactions, each candidate executable transaction associated with the first configuration of the reconfigurable logic or the second configuration of the reconfigurable logic, the multilevel scheduler configured to:
    output a determined most eligible executable transaction to the first configuration queue in response to the determined most eligible executable transaction being associated with the first configuration of the reconfigurable logic; and
    output the determined most eligible executable transaction to the second configuration queue in response to the determined most eligible executable transaction being associated with the second configuration of the reconfigurable logic; and
  when the reconfigurable logic is configured in the first configuration:
    outputting executable transactions from the first configuration queue to the reconfigurable logic; and
    reconfiguring the reconfigurable logic to the second configuration when a pre-determined threshold is reached.

2. The method of claim 1, wherein reconfiguring the reconfigurable logic comprises:
  stopping the output of the contents from the first configuration queue to the reconfigurable logic before reconfiguring the reconfigurable logic to the second configuration.

3. The method of claim 1, wherein the pre-determined threshold is a maximum time allowed before a particular executable transaction must be executed.

4. The method of claim 1, wherein the pre-determined threshold is a threshold number of transactions executed by the configurable logic when the reconfigurable logic is configured in the first configuration.

5. The method of claim 1, wherein the pre-determined threshold is a threshold number of transactions in the second configuration queue.

6. The method of claim 1, wherein the second configuration is selected from a plurality of configurations based on a length of the second configuration queue.

7. The method of claim 6, wherein the second configuration is selected from a plurality of configurations in response to the second configuration queue being the longest configuration queue from among a plurality of configuration queues.

8. A non-transitory computer-readable storage medium comprising computer-executable instructions for scheduling executable transactions in a multicore processor comprising a plurality of processor elements, wherein at least one processor element comprises reconfigurable logic, the instructions, when executed, configured to:
  provide a first configuration queue of executable transactions allocated for execution by a first configuration of the reconfigurable logic and a second configuration queue of executable transactions allocated for execution by a second configuration of the reconfigurable logic;

provide a multilevel scheduler comprising a plurality of executable transaction schedulers each configured to determine a most eligible executable transaction for execution from a plurality of candidate executable transactions, each candidate executable transaction associated with the first configuration of the reconfigurable logic or the second configuration of the reconfigurable logic, the multilevel scheduler configured to:

output a determined most eligible executable transaction to the first configuration queue in response to the determined most eligible executable transaction being associated with the first configuration of the reconfigurable logic; and output the determined most eligible executable transaction to the second configuration queue in response to the determined most eligible executable transaction being associated with the second configuration of the reconfigurable logic; and when the reconfigurable logic is configured in the first configuration:

output executable transactions from the first configuration queue to the reconfiguration logic; and reconfigure the reconfigurable logic to the second configuration when a pre-determined threshold is reached.

9. The non-transitory computer-readable storage medium of claim 8, wherein reconfiguring the reconfigurable logic comprises:

stopping the output of the contents from the first configuration queue to the reconfigurable logic before reconfiguring the reconfigurable logic to the second configuration.

10. The non-transitory computer-readable storage medium of claim 8, wherein the pre-determined threshold is a maximum time allowed before a particular executable transaction must be executed.

11. The non-transitory computer-readable storage medium of claim 8, wherein the pre-determined threshold is a threshold number of transactions executed by the configurable logic when the reconfigurable logic is configured in the first configuration.

12. The non-transitory computer-readable storage medium of claim 8, wherein the pre-determined threshold is a threshold number of transactions in the second configuration queue.

13. The non-transitory computer-readable storage medium of claim 8, wherein the second configuration is selected from a plurality of configurations based on a length of the second configuration queue.

14. The non-transitory computer-readable storage medium of claim 13, wherein the second configuration is selected from a plurality of configurations in response to the second configuration queue being the longest configuration queue from among a plurality of configuration queues.

15. A multicore processor system comprising:

a multicore processor comprising a plurality of processor elements, where at least one processor element comprises reconfigurable logic;

a first configuration queue of executable transactions allocated for execution by a first configuration of the reconfigurable logic;

a second configuration queue of executable transactions allocated for execution by a second configuration of the reconfigurable logic;

a multilevel scheduler comprising a plurality of executable transaction schedulers each configured to determine a most eligible executable transaction for execution from a plurality of candidate executable transactions, each candidate executable transaction associated with the first configuration of the reconfigurable logic or the second configuration of the reconfigurable logic, the multilevel scheduler configured to:

output a determined most eligible executable transaction to the first configuration queue in response to the determined most eligible executable transaction being associated with the first configuration of the reconfigurable logic; and output the determined most eligible executable transaction to the second configuration queue in response to the determined most eligible executable transaction being associated with the second configuration of the reconfigurable logic; and a controller configured to, when the reconfigurable logic is configured in the first configuration:

output executable transactions from the first configuration queue to the reconfiguration logic; and reconfigure the reconfigurable logic to the second configuration when a pre-determined threshold is reached.

16. The system of claim 15, wherein reconfiguring the reconfigurable logic comprises:

stopping the output of the contents from the first configuration queue to the reconfigurable logic before reconfiguring the reconfigurable logic to the second configuration.

17. The system of claim 15, wherein the pre-determined threshold is a maximum time allowed before a particular executable transaction must be executed.

18. The system of claim 15, wherein the pre-determined threshold is a threshold number of transactions executed by the configurable logic when the reconfigurable logic is configured in the first configuration.

19. The system of claim 15, wherein the pre-determined threshold is a threshold number of transactions in the second configuration queue.

20. The system of claim 15, wherein the second configuration is selected from a plurality of configurations based on a length of the second configuration queue.

21. The system of claim 20, wherein the second configuration is selected from a plurality of configurations in response to the second configuration queue being the longest configuration queue from among a plurality of configuration queues.

* * * * *